US012809203B2

(12) United States Patent
Choi et al.

(10) Patent No.: US 12,809,203 B2
(45) Date of Patent: Nov. 24, 2026

(54) CONNECTION BRACKET AND DISPLAY APPARATUS INCLUDING THE SAME

(71) Applicant: SAMSUNG ELECTRONICS CO., LTD., Suwon-si (KR)

(72) Inventors: Daesu Choi, Suwon-si (KR); Yousub Lee, Suwon-si (KR); Hyunyong Choi, Suwon-si (KR); Jaemin Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 18/750,588

(22) Filed: Jun. 21, 2024

(65) Prior Publication Data

US 2025/0071922 A1 Feb. 27, 2025

Related U.S. Application Data

(63) Continuation of application No. PCT/KR2024/006990, filed on May 23, 2024.

(30) Foreign Application Priority Data

Aug. 21, 2023 (KR) ........................ 10-2023-0109397

(51) Int. Cl.
*G02F 1/1333* (2006.01)
*G06F 1/16* (2006.01)
*G09F 9/302* (2006.01)

(52) U.S. Cl.
CPC ........ *G02F 1/13336* (2013.01); *G06F 1/1681* (2013.01); *G09F 9/3026* (2013.01); *G09G 2300/026* (2013.01)

(58) Field of Classification Search
CPC ................ G09F 9/3026; G06F 1/1681; G09G 2300/026; G02F 1/13336
See application file for complete search history.

(56) References Cited

U.S. PATENT DOCUMENTS 8,033,513 B2 10/2011 Jang et al.
8,235,335 B2 8/2012 Sato et al.
(Continued)

FOREIGN PATENT DOCUMENTS

JP 2022-21463 2/2022
JP 2022-166990 11/2022
(Continued)

OTHER PUBLICATIONS

International Search Report dated Sep. 23, 2024 issued in PCT Application No. PCT/KR2024/006990.
(Continued)

*Primary Examiner* — James Wu
(74) *Attorney, Agent, or Firm* — STAAS & HALSEY LLP

(57) ABSTRACT

A display apparatus comprises: a first display unit comprising a first connector, a second display unit disposed adjacent to one side of the first display unit, the second display unit comprising a second connector, a connection bracket comprising a third connector configured to be electrically connectable to the first connector, and a fourth connector configured to be electrically connectable the second connector, and a position adjusting device configured to move at least one of the first display unit and the second display unit to adjust a mounting position of the at least one of the first display unit and the second display unit while the connection bracket is mounted to the first display unit and the second display unit so that the first connector is connected to the third connector and the second connector is connected to the fourth connector.

6 Claims, 35 Drawing Sheets

(56) References Cited

U.S. PATENT DOCUMENTS

| | | | | |
|---|---|---|---|---|
| 9,854,701 | B2 * | 12/2017 | Choi | F16M 11/043 |
| 10,853,017 | B2 * | 12/2020 | Park | G06F 3/1446 |
| 11,240,920 | B2 | 2/2022 | Jeon et al. | |
| 11,495,148 | B2 | 11/2022 | Lee et al. | |
| 11,615,722 | B2 | 3/2023 | Morino et al. | |
| 11,635,789 | B2 | 4/2023 | Shibayama et al. | |
| 11,935,440 | B2 | 3/2024 | Yoon et al. | |
| 2021/0332938 | A1 | 10/2021 | Gilligan et al. | |
| 2024/0306317 | A1 | 9/2024 | Hong et al. | |

FOREIGN PATENT DOCUMENTS

| | | |
|---|---|---|
| KR | 10-0793754 | 1/2008 |
| KR | 10-1083991 | 11/2011 |
| KR | 10-1901213 | 9/2018 |
| KR | 10-2019-0046578 | 5/2019 |
| KR | 10-2019-0084836 | 7/2019 |
| KR | 10-2019-0103738 | 9/2019 |
| KR | 10-2189234 | 12/2020 |
| KR | 10-2021-0037964 | 4/2021 |
| KR | 10-2021-0119223 | 10/2021 |
| KR | 10-2404360 | 6/2022 |
| KR | 10-2481264 | 12/2022 |
| KR | 10-2497666 | 2/2023 |
| WO | WO 2012/110900 A2 | 8/2012 |

OTHER PUBLICATIONS

Written Opinion dated Sep. 23, 2024 issued in PCT Application No. PCT/KR2024/006990.

Extended European search report dated May 27, 2026 issued in corresponding European Application 24856592.1.

* cited by examiner

CONNECTION BRACKET AND DISPLAY APPARATUS INCLUDING THE SAME

CROSS REFERENCE TO THE RELATED APPLICATION

This application is a continuation application, filed under 35 U.S.C. § 111 (a), of International Application PCT/KR2024/006990 filed May 23, 2024 and is based on and claims priority under 35 U.S.C. § 119 to Korean Patent Applications No. 10-2023-0109397, filed on Aug. 21, 2023 in the Korean Intellectual Property Office, the disclosures of which are incorporated by reference herein in their entireties.

TECHNICAL FIELD

The present disclosure relates to a connection bracket and a display apparatus including the same.

BACKGROUND ART

A display apparatus is a kind of an output apparatus that converts obtained or stored electrical information into visual information and displays the visual information to a user.

The display apparatus may be classified into a self-luminous type including a display panel that emits light on its own such as an organic light emitting diode (OLED), and a non-self-luminous type including a display panel that does not emit light its own and receives light from a backlight unit such as a liquid crystal display (LCD).

The display apparatus may include a plurality of display units. Each of the plurality of display units may display an image.

DISCLOSURE

Technical Problem

The present disclosure is directed to providing a display apparatus capable of easily adjusting a position of each display unit.

Further, the present disclosure is directed to providing a display apparatus capable of easily adjusting a step difference between a plurality of display units.

Further, the present disclosure is directed to providing a display apparatus including an improved structure to allow a plurality of display units to be arranged in various ways.

Further, the present disclosure is directed to providing a display apparatus with improved design aspects.

Technical Solution

An embodiment of the present disclosure provides a display apparatus including a first display unit including a first connector; a second display unit disposed adjacent to one side of the first display unit, the second display unit including a second connector; a connection bracket configured to be mounted to the first display unit and the second display unit, respectively, the connection bracket including a third connector configured to be electrically connectable to the first connector and a fourth connector configured to be electrically connectable the second connector; and a position adjusting device configured to move at least one of the first display unit and the second display unit to adjust a mounting position of the at least one of the first display unit and the second display unit while the connection bracket is mounted to the first display unit and the second display unit so that the first connector is connected to the third connector and the second connector is connected to the fourth connector.

The position adjusting device is disposed on the connection bracket, and the position adjusting device is configured to be slidable at least one of the third connector connected to the first connector and the fourth connector connected to the second connector.

The position adjusting device is configured to convert a rotational movement caused by a rotational force applied to the position adjusting device, into a linear movement for at least one of the display units in order to adjust the mounting position of the at least one of the first display unit and the second display unit.

The position adjusting device comprises a guide block fixed to the third connector within the connection bracket, and a guide screw rotatably coupled to the guide block, and configured to move the guide block in an up and down direction by rotating.

The position adjusting device comprises a guide block fixed to the fourth connector within the connection bracket, a guide screw rotatably coupled to the guide block and configured to move the guide block in an up and down direction by rotating.

At least a portion of the guide screw is to be exposed to an outside of the connection bracket so that the guide screw is rotatable by rotating the at least a portion of the guide screw that is exposed.

The position adjusting device comprises a protruding guide portion protruding from the first connector, and configured to move in a first direction, a moving block configured to move in a second direction intersecting the first direction within the third connector, and configured to press the protruding guide portion, and an adjustment screw rotatably coupled to the moving block to move the moving block in the second direction.

The position adjusting device comprises a protruding guide portion protruding from the second connector, and configured to move in a first direction, a moving block configured to move in a second direction intersecting the first direction within the fourth connector, and configured to press the protruding guide portion, and an adjustment screw rotatably coupled to the moving block to move the moving block in the second direction.

The protruding guide portion comprises a first inclined surface, and the moving block comprises a second inclined surface corresponding to the first inclined surface and to be in contact with the first inclined surface so that the moving block is movable by a rotation of the adjusting screw.

The position adjusting device comprises a toothed rail disposed behind the fourth connector, and to extend in an up and down direction, and a locking protrusion to engage with the toothed rail, and configured to move together with the fourth connector along the toothed rail.

While the toothed rail and the locking protrusion are engaged with each other, the locking protrusion and the fourth connector are allowed to move upward along the toothed rail while preventing from moving downward, and while the toothed rail and the locking protrusion are disengaged, the locking protrusion and the fourth connector are allowed to move upward and downward along the toothed rail.

The position adjusting device further comprises a release portion configured to press the locking protrusion so as to release the engagement between the toothed rail and the locking protrusion.

The position adjusting device further comprises a spring configured to connect the locking protrusion and the fourth connector, and configured to elastically bias the locking protrusion to allow the toothed rail and the locking protrusion to engage with each other.

The connection bracket comprises a first panel disposed behind the first display unit, a second panel disposed behind the second display unit, and a hinge rotatable between the first panel and the second panel.

At least one of the first display unit and the second display unit comprises a first coupler, the connection bracket comprises a second coupler, at least one of the first coupler and the second coupler is a magnet so that the first coupler and the second coupler is magnetically attach to or detach from each other.

At least one of the first coupler and the second coupler is an electromagnet, and the first coupler and the second coupler is magnetically attach to or detach from each other based on supplying of a current.

The protruding guide portion comprises a first inclined surface, and the moving block comprises a second inclined surface corresponding to the first inclined surface and to be in contact with the first inclined surface so that the moving block is movable by a rotation of the adjusting screw.

Another aspect of the present disclosure provides a connection bracket configured to connect a first display unit including a first connector and a second display unit adjacent to the first display unit and including a second connector. The connection bracket includes a third connector configured to be electrically connected to the first connector; a fourth connector configured to be electrically connected the second connector; and a position adjusting device configured to slide at least one of the third connector connected to the first connector or the fourth connector connected to the second connector.

Another aspect of the present disclosure provides a display apparatus including a first display unit including a first connector; a second display unit disposed adjacent to one side of the first display unit and including a second connector; a connection bracket including a third connector configured to be electrically connected to the first connector and a fourth connector configured to be electrically connected the second connector; and a position adjusting device configured to adjust a position of the first display unit with respect to the second display unit. The position adjusting device includes a protruding guide portion formed in the first connector and configured to move in a first direction with the first connector. The position adjusting device includes a moving block formed in the third connector and configured to move in a second direction intersecting the first direction and provided to be in contact with the protruding guide portion. The position adjusting device includes an adjustment screw rotatably coupled to the moving block to move the moving block in the second direction.

MODES OF THE INVENTION

Figure 1:
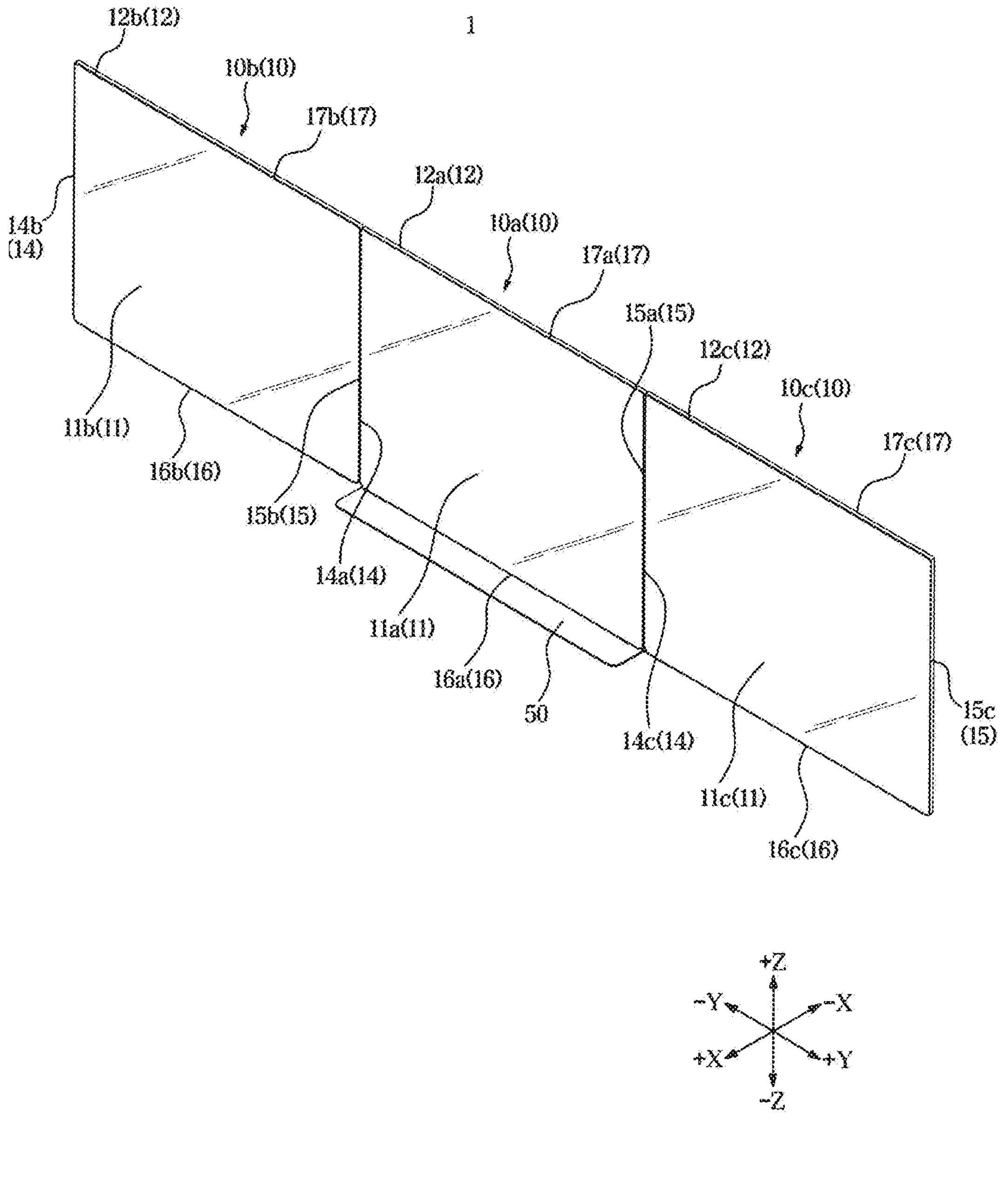
FIG. 1 is a perspective view of a display apparatus according to one embodiment.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless otherwise indicated herein or clearly contradicted by context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

For example, the expression "at least one of A, B and C" may include any of the following: A, B, C, A and B, A and C, B and C, A and B and C.

The term of "and/or" includes a plurality of combinations of relevant items or any one item among a plurality of relevant items.

The terms such as "~portion", "~module", "~member", and the like may refer to at least one process processed by at least one hardware or software. According to embodiments, a plurality of "~portion", "~module", "~member" may be embodied as a single element, or a single of "~portion", "~module", "~member" may include a plurality of elements.

Herein, the expressions "a first", "a second", "the first", "the second", etc., may simply be used to distinguish an element from other elements, but is not limited to another aspect (importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, elements, or combinations thereof, but do not preclude the presence or addition of one or more of the features, elements, steps, operations, elements, elements, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

Hereinafter exemplary embodiments of the present disclosure will be described in detail with reference to the accompanying drawings The terms "forward and backward direction", "forward," "backward," "lateral direction", "horizontal direction", "right side", "left side", "up and down direction", "vertical direction", "upward," "downward," etc. used in the following description are defined based on the drawings. For example, based on a display apparatus 1 shown in FIG. 1, a direction in which an image is displayed may be defined as the forward direction (+X direction), and a side opposite to the front may be defined as the backward direction (−X direction). For example, a direction in which the plurality of display units 10 is arranged based on the display apparatus 1 shown in FIG. 1 may be defined as the lateral (or horizontal) direction (Y direction). However, the shape and location of each component are not limited by the above-mentioned terms.

Hereinafter for convenience of description, a display unit 10 included in the display apparatus 1 will be described using a monitor as an example. However, the display unit 10 of the present disclosure is not limited to a monitor. For example, the display unit 10 of the present disclosure may also be applied to devices such as TVs, smart phones, and tablet PCs.

In addition, the drawing shows the display apparatus 1 including the flat display unit 10 as an example, but the present disclosure is not limited thereto. The present disclosure may also be applied to a curved display unit or a bendable or flexible display unit in which a flat state and a curved state are variable.

Figure 2:
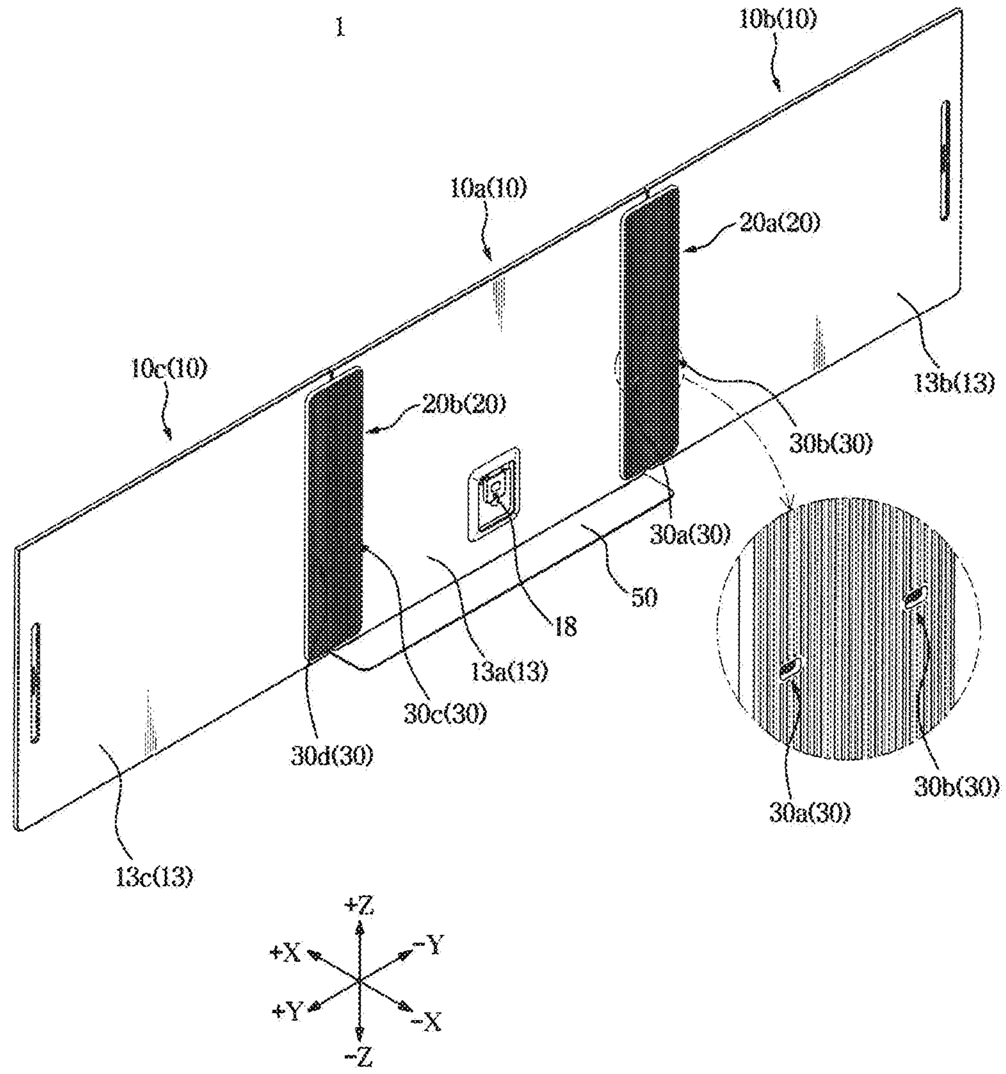
FIG. 2 is a rear perspective view of the display apparatus shown in FIG. 1.

FIG. 1 is a perspective view of a display apparatus according to one embodiment. FIG. 2 is a rear perspective view of the display apparatus shown in FIG. 1.

Referring to FIGS. 1 and 2, the display apparatus 1 may include a plurality of display units 10 and a connection bracket 20 configured to connect display units adjacent to each other among the plurality of display units 10.

The display apparatus 1 may include the plurality of display units 10. The display apparatus 1 may include at least two display units 10.

For example, the display apparatus 1 may include a first display unit 10*a* and a second display unit 10*b* disposed adjacent to one side of the first display unit 10*a*. For example, the display apparatus 1 may include a first display unit 10*a*, a second display unit 10*b* disposed adjacent to one side of the first display unit 10*a*, and a third display unit 10*c* disposed adjacent to the other side of the first display unit 10*a*.

For example, for convenience of description, the display unit 10*a* disposed in the center among the plurality of display units 10 may be defined as the first display unit 10*a*. Additionally, the second display unit 10*b* and the third display unit 10*c* may be defined based on the first display unit 10*a*. For example, the display unit 10*b* disposed on the left side of the first display unit 10*a* may be defined as the second display unit 10*b*, and the display unit 10*c* disposed on the right side of the first display unit 10*a* may be defined as the third display unit 10*c*. However, the ordinal numbers of "first", "second", and "third" do not limit the configuration of the first display unit 10*a*, the second display unit 10*b*, and the third display unit 10*c*.

Additionally, it is illustrated that the display apparatus 1 includes three display units 10*a*, 10*b*, and 10*c* on the drawings, but the present disclosure is not limited thereto. The display apparatus 1 may include four or more display units. The display apparatus 1 may include two display units.

The display unit 10 may have different horizontal and vertical side lengths. That is, the display unit 10 may be provided to have a long side and a short side. Each display unit 10 may be provided in a rectangular plate shape. However, the present disclosure is not limited thereto, and the display unit 10 may be provided in a square plate shape with long and short sides having the same length. Alternatively, the display unit 10 may be provided in various sizes.

For example, the display unit 10 may include a first side 14 extending along the substantially vertical direction (Z direction), and a second side 15 spaced apart from the first side 14 and extending along the substantially vertical direction (Z direction). The first side 14 and the second side 15 may be spaced apart in the lateral direction (Y direction). The first side 14 and the second side 15 may be provided with short sides. For example, the display unit 10 may include a third side 16 extending along the substantially lateral direction (Y direction) and a fourth side 17 spaced apart from the third side 16 and extending along the substantially lateral direction (Y direction). The third side 16 may connect a lower end of the first side 14 and a lower end of the second side 15. The fourth side 17 may connect an upper end of the first side 14 and an upper end of the second side 15. The third side 16 and the fourth side 17 may be spaced apart in the up and down direction (Z direction). The third side 16 and the fourth side 17 may be provided with long sides. The ordinal numbers of "first", "second", and "third" do not limit the configuration of the first side 14, the second side 15, the third side 16, and the fourth side 17.

Based on the above mention, a first side 14*a* of the first display unit 10*a* may be adjacent to a second side 15*b* of the second display unit 10*b*. Based on the above mention, a second side 15*a* of the first display unit 10*a* may be adjacent to a first side 14*c* of the third display unit 10*c*.

The display unit 10 may receive content data including video signals and audio signals from various content sources and output video and audio corresponding to the video signals and the audio signals. For example, the display unit 10 may receive content data through a broadcast reception antenna or cable, receive content data from a content playback device, or receive content data from a content providing server of a content provider.

The display unit 10 may be configured to display a screen. The display unit 10 may include a display panel 11 provided to display an image on a front surface thereof. For example, the front surface of the display unit 10 may form a front surface of the display apparatus 1.

A screen display area may be formed on the front surface of the display panel 11. The screen may be displayed in front of the display panel 11. A plurality of pixels may be formed in the screen display area, and the screen displayed on the screen display area may be formed by a combination of light emitted from the plurality of pixels. For example, a single screen may be formed on the screen display area by combining light emitted from the plurality of pixels like a mosaic.

Each of the plurality of pixels may emit light of various brightnesses and colors. Particularly, each of the plurality of pixels may include sub-pixels. The sub-pixels may include a red sub-pixel capable of emitting red light, a green sub-pixel capable of emitting green light, and a blue sub-pixel capable of emitting blue light. Each of the plurality of pixels may emit light of various brightnesses and colors by combining the light emitted from the red sub-pixel, the green sub-pixel, and the blue sub-pixel.

The display panel 11 may be a self-luminous display panel such as an organic light-emitting diode (OLED) or a non-self-luminous display panel such as a liquid crystal display (LCD). There is no particular limitation on the type of display panel 11, and each display unit 10 may include various types of display panels 11.

When the display panel 11 is an LCD panel, the display panel 11 may include a thin film transistor substrate in which thin film transistors (TFTs) are formed in a matrix form, a color filter substrate coupled in parallel with the thin film transistor substrate, and a liquid crystal injected between the thin film transistor substrate and the color filter substrate and having optical properties that vary depending on changes in voltage or temperature. Additionally, a back light unit (BLU) (not shown) may be provided inside a case 12. The backlight unit may be disposed behind the display panel 11 to emit light toward the display panel 11. In this case, the display panel 11 may block or pass the light emitted from the backlight unit. However, the present disclosure is not limited thereto, and as described above, the display panel 11 may be a self-luminous display panel such as an OLED panel.

The first display unit 10*a* may include a first display panel 11*a*. The second display unit 10*b* may include a second display panel 11*b*. The third display unit 10*c* may include a third display panel 11*c*. However, the ordinal numbers of "first", "second", and "third" do not limit the configuration of the first display panel 11*a*, the second display panel 11*b*, and the third display panel 11*c*.

The display unit 10 may include the case 12 provided to accommodate the display panel 11. The case 12 may form at least part of the exterior of display unit 10. Components for the display unit 10 to display images or to perform various functions, such as the display panel 11 may be accommodated in the case 12.

The case 12 may be provided to support and/or fix the display panel 11. The case 12 may be provided to cover a rear surface of the display panel 11. For example, a rear surface of the case 12 may form a rear surface of the display apparatus 1.

For example, the case 12 may be provided in the form of an assembly in which a plurality of components is coupled.

The case 12 may be referred to as a chassis, frame, mold, cover, etc.

The first display unit 10*a* may include a first case 12*a*. The second display unit 10*b* may include a second case 12*b*. The third display unit 10*c* may include a third case 12*c*. However, the ordinal numbers of "first", "second", and "third" do not limit the configuration of the first case 12*a*, the second case 12*b*, and the third case 12*c*.

A port 18 provided to receive power and/or signals from the outside may be formed in one of the plurality of display units 10. For example, the port 18 may be formed at a rear 13*a* of the first display unit 10*a*. As will be described later, two display units 10 adjust to each other among the plurality of display units 10 may be electrically connected to each other through the connection bracket 20. As a result, the port 18 may not be formed in each of the plurality of display units 10. That is, the display unit 10*a*, in which the port 18 is formed, and the display unit 10*b* or 10*c*, in which the port 18 is not formed, may share power and/or signals through the connection bracket 20. As a result, the number of ports 18 and the number of cables connected to the port 18 may be reduced. The display apparatus 1 may have an elegant appearance. However, according to embodiments, the port 18 may be formed in each of the plurality of display units 10 or in some of the plurality of display units 10.

The display apparatus 1 may include the connection bracket 20. The connection bracket 20 may be configured to connect the display units 10 arranged adjacent to each other. The connection bracket 20 may be configured to electrically connect the display units 10 arranged adjacent to each other.

For example, when the display apparatus 1 includes the first display unit 10*a* and the second display unit 10*b*, the display apparatus 1 may include a connection bracket 20*a* provided to connect the first display unit 10*a* and the second display unit 10*b*. For example, when the display apparatus 1 includes the first display unit 10*a*, the second display unit 10*b*, and the third display unit 10*c*, the display apparatus 1 may include a connection bracket 20*b* provided to connect the first display unit 10*a*, the second display unit 10*b*, and the third display unit 10*c*.

Hereinafter for convenience of description, the connection bracket 20*a* may be referred to as a first connection bracket 20*a*, and the connection bracket 20*b* may be referred to as a second connection bracket 20*b*. The first connection bracket 20*a* and the second connection bracket 20*b* may include substantially the same configuration, and a description about one of the first connection bracket 20*a* and the second connection bracket 20*b* may also be applied to the other of the connection bracket 20*a* and the second connection bracket 20*b*. However, the ordinal numbers of "first" and "second" do not limit the configuration of the first connection bracket 20*a* and the second connection bracket 20*b*.

The number of connection brackets 20 may vary according to the number of display units 10. For example, the number of connection brackets 20 may be one less than the number of display units 10. It is illustrated that two connection brackets 20 are provided on the drawings, but the present disclosure is not limited thereto. For example, according to the number of the plurality of display units 10, one connection bracket 20 may be provided, or three or more connection brackets 20 may be provided.

The connection bracket 20 may be mountable on the display units 10 adjacent to each other. The connection bracket 20 may be removably coupled to a rear 13 of the display units 10 adjacent to each other. For example, the first connection bracket 20*a* may be mounted on the rear 13*a* of the first display unit 10*a* and a rear 13*b* of the second display unit 10*b*. For example, the second connection bracket 20*b* may be mounted on the rear 13*a* of the first display unit 10*a* and a rear 13*c* of the third display unit 10*c*.

The connection bracket 20 may be provided to cover a portion of the rear 13 of the display units 10 disposed adjacent to each other. The connection bracket 20 may be provided to cover adjacent sides of the display units 10 adjacent to each other. The connection bracket 20 may extend along adjacent sides of the display units 10 adjacent to each other.

The display apparatus 1 may include a position adjusting device 30. The position adjusting device 30 may be configured to adjust a position of at least one display unit 10. The position adjusting device 30 may be configured to slide and move at least one display unit 10. The position adjusting device 30 may be configured to adjust the relative positions between the display units 10 adjacent to each other. Among the display units 10 adjacent to each other, the position adjusting device 30 may be configured to adjust a position of one display unit relative to other display unit. The position adjusting device 30 may be configured to adjust a step difference between the plurality of display units 10.

At least a portion of the position adjusting device 30 may be arranged on the connection bracket 20. For example, the position adjusting device 30 may be formed on the connection bracket 20 (refer to FIGS. 1 to 12 and 23 to 35). For example, the position adjusting device 30 may be provided as a configuration of the connection bracket 20 (refer to FIGS. 1 to 12 and 23 to 35). For example, a portion of the position adjusting device 30 may be arranged on the connection bracket 20, and the remaining portion of the position adjusting device 30 may be formed on the display unit 10 to correspond to the portion of the position adjusting device 30 (refer to FIGS. 13 to 22).

For example, the position adjusting device 30 may include a position adjusting unit 30*a* for adjusting a position of the first display unit 10*a* with respect to the second display unit 10*b*. For example, the position adjusting device 30 may include a position adjusting unit 30*b* for adjusting a position of the second display unit 10*b* with respect to the first display unit 10*a*. For example, the position adjusting device 30 may include a position adjusting unit 30*c* for adjusting a position of the first display unit 10*a* with respect to the third display unit 10*c*. For example, the position adjusting device 30 may include a position adjusting unit 30*d* for adjusting a position of the third display unit 10*c* with respect to the first display unit 10*a*. For example, the position adjusting device 30 may include at least one of the position adjusting unit 30*a*, the position adjusting unit 30*b*, the position adjusting unit 30*c*, or the position adjusting unit 30*d*. Meanwhile, the number of position adjusting units may vary according to the number of display units 10.

Hereinafter for convenience of description, the position adjusting unit 30*a* may be referred to as the first position adjusting unit 30*a*, the position adjusting unit 30*b* may be referred to as the second position adjusting unit 30*b*, the position adjusting unit 30*c* may be referred to as the third position adjusting unit 30*c*, and the position adjusting unit 30*d* may be referred to as the fourth position adjusting unit 30*d*. The first to fourth position adjusting units 30*a*, 30*b*, 30*c*, and 30*d* may include substantially the same configuration. A description about one of the first to fourth position adjusting devices 30*a*, 30*b*, 30*c*, and 30*d* may also be applied to the rest of the first to fourth position adjusting devices 30*a*, 30*b*, 30*c*, and 30*d*. However, the ordinal numbers of "first", "second", "third", and "fourth" do not limit the configuration of the first position adjusting unit 30*a*, the second position adjusting unit 30*b*, the third position adjusting unit 30*c*, and the fourth position adjusting unit 30*d*.

The display apparatus 1 may include a support member 50 for supporting at least one display unit 10. For example, the support member 50 may be provided to support the first display unit 10*a*. However, the present disclosure is not limited thereto. For example, the support member 50 may be provided to support the second display unit 10*b* and/or the third display unit 10*c*. Alternatively, the display apparatus 1 may not include the support member 50. The plurality of display units 10 may be placed on the floor.

Figure 3:
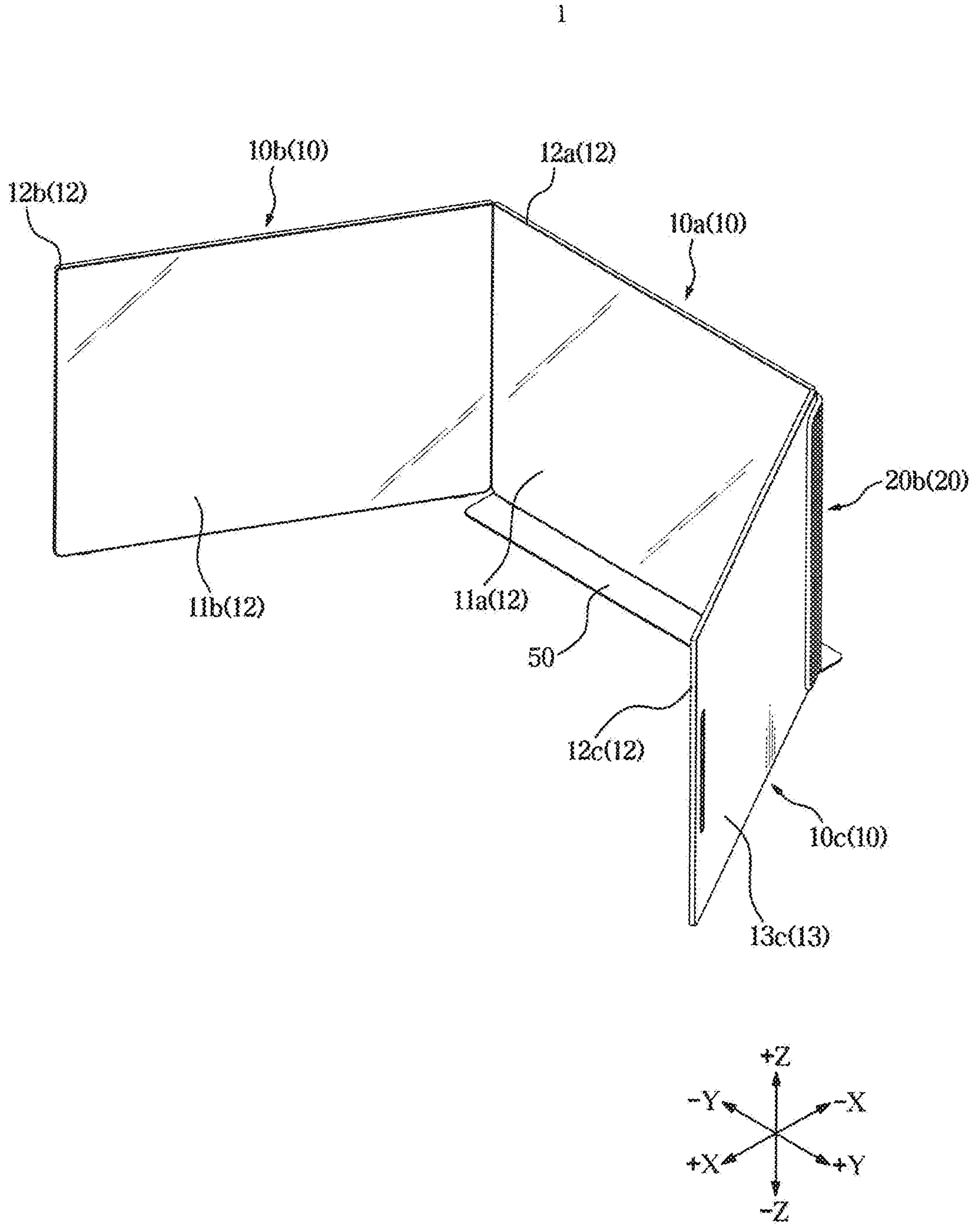
FIG. 3 is a perspective view illustrating an example of the display apparatus shown in FIG. 1 in a folded state.
Figure 4:
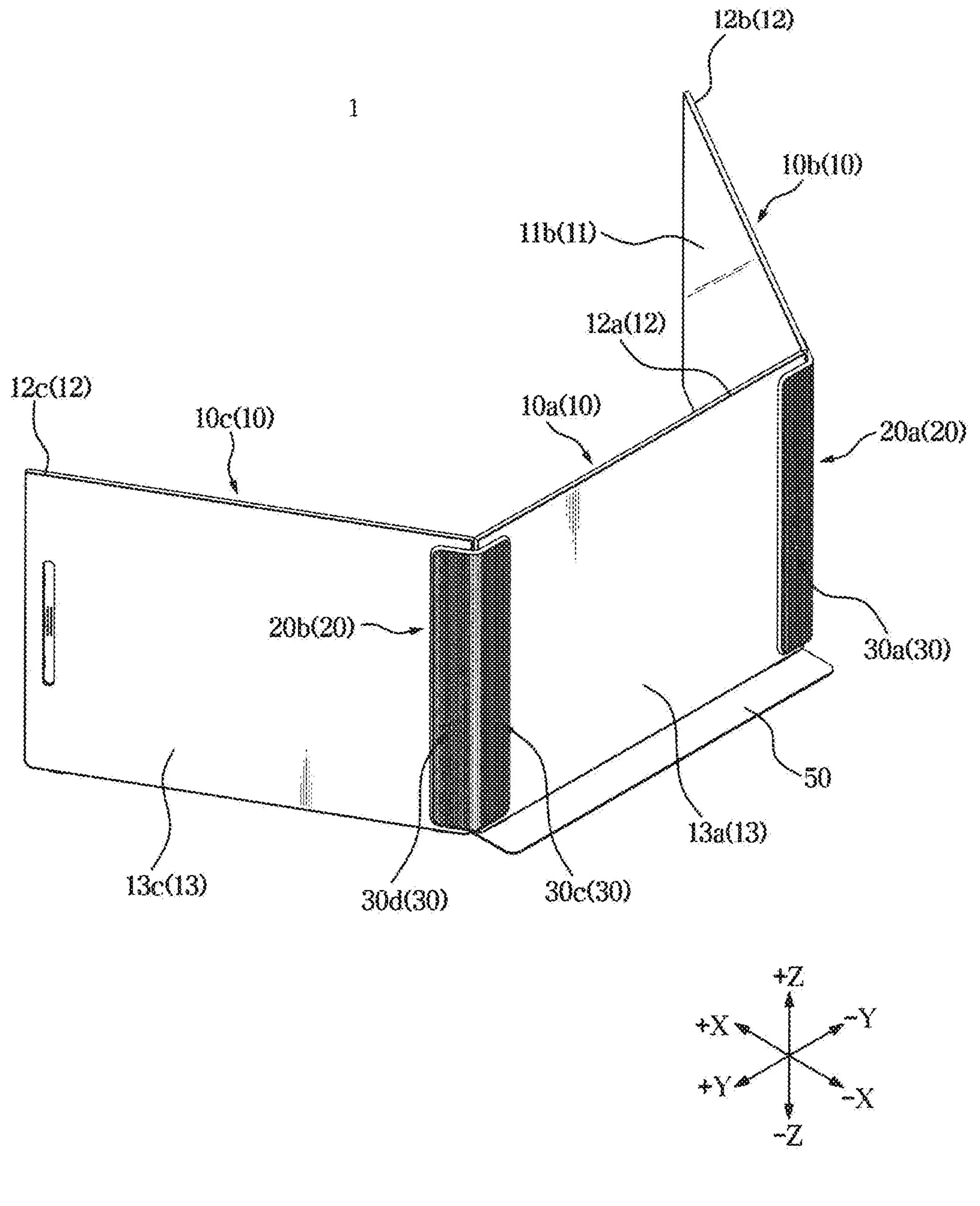
FIG. 4 is a rear perspective view of the display apparatus shown in FIG. 3.

FIG. 3 is a perspective view illustrating an example of the display apparatus shown in FIG. 1 in a folded state. FIG. 4 is a rear perspective view of the display apparatus shown in FIG. 3.

An angle between the display units 10 adjacent to each other among the plurality of display units 10 may vary. The display units 10 adjacent to each other among the plurality of display units 10 may be arranged to be foldable and/or tiltable.

The display units 10 adjacent to each other may be arranged to be foldable and/or tiltable by a hinge 22 of the connection bracket 20. An angle between the display units 10 adjacent to each other may be adjusted by the hinge 22 of the connection bracket 20. For example, a hinge of the first connection bracket 20*a* may adjust an angle between the first display unit 10*a* and the second display unit 10*b*. For example, a hinge of the second connection bracket 20*b* may adjust an angle between the first display unit 10*a* and the third display unit 10*c*. For example, the hinge 22 may be provided to be flexible.

On the drawing, it is illustrated that the second display unit 10*b* is folded and/or tilted within a predetermined range with respect to the first display unit 10*a*, and the third display unit 10*c* is folded and/or tilted within a predetermined range with respect to the first display unit 10*a*. However, the present disclosure is not limited thereto. Alternatively, the first display unit 10*a* may be folded and/or tilted within a predetermined range with respect to the second display unit 10*b*. Alternatively, the first display unit 10*a* may be folded and/or tilted within a predetermined range with respect to the third display unit 10*c*.

Even when at least some of the plurality of display units 10 is folded and/or tilted with respect to the rest of the plurality of display units 10 as illustrated in FIGS. 3 and 4, the position adjusting device 30 may adjust the position of at least one display unit 10. For example, even when at least some of the plurality of display units 10 is folded and/or tilted with respect to the rest of the plurality of display units 10, the position adjusting device 30 may slide at least one display unit 10. For example, even when the second display unit 10*b* is folded and/or tilted with respect to the first display unit 10*a*, the first position adjusting unit 30*a* may adjust the position of the first display unit 10*a* with respect to the second display unit 10*b*, and the second position adjusting unit 30*b* may adjust the position of the second display unit 10*b* with respect to the first display unit 10*a*.

Figure 5:
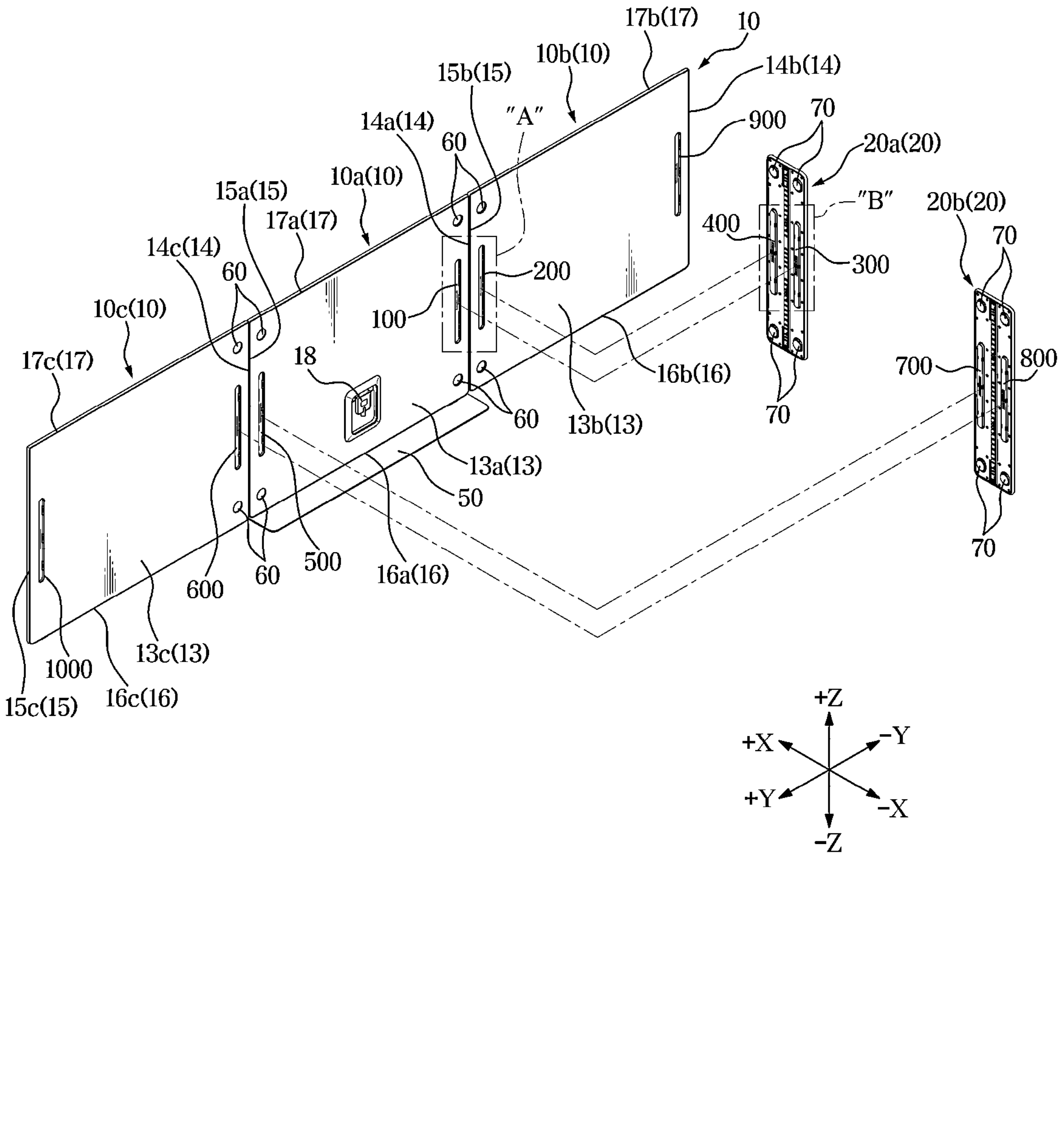
FIG. 5 is an exploded view of a portion of the display apparatus shown in FIG. 1.
Figure 6:
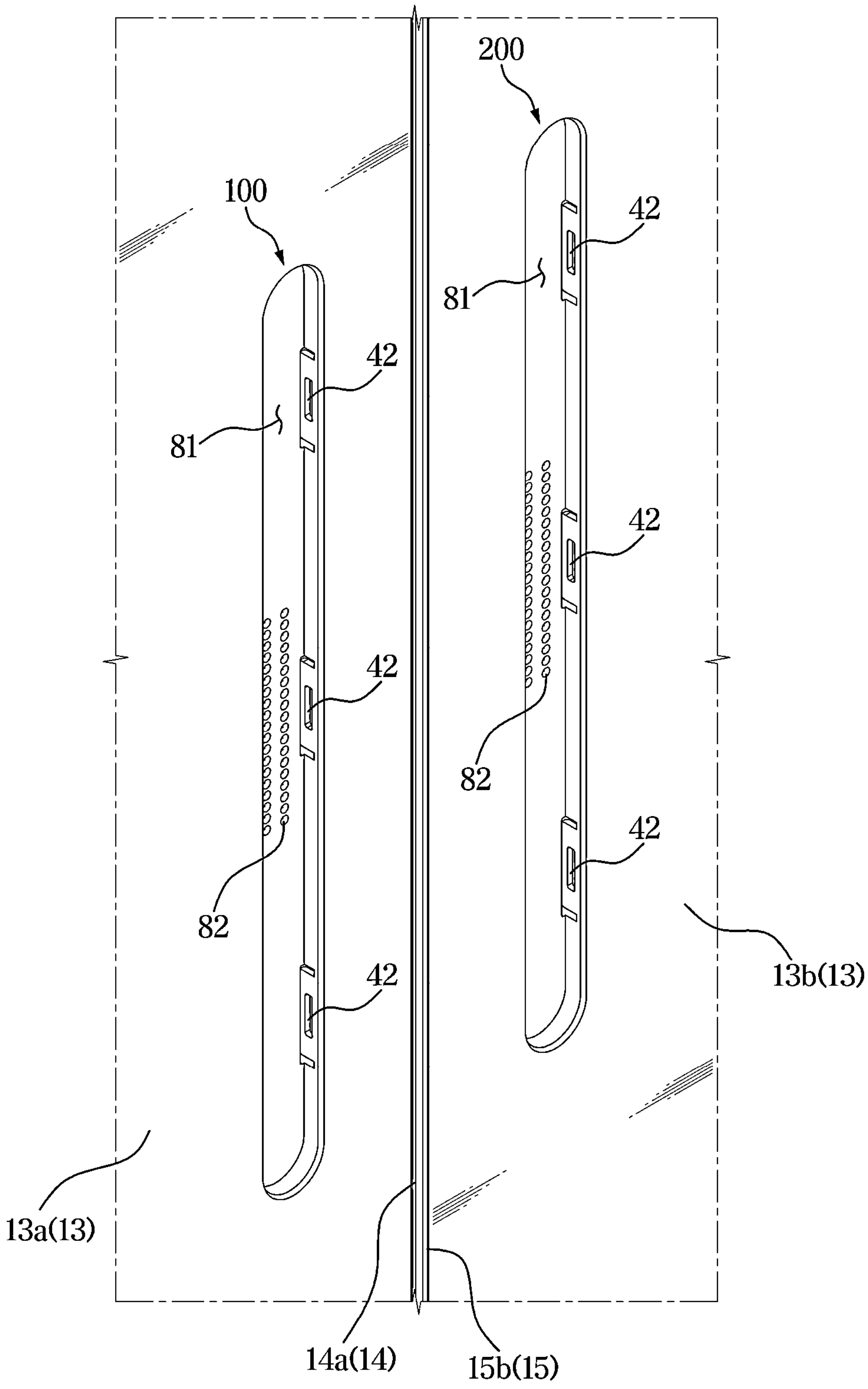
FIG. 6 is an enlarged view of part A shown in FIG. 5.
Figure 7:
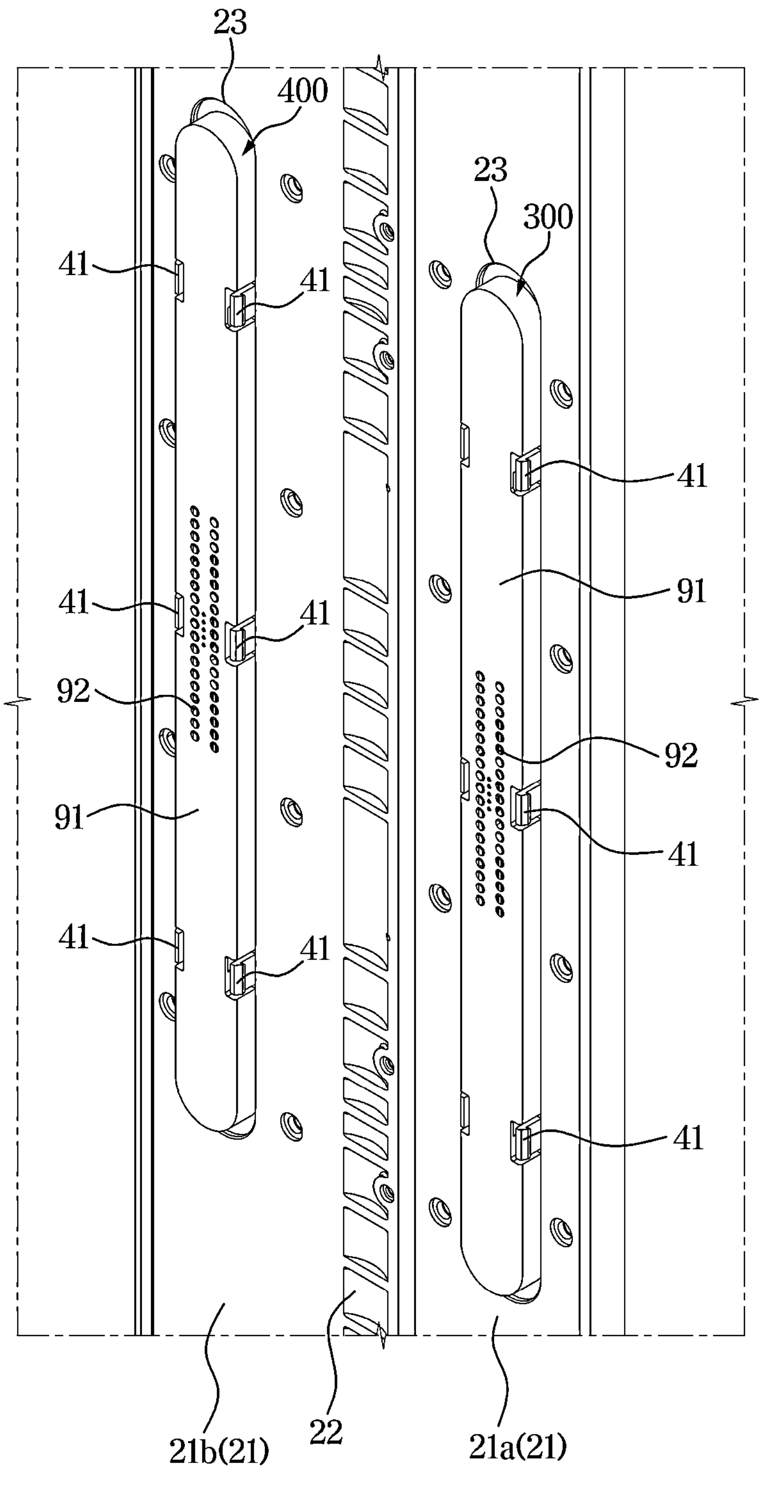
FIG. 7 is an enlarged view of part B shown in FIG. 5.
Figure 8:
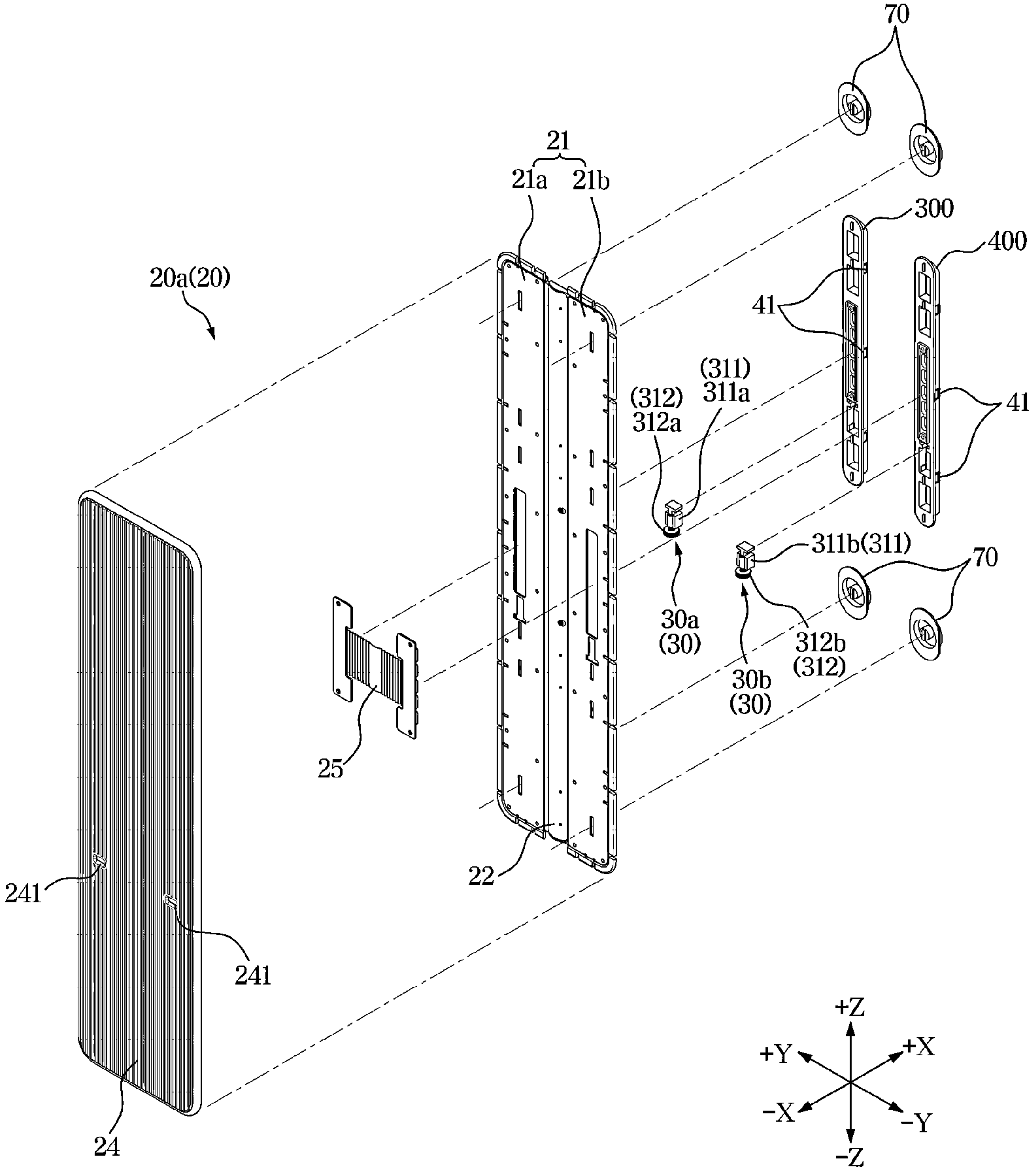
FIG. 8 is an exploded view of an example of a connection bracket shown in FIG. 1.

FIG. 5 is an exploded view of a portion of the display apparatus shown in FIG. 1. FIG. 6 is an enlarged view of part A shown in FIG. 5. FIG. 7 is an enlarged view of part B shown in FIG. 5. FIG. 8 is an exploded view of an example of a connection bracket shown in FIG. 1.

Each of the plurality of display units 10 may include at least one connector. The at least one connector may be formed at the rear 13 of each of the plurality of display units 10. For example, the display unit 10 may include two adjacent connectors adjacent to both sides 14 and 15. For example, the display unit 10 may include two connectors extending along each of both sides 14 and 15. As will be described later, at least some of the plurality of display units 10 may include four connectors extending along each of all sides 13, 14, 15, and 16 (refer to FIGS. 29, 30, 32, and 33 and 34).

The connection bracket 20 may include a connector corresponding to each connector of the display units 10 adjacent to each other. The connection bracket 20 may include a connector configured to be electrically connected to each connector of the display units 10 adjacent to each other.

For example, the connector of the display unit 10 and the connector of the connection bracket 20 may be connected using a pogo pin method. However, this is only an example, and the connector of the display unit 10 and the connector of the connection bracket 20 may be electrically connected through various known methods.

Meanwhile, connectors 100, 200, 500, 600, 900 and/or 1000 formed on the display unit 10 may be referred to as display side connectors 100, 200, 500, 600, 900 and/or 1000. Connectors 300, 400, 700 and/or 800 formed on the connection bracket 20 may be referred to as bracket side connectors 300, 400, 700 and/or 800.

Hereinafter an example in which the display apparatus 1 includes the first display unit 10*a* and the second display unit 10*b* will be described. A content about the first display unit 10*a* and the second display unit 10*b* corresponds to an example of a content about display units adjacent to each other among the plurality of display units 10. Accordingly, a content about the first display unit 10*a*, the second display unit 10*b*, and the connection bracket 20*a* may be also applied to the first display unit 10*a*, the third display unit 10*c*, and the connection bracket 20*b*, and a detail description thereof will be omitted.

The first display unit 10*a* may include a first connector 100. The first connector 100 may be formed at the rear 13*a* of the first display unit 10*a*. For example, the first connector 100 may be disposed adjacent to the first side 14*a* of the first display unit 10*a*. For example, the first connector 100 may have a shape extending along a substantially vertical direction (Z direction).

The second display unit 10*b* may include a second connector 200. The second connector 200 may be formed at the rear 13*b* of the second display unit 10*b*. For example, the second connector 200 may be disposed adjacent to the second side 15*b* of the second display unit 10*b*. For example, the second connector 200 may have a shape extending along the substantially vertical direction (Z direction).

The connection bracket 20*a* may be mountable on the first display unit 10*a* and the second display unit 10*b*. The connection bracket 20*a* may be removably mounted on the rear 13*a* of the first display unit 10*a* and the rear 13*b* of the second display unit 10*b*.

The connection bracket 20*a* may be configured to electrically connect the first display unit 10*a* and the second display unit 10*b*.

The connection bracket 20*a* may include a third connector 300 configured to be electrically connected to the first connector 100. The third connector 300 may have a shape corresponding to the first connector 100.

The connection bracket 20*a* may include a fourth connector 400 configured to be electrically connected to the second connector 200. The fourth connector 400 may have a shape corresponding to the second connector 200.

The third connector 300 and the fourth connector 400 of the connection bracket 20*a* may be electrically connected to each other. For example, the third connector 300 and the fourth connector 400 may be electrically connected through an electronic circuit, a cable 25 (refer to FIG. 8), etc.

As the connection bracket 20*a* is mounted on the first display unit 10*a* and the second display unit 10*b*, the first connector 100 and the third connector 300 may be electrically connected, and the second connector 200 and the fourth connector 400 may be electrically connected. Accordingly, the first display unit 10*a* and the second display unit 10*b* may exchange power and/or signals with each other through the connection bracket 20*a*.

An example in which the display apparatus 1 includes the first display unit 10*a*, the second display unit 10*b*, and the third display unit 10*c* will be described. As described above, a content about the first display unit 10*a*, the second display unit 10*b*, and the connection bracket 20*a* may be applied to the first display unit 10*a*, the third display unit 10*c*, and the connection bracket 20*b*, and a description the same as the above description will be omitted.

The first display unit 10*a* may include a fifth connector 500. The fifth connector 500 may be formed at the rear 13*a* of the first display unit 10*a*. The fifth connector 500 may be spaced apart from the first connector 100 in the lateral direction (Y direction). The fifth connector 500 may be arranged closer to the second side 15*a* of the first display unit 10*a* than the first connector 100. For example, the fifth connector 500 may have a shape extending along the substantially vertical direction (Z direction).

The third display unit 10*c* may include a sixth connector 600. The sixth connector 600 may be formed at the rear 13*c* of the third display unit 10*c*. The sixth connector 600 may be disposed adjacent to the first side 14*c* of the third display unit 10*c*. For example, the sixth connector 600 may have a shape extending along the substantially vertical direction (Z direction).

The connection bracket 20*b* may be mountable on the first display unit 10*a* and the third display unit 10*c*. The connection bracket 20*b* may be removably mounted on the rear 13*a* of the first display unit 10*a* and the rear 13*c* of the third display unit 10*c*.

The connection bracket 20*b* may be configured to electrically connect the first display unit 10*a* and the third display unit 10*c*.

The connection bracket 20*b* may include a seventh connector 700 configured to be electrically connected to the fifth connector 500. The seventh connector 700 may have a shape corresponding to the fifth connector 500.

The connection bracket 20*b* may include an eighth connector 800 configured to be electrically connected to the sixth connector 600. The eighth connector 800 may have a shape corresponding to the sixth connector 600.

The seventh connector 700 and the eighth connector 800 of the connection bracket 20*b* may be electrically connected to each other. For example, the seventh connector 700 and the eighth connector 800 may be electrically connected through an electronic circuit, a cable 25 (refer to FIG. 8), etc.

As the connection bracket 20*b* is mounted on the first display unit 10*a* and the third display unit 10*c*, the fifth connector 500 and the seventh connector 700 may be electrically connected, and the sixth connector 600 and the eighth connector 800 may be electrically connected. As a result, the first display unit 10*a* and the third display unit 10*c* may exchange power and/or signals with each other through the connection bracket 20*b*.

Meanwhile, the second display unit 10*b* may include a ninth connector 900. The ninth connector 900 may be formed at the rear 13*b* of the second display unit 10*b*. The ninth connector 900 may be spaced apart from the second connector 200 with respect to the lateral direction (Y direction). The ninth connector 900 may be disposed closer to the first side 14*b* of the second display unit 10*b* than the second connector 200. For example, the ninth connector 900 may have a shape extending along the substantially vertical direction (Z direction). For example, the ninth connector 900 may be covered by a connector cover (not shown) so as not to be exposed to the outside.

The third display unit 10*c* may include a tenth connector 1000. The tenth connector 1000 may be formed at the rear 13*c* of the third display unit 10*c*. The tenth connector 1000 may be spaced apart from the sixth connector 600 with respect to the lateral direction (Y direction). The tenth connector 1000 may be disposed closer to the second side 15*c* of the third display unit 10*c* than the sixth connector 600. For example, the tenth connector 1000 may have a shape extending along the substantially vertical direction (Z direction). For example, the tenth connector 1000 may be covered by a connector cover (not shown) so as not to be exposed to the outside.

An example of the display side connector will be described with reference to FIG. 6. A content about the first connector 100 and the second connector 100 shown in FIG. 6 may also be applied to the fifth connector 500, the sixth connector 600, the ninth connector 900, and the tenth connector 1000.

The display side connector may include a connector body 81 and a connector terminal 82 formed on the connector body 81. For example, the connector body 81 may have a shape recessed from the rear 13 of the display unit 10. For example, the connector terminal 82 may be formed of a conductive material to transmit electrical signals and/or current.

The display side connector may include a connector hook groove 42. The connector hook groove 42 may be coupled to a connector hook 41 of the bracket side connector, which will be described later. As a result, the display side connector and the bracket side connector corresponding to each other may be connected more stably. For example, at least one connector hook groove 42 may be provided.

An example of the bracket side connector will be described with reference to FIG. 7. A content of the third connector 300 and the fourth connector 400 shown in FIG. 7 may also be applied to the seventh connector 700 and the eighth connector 800.

The bracket side connector may include a connector body 91 and a connector terminal 92 formed on the connector body 91. The connector body 91 may have a shape corresponding to the connector body 81. For example, the connector body 91 may have a shape that protrudes from the panel 21 of the connection bracket 20. However, the present disclosure is not limited thereto, and the connector body 81 of the display side connector may have a shape that protrudes toward the connector body 91 of the bracket side connector, and the connector body 91 of the bracket side connector may have a recessed shape to correspond to the connector body 81 of the display side connector. For example, the connector terminal 92 may be formed of a conductive material to transmit electrical signals and/or current. For example, the connector terminal 92 may be provided to be in contact with the connector terminal 81.

The bracket side connector may include the connector hook 41. The connector hook 41 may be coupled to the connector hook groove 42. As a result, the display side connector and the bracket side connector, which correspond to each other, may be connected more stably. For example, at least one connector hook 41 may be provided. Meanwhile, contrary to the drawing, the display side connector may include a connector hook, and the bracket side connector may include a connector hook groove.

As described above, the display side connector and the bracket side connector may have shapes that correspond to each other. Accordingly, the connection bracket 20 may be easily mounted on the plurality of display units 10. The connection bracket 20 may be accurately mounted on the plurality of display units 10. Additionally, the coupling force between the bracket side connector and the display side connector may be increased.

The ordinal numbers of "first", "second", "third", "fourth", "fifth", "sixth", "seventh", "eighth", "ninth", and "tenth" do not limit the configuration of the first connector 100, the second connector 200, the third connector 300, the fourth connector 400, the fifth connector 500, the sixth connector 600, the seventh connector 700, the eighth connector 800, the ninth connector 900, and the tenth connector 1000.

In the related art, when a display apparatus includes a plurality of display units, a cable may be needed for electrical connection between the plurality of display units. However, a work for connecting cables between the plurality of display units may be complicated. The cable connections between the plurality of display units may impair the aesthetics of the display apparatus.

In comparison with the related art, according to the present disclosure, a separate cable may not be needed for electrical connection between the plurality of display units 10. The display units adjacent to each other among the plurality of display units 10 may be electrically connected to each other through the connection bracket 20. By simply attaching the connection bracket 20 to the display units 10 adjacent to each other, the display units 10 adjacent to each other may be electrically connected to each other. That is, a cable connection work may be omitted, and the electrical connection between the plurality of display units 10 may be easily made. The connection bracket 20 may include the connectors 300, 400, 700, and/or 800 for electrical connection between the plurality of display units 10. The aesthetics of the display apparatus 1 may be improved.

At least one of the plurality of display units 10 may include a first coupler 60, and the connection bracket 20 may include a second coupler 70 provided to be coupled to the first coupler 60. For example, when the display apparatus 1 includes the first display unit 10*a* and the second display unit 10*b*, at least one of the first display unit 10*a* or the second display unit 10*b* may include the first coupler 60, and the connection bracket 20*a* may include the second coupler 70 corresponding to the coupler 60.

As the first coupler 60 and the second coupler 70 are coupled, the coupling force between the display units 10 adjacent to each other and the connection bracket 20 may be increased. Accordingly, the connection bracket 20 may not be easily separated from the display units 10 adjacent to each other. The electrical connection between the display units 10 adjacent to each other and the connection brackets 20 may not be easily broken.

For example, each of the first coupler 60 and the second coupler 70 may be formed of a magnetic material. For example, an attractive force may act between the first coupler 60 and the second coupler 70. For example, each of the first coupler 60 and the second coupler 70 may include an electropermanent magnet, and as a current is supplied between the first coupler 60 and the second coupler 70, the first coupler 60 and the second coupler 70 may be separated. Alternatively, each of the first coupler 60 and the second coupler 70 may include an electromagnet, and as a current between the first coupler 60 and the second coupler 70 is blocked, the first coupler 60 and the second coupler 70 may be separated. Alternatively, the first coupler 60 and the second coupler 70 may be coupled by a separate fastening member (e.g., screw, etc.). Alternatively, the first coupler 60 and the second coupler 70 may be coupled by having shapes that correspond to each other. For example, one of the first coupler 60 and the second coupler 70 may include a hook, and the other of the first coupler 60 and the second coupler 70 may include a hook groove (or hook hole) provided to be locked to the hook. However, the present disclosure is not limited to the above-described examples, and the first coupler 60 and the second coupler 70 may be coupled through various known methods.

An example of the connection bracket will be described with reference to FIG. 8. A content about the connection bracket 20*a* shown in FIG. 8 may also be applied to the connection bracket 20*b*. Accordingly, the connection bracket 20*b* may include substantially the same configuration as that of the connection bracket 20*a* described below.

The connection bracket 20*a* may include a first panel 21*a* disposed at the rear 13*a* of the first display unit 10*a* and a second panel 21*b* disposed at the rear 13*b* of the second display unit 10*b*. For example, the first panel 21*a* and the second panel 21*b* may be provided as a pair. For example, the first panel 21*a* may have a shape extending along the direction in which the first connector 100 extends. For example, the first panel 21*a* may extend along the substantially vertical direction (Z direction). For example, the third connector 300 may protrude from the first panel 21*a*. For example, the second panel 21*b* may have a shape extending along the direction in which the second connector 200 extends. For example, the second panel 21*b* may extend along the substantially vertical direction (Z direction). For example, the fourth connector 400 may protrude from the second panel 21*b*.

The connection bracket 20*a* may include the hinge 22. The hinge 22 may be provided to be rotatable between the first panel 21*a* and the second panel 21*b*. The hinge 22 may be provided to slide between the first panel 21*a* and the second panel 21*b*. In a state in which the connection bracket 20*a* is mounted on the first display unit 10*a* and the second display unit 10*b*, the hinge 22 may adjust an angle between the first display unit 10*a* and the second display unit 10*b*. In a state in which the first connector 100 and the third connector 300 are connected and the second connector 200 and the fourth connector 400 are connected, the hinge 22 may adjust an angle between the first display unit 10*a* and the second display unit 10*b*.

The connection bracket 20*a* may include at least one connector rail 23 (refer to FIG. 7). The connectors 300 and/or 400 formed on the connection bracket 20*a* may move along the connector rail 23. For example, the connectors 300 and/or 400 formed on the connection bracket 20*a* may be slidably coupled to the connector rail 23. For example, the connector rail 23 may be formed on each of the first panel 21*a* and the second panel 21*b* of the connection bracket 20*a*.

The connection bracket 20*a* may include the cable 25. The cable 25 may be configured to electrically connect the third connector 300 and the fourth connector 400. For example, the cable 25 may be provided to be flexible.

The connection bracket 20*a* may include a cover member 24. The cover member 24 may be provided to cover the panel 21 of the connection bracket 20*a*. The cover member 24 may be removably coupled to the panel 21 of the connection bracket 20*a*. The cover member 24 may prevent the cable 25 from being exposed to the outside of the connection bracket 20*a*. For example, the cover member 24 may include a flexible material.

For example, the cover member 24 may include an opening 241. The opening 241 may be provided to expose at least a portion of the position adjusting device 30. Accordingly, a user or the like can access the position adjusting device 30 disposed inside the connection bracket 20 through the opening 241 of the cover member 24.

The position adjusting device 30 may be disposed on the connection bracket 20*a*. The position adjusting device 30 may be accommodated inside the connection bracket 20*a*. The position adjusting device 30 may be provided to be in contact with at least one connector 300 and/or 400 formed on the connection bracket 20*a*. For example, the position adjusting device 30 may be provided as a configuration of the connection bracket 20*a*. For example, the first position adjusting unit 30*a* and the second position adjusting unit 30*b* may be provided as a configuration of the connection bracket 20*a*.

In the state in which the connection bracket 20*a* is mounted on the first display unit 10*a* and the second display unit 10*b*, the position adjusting device 30 may move at least one of the first display unit 10*a* or the second display unit 10*b*. While the first connector 100 and the third connector 300 are connected and the second connector 200 and the fourth connector 400 are connected, the position adjusting device 30 may move at least one of the first display unit 10*a* or the second display unit 10*b*. While the first connector 100 and the third connector 300 are connected and the second connector 200 and the fourth connector 400 are connected, the position adjusting device 30 may slide at least one of the third connector 300 or the fourth connector 400. For example, while the first connector 100 and the third connector 300 are connected and the second connector 200 and the fourth connector 400 are connected, the first position adjusting unit 30*a* may adjust the position of the first display unit 10*a* with respect to the second display unit 10*b*. For example, the first position adjusting unit 30*a* may be configured to slide the third connector 300. For example, while the first connector 100 and the third connector 300 are connected and the second connector 200 and the fourth connector 400 are connected, the second position adjusting unit 30*b* may adjust the position of the second display unit 10*b* with respect to the first display unit 10*a*. For example, the second position adjusting unit 30*b* may slide the fourth connector 400. A detailed description of this will be provided later.

Figure 9:
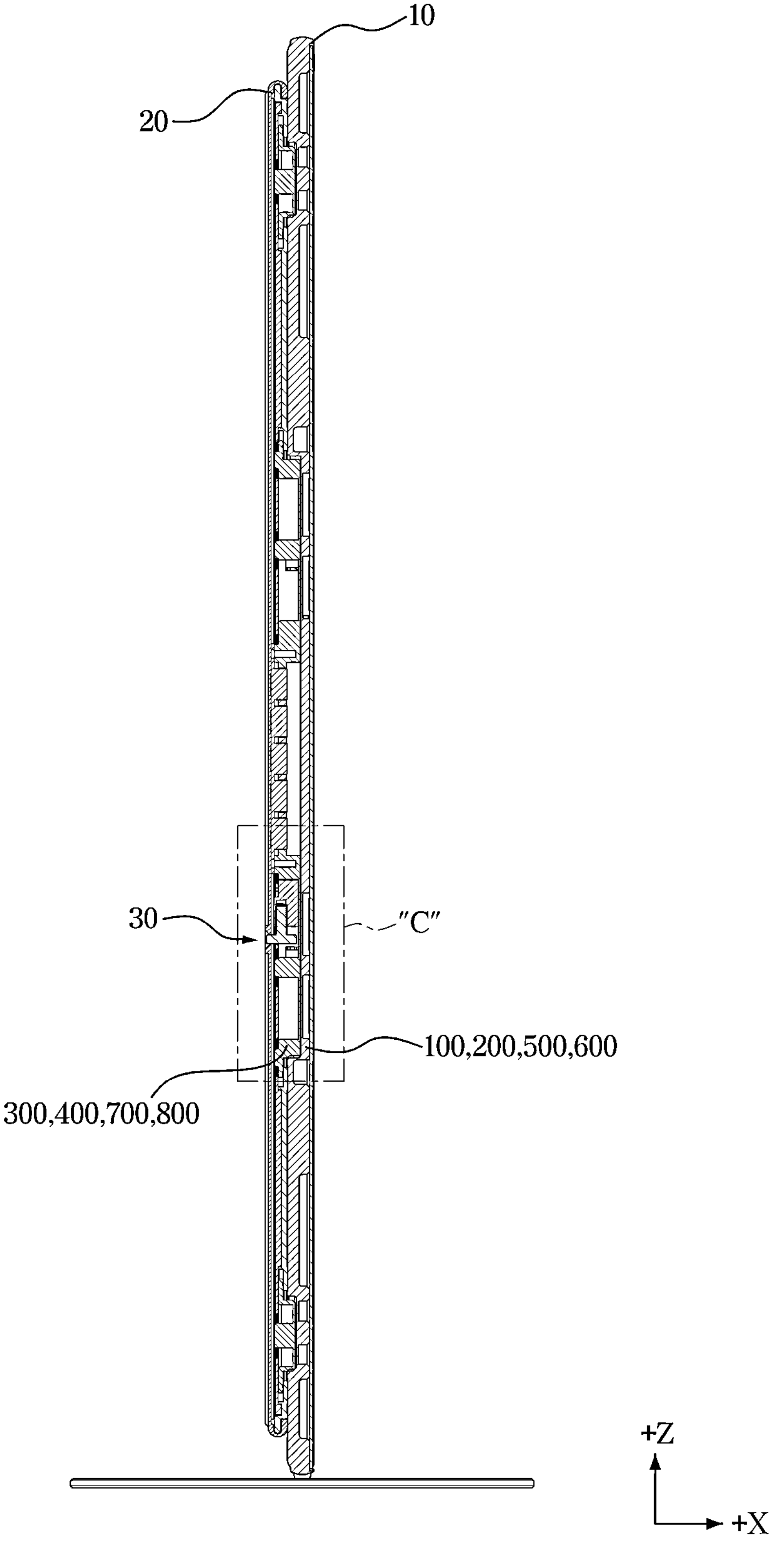
FIG. 9 is a side cross-sectional view of the display apparatus shown in FIG. 1.
Figure 10:
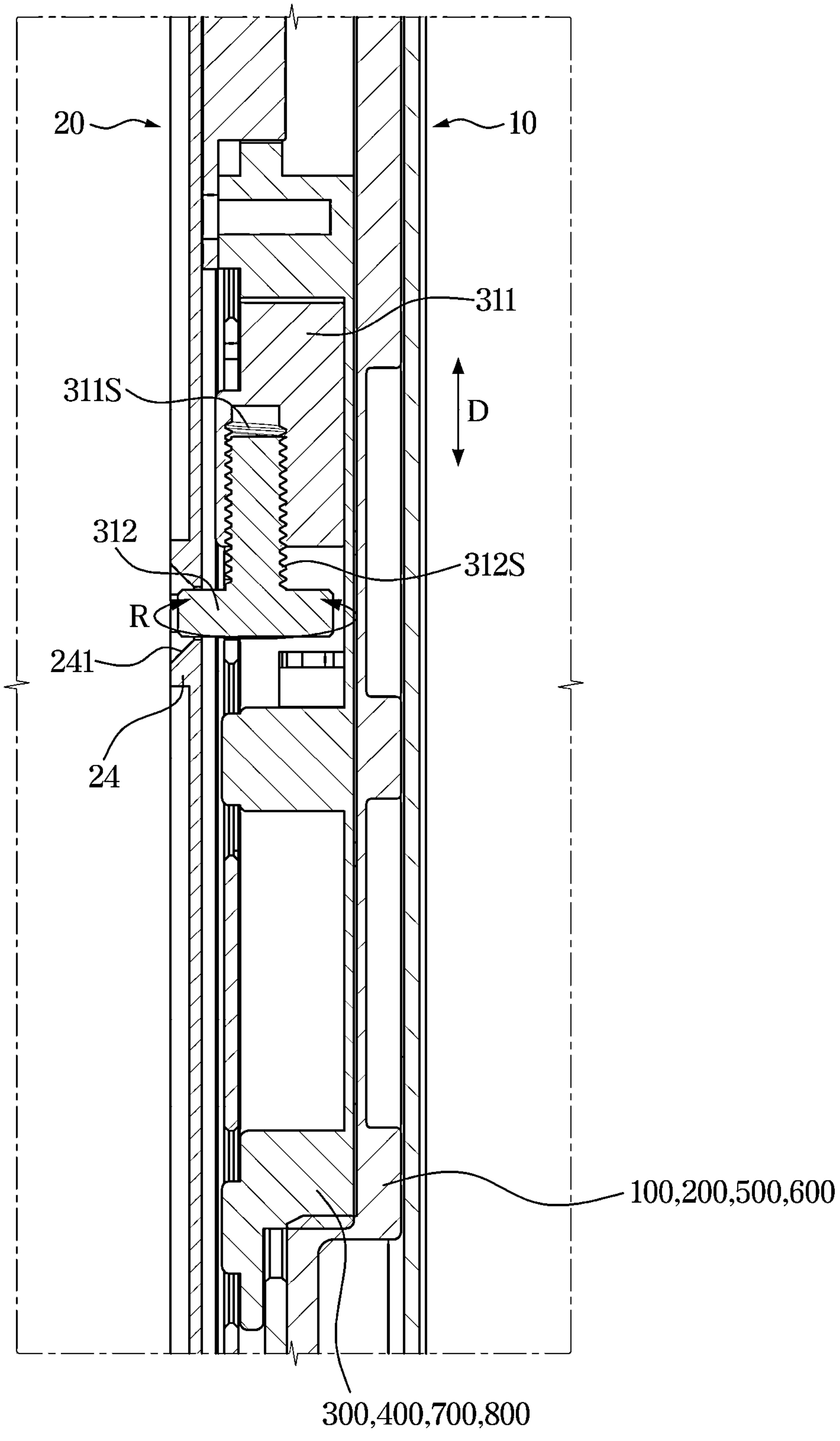
FIG. 10 is an enlarged view of part C shown in FIG. 9.
Figure 11:
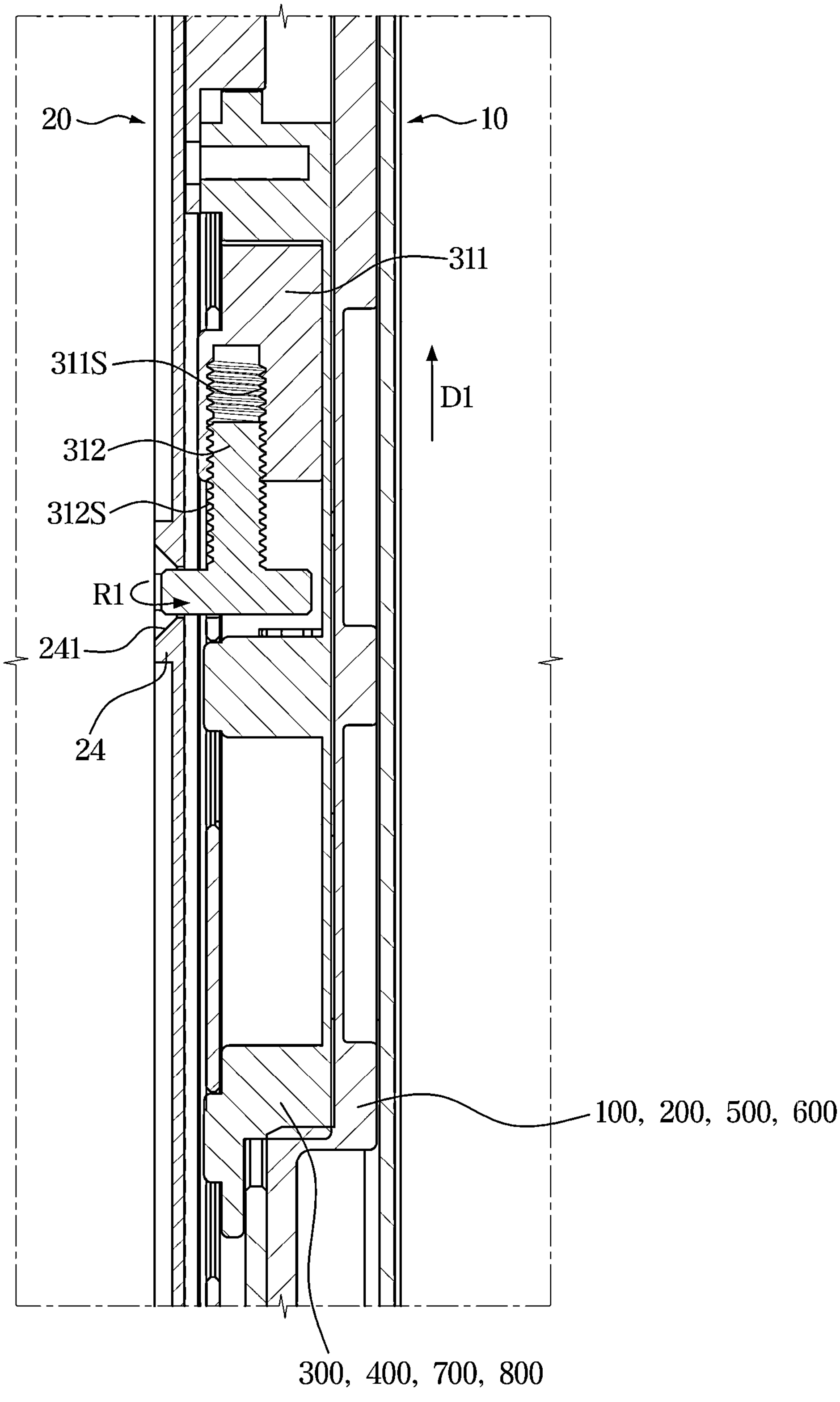
FIG. 11 illustrates an example in which a display unit shown in FIG. 10 moves upward.
Figure 12:
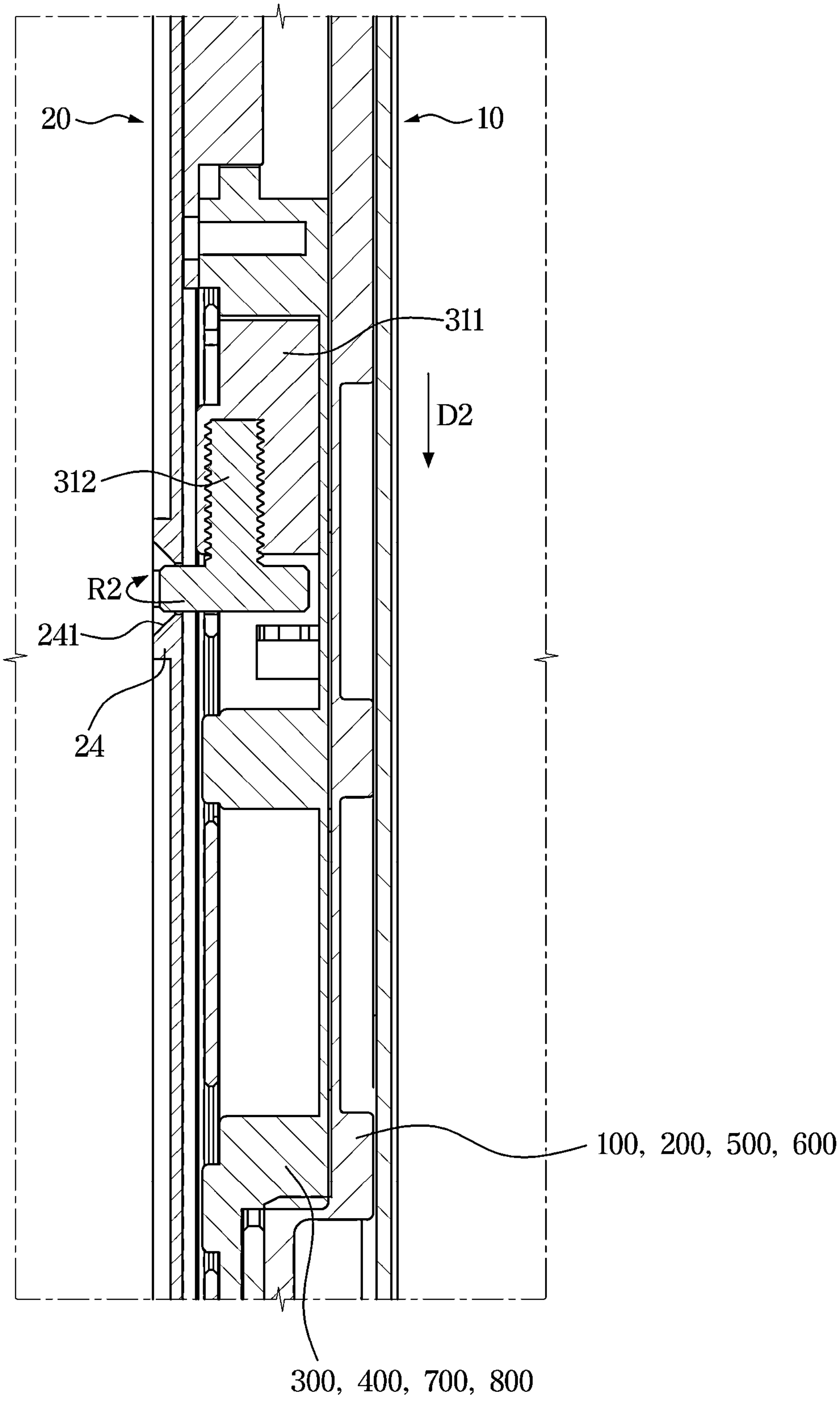
FIG. 12 illustrates an example in which the display unit shown in FIG. 10 moves downward.

FIG. 9 is a side cross-sectional view of the display apparatus shown in FIG. 1. FIG. 10 is an enlarged view of part C shown in FIG. 9. FIG. 11 illustrates an example in which a display unit shown in FIG. 10 moves upward. FIG. 12 illustrates an example in which the display unit shown in FIG. 10 moves downward.

An example of the position adjusting device 30 will be described with reference to FIGS. 9 to 12. A description about components and operations of the position adjusting device described with reference to FIGS. 9 to 12 may be applied to at least one of the position adjusting units 30*a*, 30*b*, 30*c*, and/or 30*d* constituting the position adjusting device 30.

The position adjusting device 30 may include a guide block 311. The guide block 311 may be fixed to at least one connector of the connection bracket 20 inside the connection bracket 20. The guide block 311 may be configured to be move in the up and down direction (Z direction).

For example, when the position adjusting device 30 includes the position adjusting unit 30*a*, the position adjusting device 30 may include a guide block 311*a* (refer to FIG. 8) fixed to the third connector 300 inside the connection bracket 20. For example, when the position adjusting device 30 includes the position adjusting unit 30*b*, the position adjusting device 30 may include a guide block 311*b* (refer to FIG. 8) fixed to the fourth connector 400 inside the connection bracket 20. For example, when the position adjusting device 30 includes the position adjusting unit 30*c*, the position adjusting device 30 may include a guide block 311 fixed to the seventh connector 700. For example, when the position adjusting device 30 includes the position adjusting unit 30*d*, the position adjusting device 30 may include a guide block 311 fixed to the eighth connector 800.

The position adjusting device 30 may include a guide screw 312 rotatably coupled to the guide block 311. The guide screw 312 may be configured to move the guide block 311 in the up and down direction (Z direction). As the guide screw 312 rotates with respect to the guide block 311, the guide block 311 may move in the vertical direction (Z direction). As the guide screw 312 rotates with respect to the guide block 311, the guide block 311 may move upward D1 (+Z direction) or downward D2 (−Z direction). For example, the guide screw 312 may be screwed to the guide block 311. A thread 312S of the guide screw 312 may be engaged with a thread 311S of the guide block 311.

At least a portion of the guide screw 312 may be exposed to the outside of the connection bracket 20. For example, at least a portion of the guide screw 312 may be exposed to the outside of the connection bracket 20 through the opening 241 of the cover member 24. A user or the like can apply a rotational force to the guide screw 312 exposed to the outside of the connection bracket 20.

For example, when the position adjusting device 30 includes the position adjusting unit 30*a*, the position adjusting device 30 may include a guide screw 312*a* (refer to FIG. 8) rotatably coupled to a guide block 311*a* (refer to FIG. 8) fixed to the third connector 300 so as to move the guide block 311*a* to the up and down direction. For example, when the position adjusting device 30 includes the position adjusting unit 30*b*, the position adjusting device 30 may include a guide screw 312*b* (refer to FIG. 8) rotatably coupled to a guide block 311*b* (refer to FIG. 8) fixed to the fourth connector 400 so as to move the guide block 311*b* to the up and down direction. For example, when the position adjusting device 30 includes the position adjusting unit 30*c*, the position adjusting device 30 may include a guide screw 312 rotatably coupled to a guide block 311 fixed to the seventh connector 700 so as to move the guide block 311 to the up and down direction. For example, when the position adjusting device 30 includes the position adjusting unit 30*d*, the position adjusting device 30 may include a guide screw 312 rotatably coupled to a guide block 311 fixed to the eighth connector 800 so as to move the guide block 311 to the up and down direction.

Referring to FIG. 10, the position adjusting device 30 may be configured to convert a rotational movement R caused by the rotational force applied to the position adjusting device 30 into a linear movement D for at least one display unit 10. For example, the position adjusting device 30 may convert the rotational movement R of the guide screw 312 into the linear movement of the guide block 311. For example, the position adjusting device 30 may convert the rotational movement of the guide screw 312 into the vertical movement of the guide block 311. For example, a direction of a rotation axis of the guide screw 312 may be parallel to a moving direction of the guide block 311.

Referring to FIG. 11, as the guide screw 312 rotates in one direction R1, the guide block 311 coupled to the guide screw 312 may move upward (D1). As the guide block 311 moves upward, the bracket side connectors 300, 400, 700 and/or 800 to which the guide block 311 is fixed may also move upward. As the bracket side connectors 300, 400, 700 and/or 800 move upward, the display side connectors 100, 200, 500 and/or 600 corresponding to the bracket side connectors 300, 400, 700 and/or 800 may also move upward. Accordingly, the display unit 10 may move upward. The position adjusting device 30 may adjust the position of the display unit 10 by sliding the bracket side connectors 300, 400, 700 and/or 800.

Referring to FIG. 12, as the guide screw 312 rotates in a direction R2 opposite to the one direction R1, the guide block 311 coupled to the guide screw 312 may move downward (D2). As the guide block 311 moves downward, the bracket side connectors 300, 400, 700 and/or 800 to which the guide block 311 is fixed may also move downward. As the bracket side connectors 300, 400, 700 and/or 800 move downward, the display side connectors 100, 200, 500 and/or 600 corresponding to the bracket side connectors 300, 400, 700 and/or 800 may also move downward. Accordingly, the display unit 10 may move downward. The position adjusting device 30 may adjust the position of the display unit 10 by sliding the bracket side connectors 300, 400, 700 and/or 800.

Figure 13:
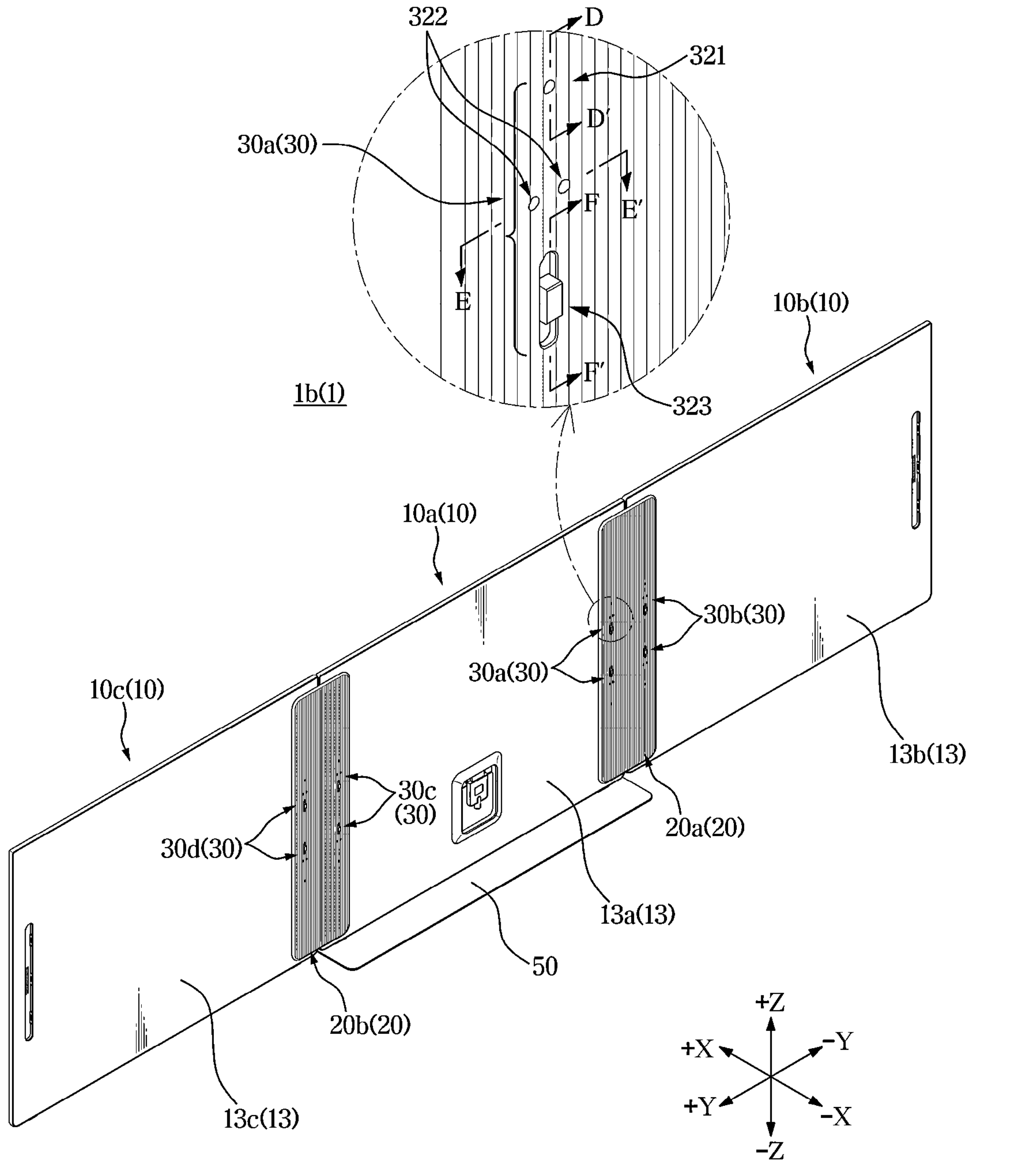
FIG. 13 is a perspective view of a display apparatus according to one embodiment.
Figure 14:
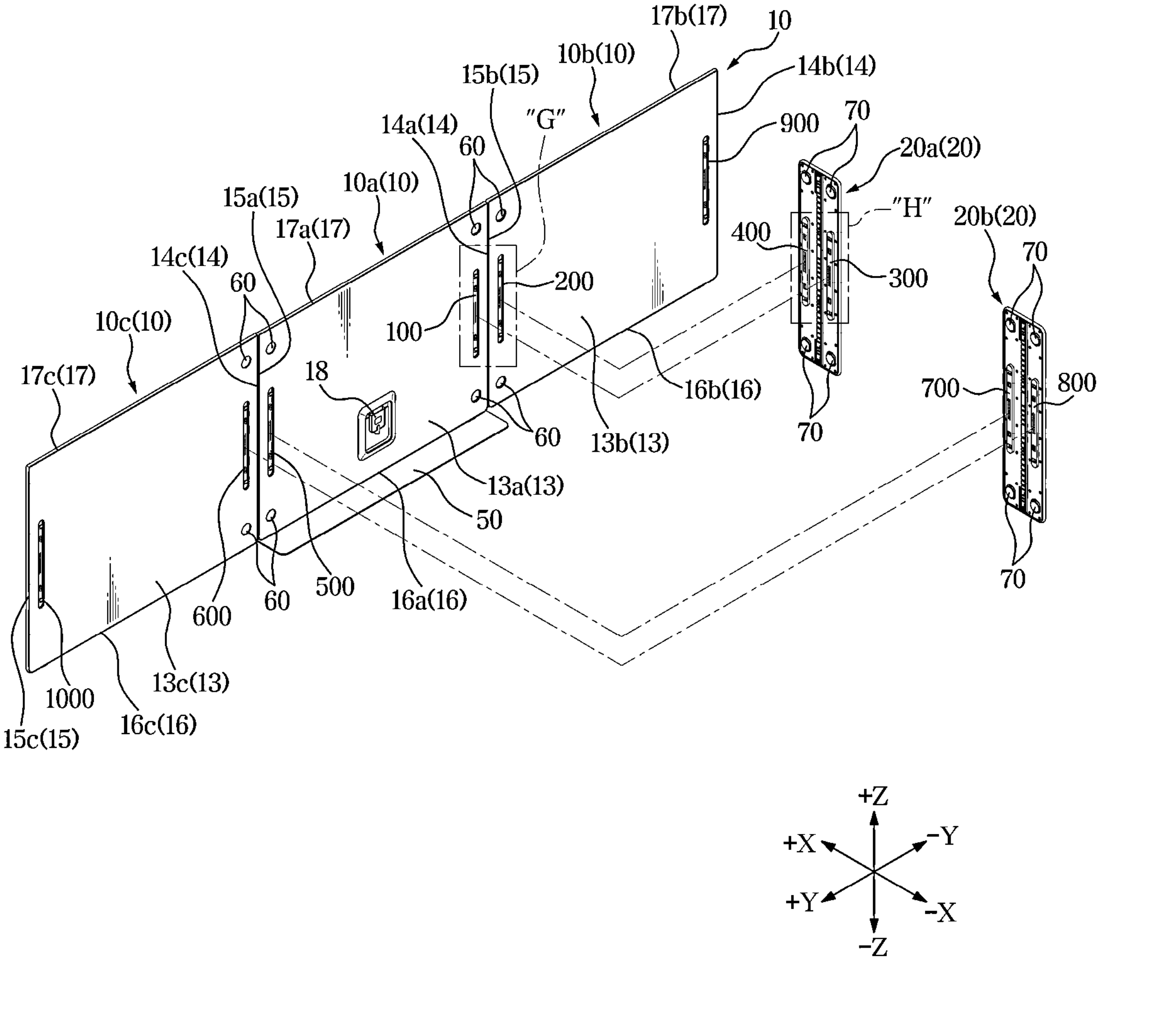
FIG. 14 is an exploded view of a portion of the display apparatus shown in FIG. 13.
Figure 15:
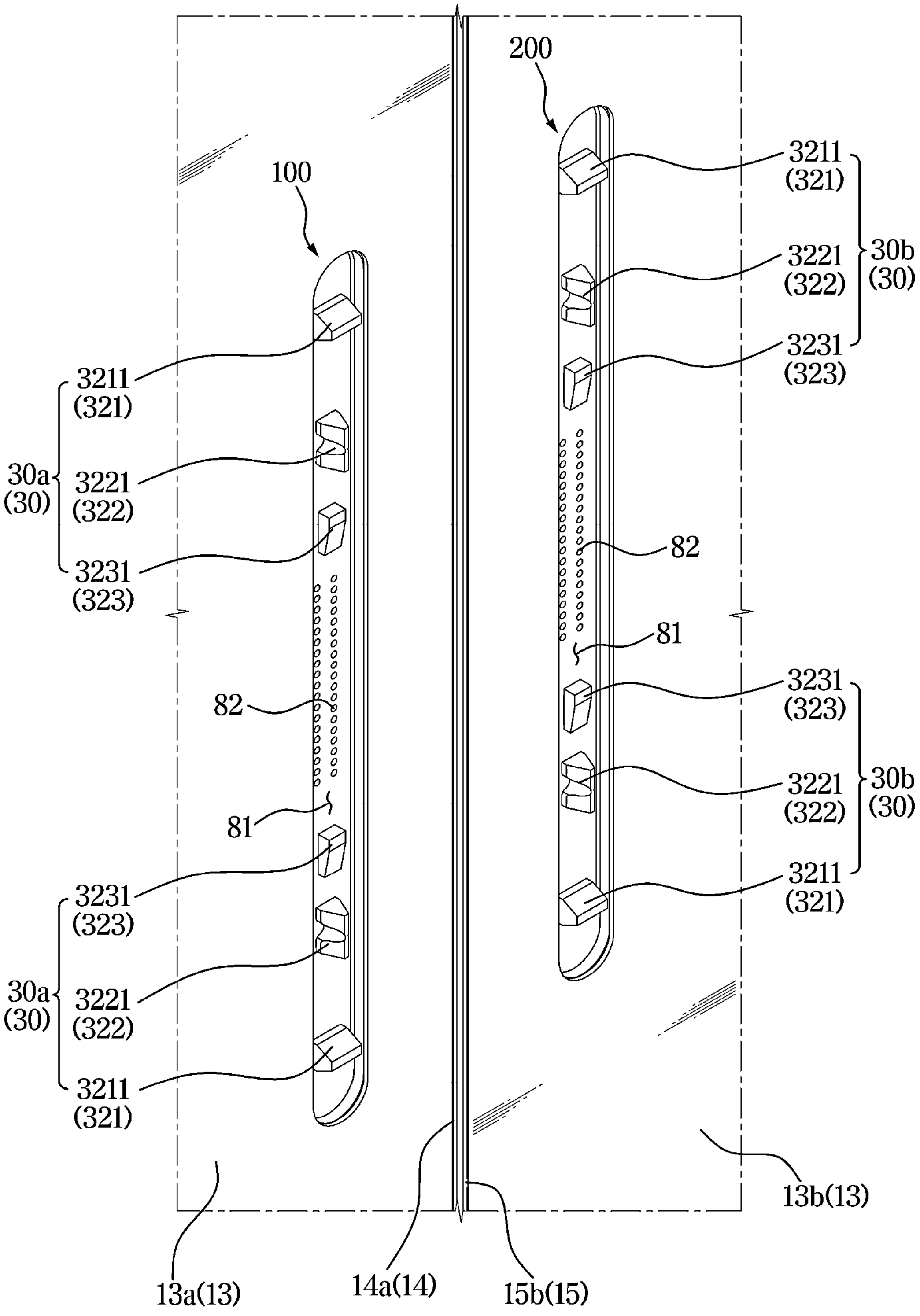
FIG. 15 is an enlarged view of part G shown in FIG. 14.
Figure 16:
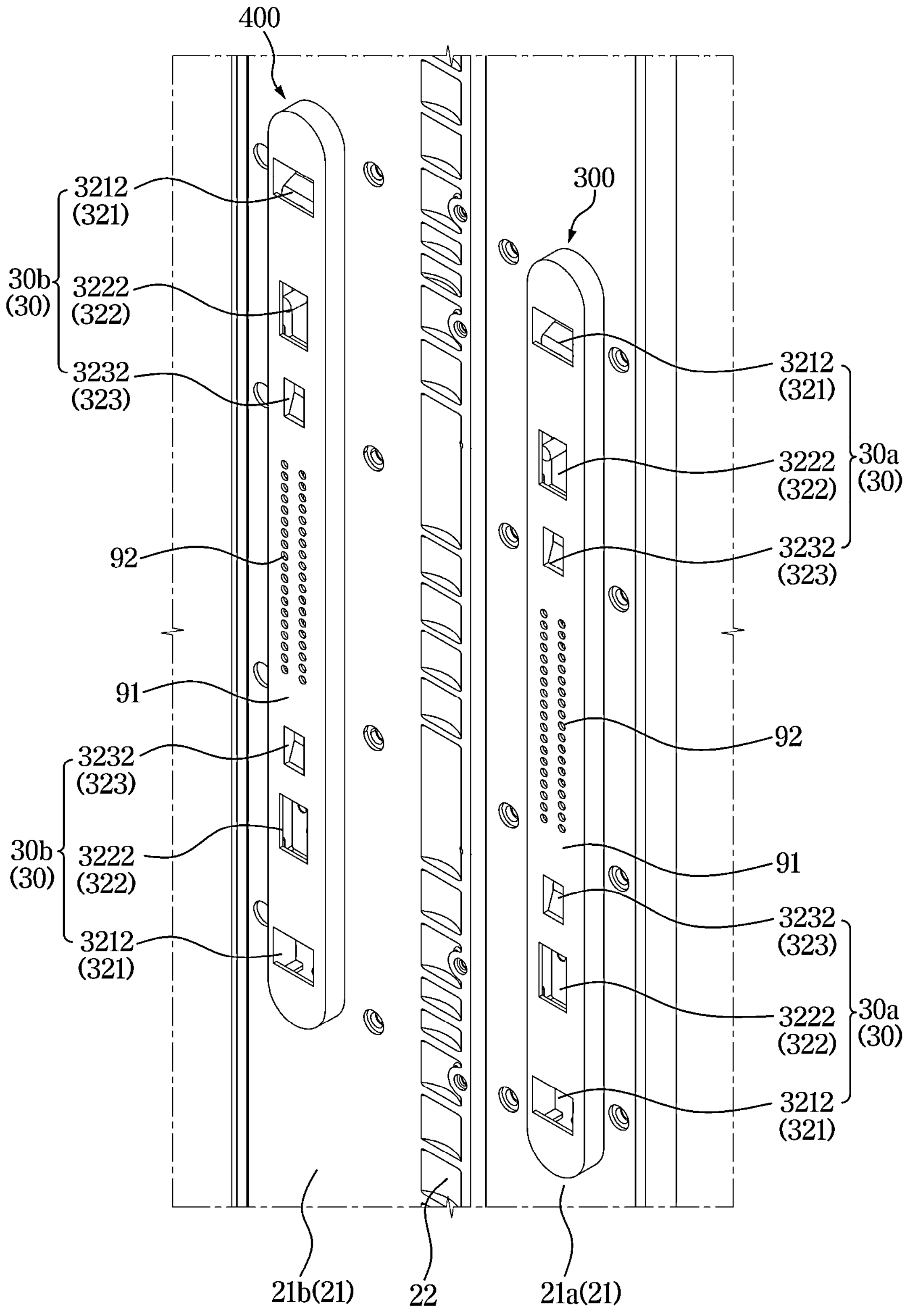
FIG. 16 is an enlarged view of part H shown in FIG. 14.
Figure 17:
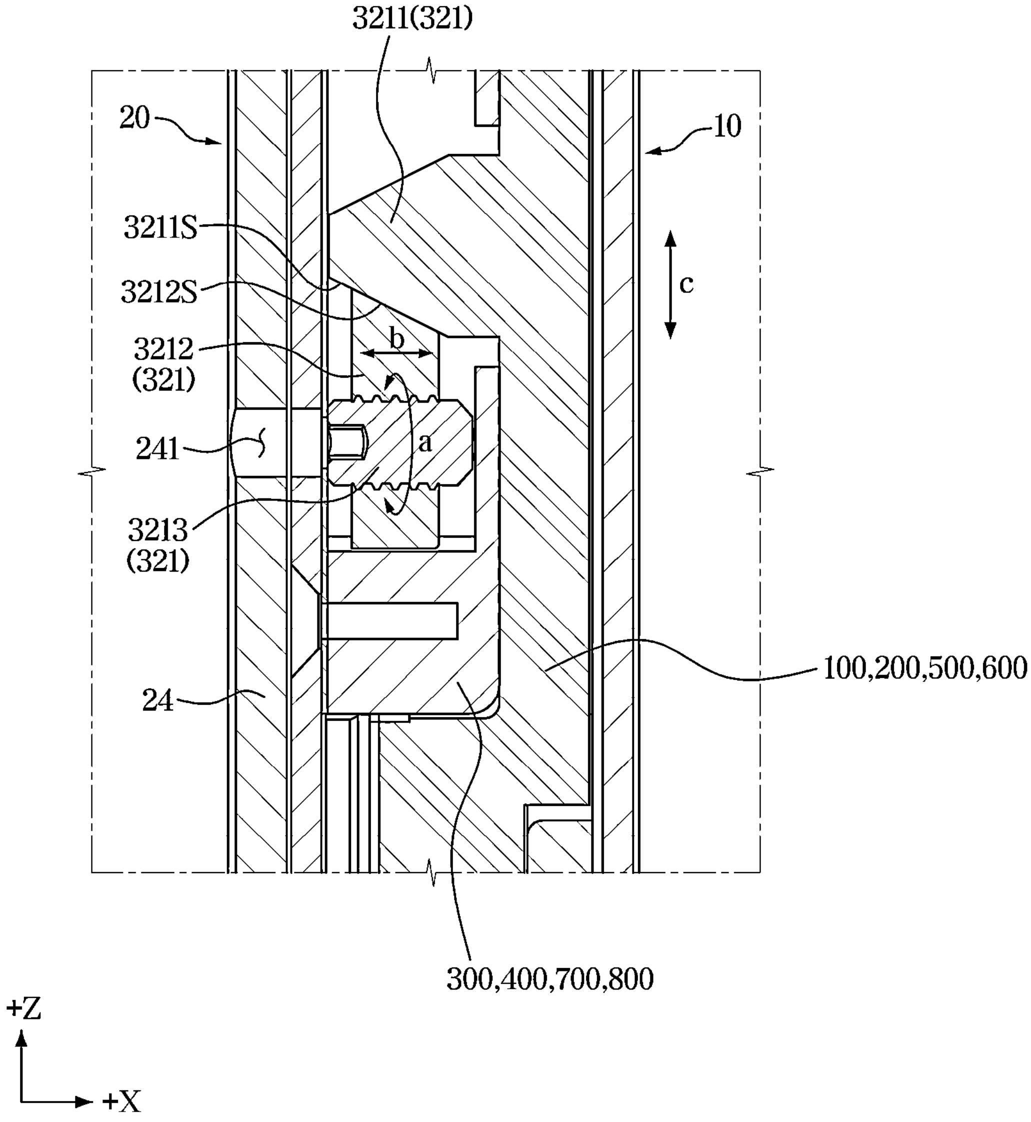
FIG. 17 is a schematic cross-sectional view taken along a line DD' shown in FIG. 13.
Figure 18:
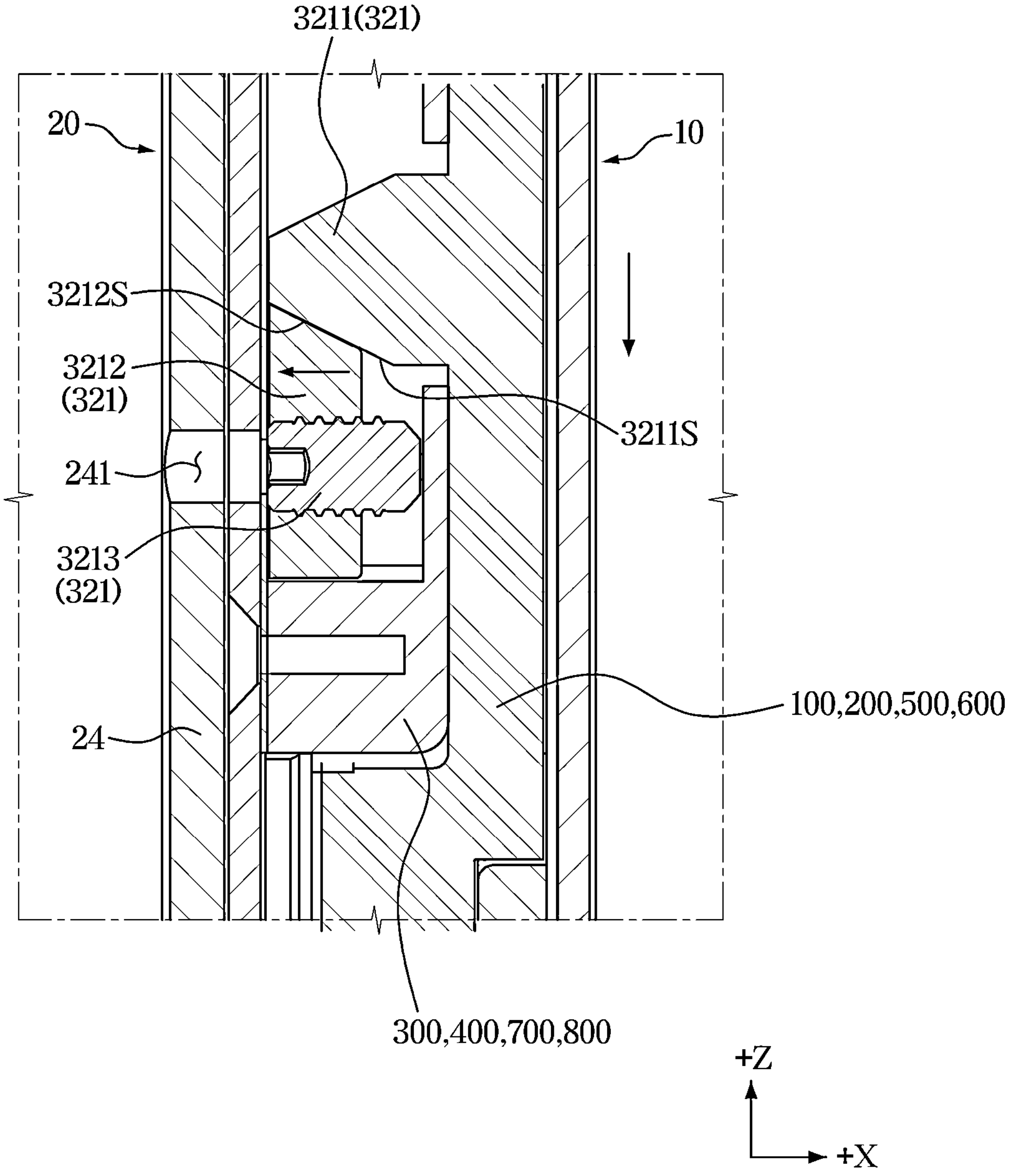
FIG. 18 is a schematic cross-sectional view taken along the line DD' shown in FIG. 13.
Figure 19:
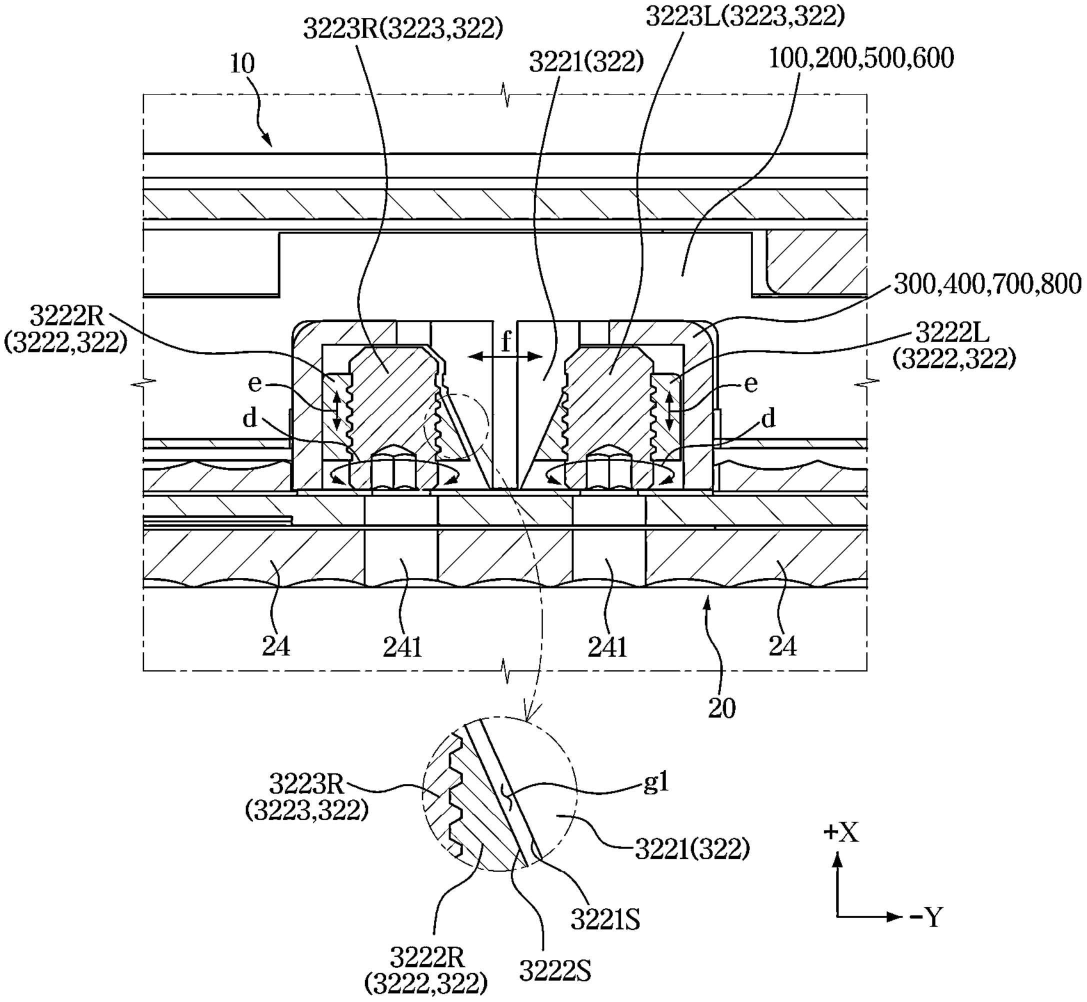
FIG. 19 is a schematic cross-sectional view taken along a line EE' shown in FIG. 13.
Figure 20:
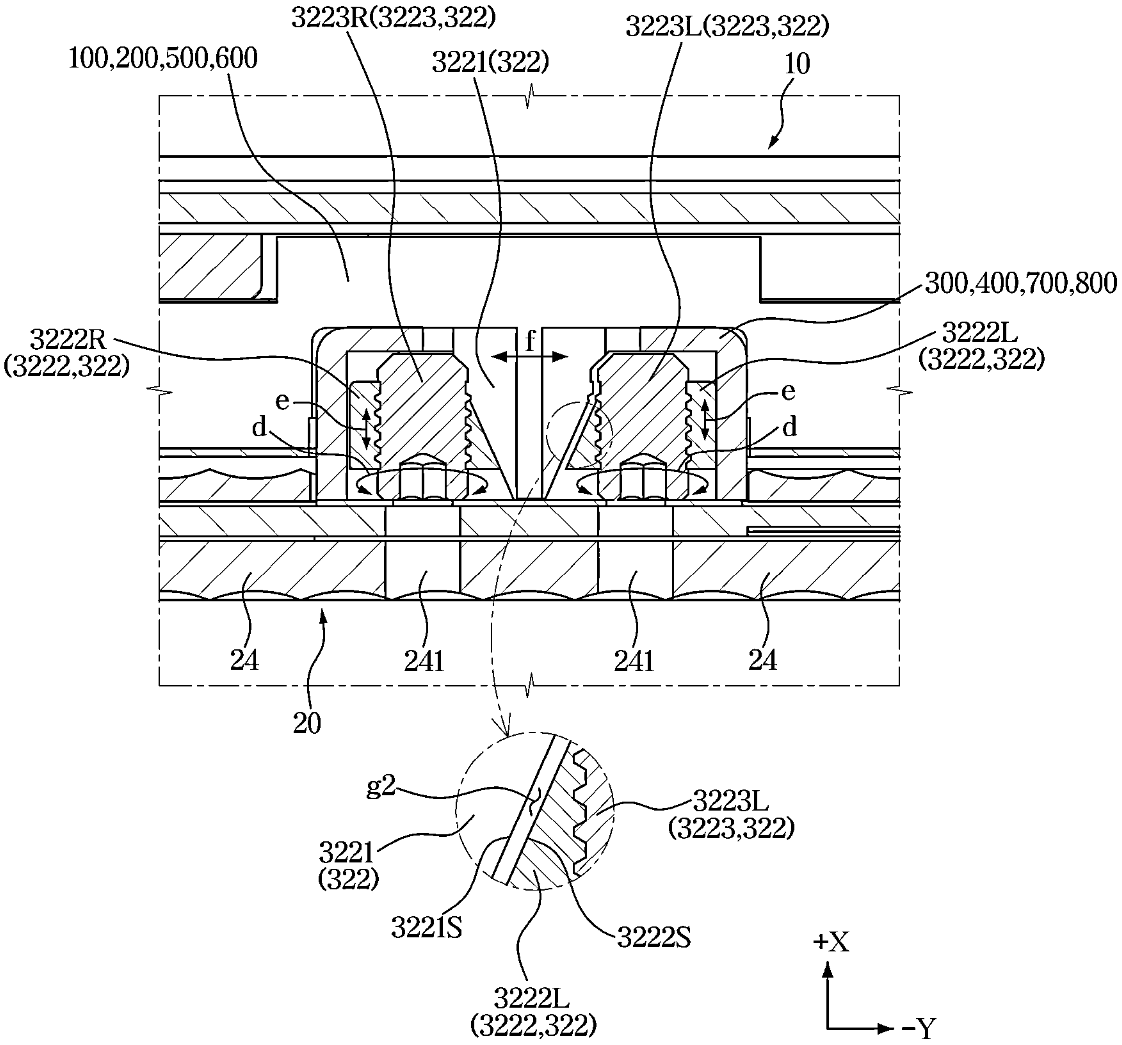
FIG. 20 is a schematic cross-sectional view taken along the line EE' shown in FIG. 13.
Figure 21:
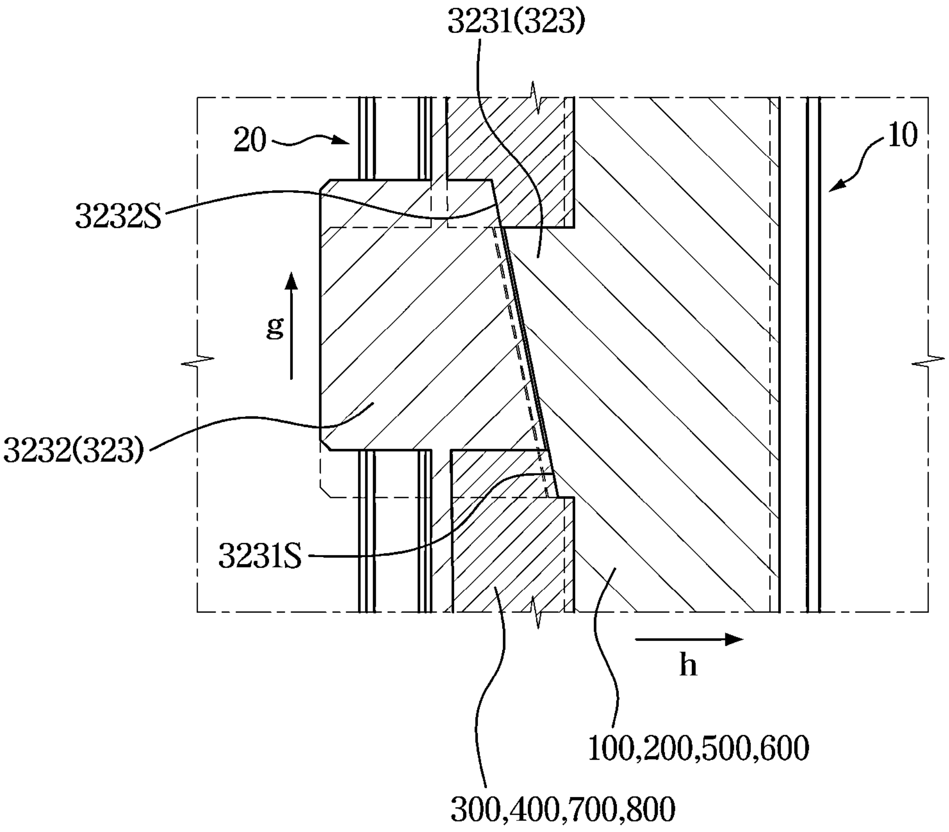
FIG. 21 is a schematic cross-sectional view taken along a line FF' shown in FIG. 13.
Figure 22:
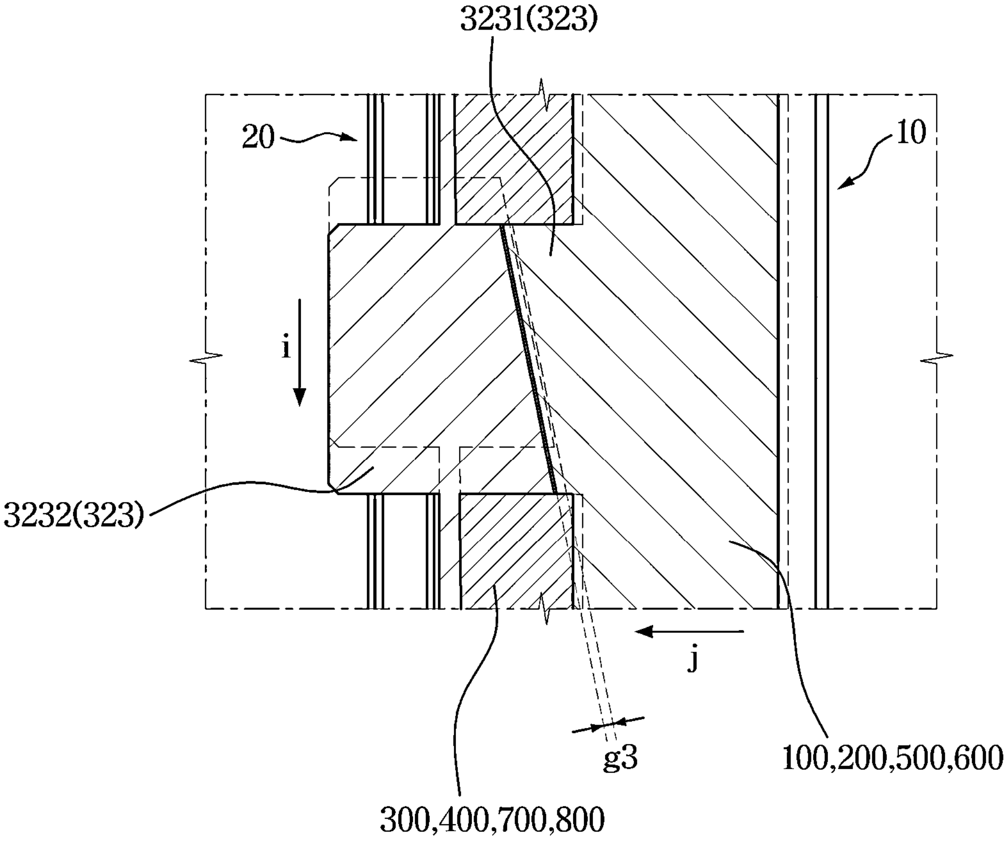
FIG. 22 is a schematic cross-sectional view taken along the line FF' shown in FIG. 13.

FIG. 13 is a perspective view of a display apparatus according to one embodiment. FIG. 14 is an exploded view of a portion of the display apparatus shown in FIG. 13. FIG. 15 is an enlarged view of part G shown in FIG. 14. FIG. 16 is an enlarged view of part H shown in FIG. 14. FIG. 17 is a schematic cross-sectional view taken along a line DD' shown in FIG. 13. FIG. 18 is a schematic cross-sectional view taken along the line DD' shown in FIG. 13. FIG. 19 is a schematic cross-sectional view taken along a line EE' shown in FIG. 13. FIG. 20 is a schematic cross-sectional view taken along the line EE' shown in FIG. 13. FIG. 21 is a schematic cross-sectional view taken along a line FF' shown in FIG. 13. FIG. 22 is a schematic cross-sectional view taken along the line FF' shown in FIG. 13.

As for describing a display apparatus shown in FIGS. 13 to 22, the same reference numerals may be assigned to a configuration the same as the configuration of the display apparatus shown in FIGS. 1 to 12. A position adjusting device shown in FIGS. 13 to 22 and the position adjusting device shown in FIGS. 1 to 12 may be provided in different configurations. However, except the position adjusting device, the display apparatus shown in FIGS. 1 to 12 and the display apparatus shown in FIGS. 13 to 22 may have substantially the same configuration. Therefore, a description the same as the above description will be omitted.

The position adjusting device 30 may include at least one of a first position adjusting unit 30*a*, a second position adjusting unit 30*b*, a third position adjusting unit 30*c*, or a fourth position adjusting unit 30*d*. It is illustrated that the position adjusting device 30 includes all of the first position adjusting unit 30*a*, the second position adjusting unit 30*b*, the third position adjusting unit 30*c* and the fourth position adjusting unit 30*d* on the drawings. However, the present disclosure is not limited thereto. In addition, it is illustrated that the first position adjusting unit 30*a*, the second position adjusting unit 30*b*, the third position adjusting unit 30*c*, and the fourth position adjusting unit 30*d* are each provided as a pair arranged in the up and down direction, but the present disclosure is not limited thereto.

For example, the position adjusting device 30 may include a first position adjusting portion 321 provided to adjust the position of the display unit 10 in the up and down direction (vertical direction or Z direction). For example, the position adjusting device 30 may include a second position adjusting portion 322 provided to adjust the position of the display unit 10 in the lateral direction (Y direction). For example, the position adjusting device 30 may include a third position adjusting portion 323 provided to adjust the position of the display unit 10 in the forward and backward direction (X direction). For example, the position adjusting device 30 may include at least one of the first position adjusting portion 321, the second position adjusting portion 322, and the third position adjusting portion 323. For example, each of the first to fourth position adjusting units 30*a*, 30*b*, 30*c*, and 30*d* may include at least one of the first position adjusting portion 321, the second position adjusting portion 322, or the third position adjusting portion 323.

A portion of the position adjusting device 30 may be provided on the display unit 10, and the remaining portion of the position adjusting device 30 may be provided on the connection bracket 20.

An example of the first position adjusting portion 321 of the position adjusting device 30 will be described.

The position adjusting device 30 may include a first protruding guide portion 3211. The first protruding guide portion 3211 may be provided on the display side connectors 100, 200, 500, and/or 600. The first protruding guide portion 3211 may protrude from the display side connectors 100, 200, 500, and/or 600. The first protruding guide portion 3211 may be movable in the vertical direction (Z direction). The first protruding guide portion 3211 may be movable together with the display side connectors 100, 200, 500 and/or 600. The first protruding guide portion 3211 may be formed on the display side connectors 100, 200, 500 and/or 600 and move together with the display side connectors 100, 200, 500 and/or 600 in the vertical direction (Z direction). For example, the first protruding guide portion 3211 may include an inclined surface 3211S. The first protruding guide portion 3211 may be provided as a configuration of the first position adjusting portion 321.

The positioning device 30 may include a first moving block 3212. The first moving block 3212 may correspond to the first protruding guide portion 3211. The first moving block 3212 may be in contact with the first protruding guide portion 3211. The first moving block 3212 may be provided on the bracket side connectors 300, 400, 700 and/or 800. The first moving block 3212 may move in a direction intersecting the moving direction of the first protruding guide portion 3211 within the bracket side connectors 300, 400, 700 and/or 800. The first moving block 3212 may move in the forward and backward direction (X direction). For example, the first moving block 3212 may include an inclined surface 3212S provided to correspond to the inclined surface 3211S of the first protruding guide portion 3211 and provided to be in contact with the inclined surface 3211S of the first protruding guide portion 3211. The first moving block 3212 may be provided as a configuration of the first position adjusting portion 321.

The position adjusting device 30 may include a first adjustment screw 3213. The first adjustment screw 3213 may be rotatably coupled to the first moving block 3212. The first adjustment screw 3213 may move the first moving block 3212 to a direction that intersects the moving direction of the first protruding guide portion 3211. The first adjustment screw 3213 may move the first moving block 3212 to the forward and backward direction (X direction). For example, the first adjustment screw 3213 may enter through the opening 241 of the cover member 24. For example, the first adjustment screw 3213 may be exposed to the outside of the connection bracket 20 through the opening 241 of the cover member 24. For example, a tool, etc. may rotate the first adjustment screw 3213 through the opening 241. The first adjustment screw 3213 may be provided as a configuration of the first position adjusting portion 321.

The first position adjusting portion 321 may include the first protruding guide portion 3211, the first moving block 3212, and the first adjusting screw 3213.

An example in which the position adjusting device 30 adjusts the display unit 10 in the up and down direction will be described with reference to FIGS. 17 and 18.

Referring to FIG. 17, the position adjusting device 30 may be configured to convert a rotational movement (a) caused by the rotational force applied to the position adjusting device 30 into a linear movement (c) for at least one display unit 10. For example, the position adjusting device 30 may convert the rotational movement (a) of the first adjustment screw 3213 into the linear movement (b) of the first moving block 3212. For example, a direction of a rotation axis of the first adjustment screw 3213 may be parallel to a moving direction of the first moving block 3212.

Referring to FIG. 18, as the first adjustment screw 3213 rotates, the first moving block 3212 coupled to the first adjustment screw 3213 may move backward (−X direction). As the first moving block 3212 moves backward, the first protruding guide portion 3211 corresponding to the first moving block 3212 may move downward (−Z direction). For example, the first protruding guide portion 3211 may be provided to slide along the inclined surface 3212S of the first moving block 3212. For example, as the first moving block 3212 moves backward, the first protruding guide portion 3211 may move downward due to gravity. For example, the inclined surface 3212S of the first moving block 3212 may be provided to be in contact with the inclined surface 3211S of the first protruding guide portion 3211. For example, the inclined surface 3212S of the first moving block 3212 and the inclined surface 3211S of the first protruding guide portion 3211 may have a downwardly inclined shape. Accordingly, as the first protruding guide portion 3211 moves downward, the display side connector 100, 200, 500 and/or 600, on which the first protruding guide portion 3211 is formed, also may move downward, and the display unit 10 may move downward.

Meanwhile, an example in which the first position adjusting portion 321 switches from the state shown in FIG. 18 to the state shown in FIG. 17 will be described. As the first adjustment screw 3213 rotates, the first moving block 3212 coupled to the first adjustment screw 3213 may move forward (+X direction). At this time, the first adjustment screw 3213 may rotate in the opposite direction to that shown in FIG. 18. As the first moving block 3212 moves forward, the first protruding guide portion 3211 corresponding to the first moving block 3212 may move upward (+Z direction). For example, the first moving block 3212 may be provided to press the first protruding guide portion 3211. For example, the inclined surface 3212S of the first moving block 3212 may be provided to push the inclined surface 3211S of the first protruding guide portion 3211 forward. For example, the first protruding guide portion 3211 may move upward (+Z direction) along the inclined surface 3212S of the first moving block 3212. Accordingly, as the first protruding guide portion 3211 moves upward, the display side connectors 100, 200, 500 and/or 600, on which the first protruding guide portion 3211 is formed, may also move upward, and the display unit 10 may move upward.

An example of the second position adjusting portion 322 of the position adjusting device 30 will be described.

The position adjusting device 30 may include a second protruding guide portion 3221. The second protruding guide portion 3221 may be provided on the display side connectors 100, 200, 500, and/or 600. The second protruding guide portion 3221 may protrude from the display side connectors 100, 200, 500, and/or 600. The second protruding guide portion 3221 may be movable in the lateral direction (Y direction). The second protruding guide portion 3221 may be movable together with the display side connectors 100, 200, 500 and/or 600. The second protruding guide portion 3221 may be formed on the display side connectors 100, 200, 500 and/or 600 and move together with the display side connectors 100, 200, 500 and/or 600 in the lateral direction (Y direction). For example, the second protruding guide portion 3221 may include an inclined surface 3221S. The second protruding guide portion 3221 may be provided as a configuration of the second position adjusting portion 322.

The positioning device 30 may include a second moving block 3222. The second moving block 3222 may correspond to the second protruding guide portion 3221. The second moving block 3222 may be in contact with the second protruding guide portion 3221. The second moving block 3222 may be provided on the bracket side connectors 300, 400, 700 and/or 800. The second moving block 3222 may be movable in a direction intersecting the moving direction of the second protruding guide portion 3221 within the bracket side connectors 300, 400, 700 and/or 800. The second moving block 3222 may move in the forward and backward direction (X direction). For example, the second moving block 3222 may include an inclined surface 3222S provided to correspond to the inclined surface 3221S of the second protruding guide portion 3221 and provided to be in contact with the inclined surface 3221S of the second protruding guide portion 3221. The second moving block 3222 may be provided as a configuration of the second position adjusting portion 322.

The position adjusting device 30 may include a second adjustment screw 3223. The second adjustment screw 3223 may be rotatably coupled to the second moving block 3222. The second adjustment screw 3223 may move the second moving block 3222 to a direction intersecting the moving direction of the second protruding guide portion 3221. The second adjustment screw 3223 may move the second moving block 3222 to the forward and backward direction (X direction). For example, the second adjustment screw 3223 may enter through the opening 241 of the cover member 24. For example, the second adjustment screw 3223 may be exposed to the outside of the connection bracket 20 through the opening 241 of the cover member 24. For example, a tool, etc. may rotate the second adjustment screw 3223 through the opening 241. The second adjustment screw 3223 may be provided as a configuration of the second position adjusting portion 322.

The second position adjusting portion 322 may include the second protruding guide portion 3221, the second moving block 3222, and the second adjusting screw 3223.

An example in which the position adjusting device 30 adjusts the display unit 10 to the lateral direction (Y direction) will be described with reference to FIGS. 19 and 20.

Referring to FIGS. 19 and 20, the position adjusting device 30 may be configured to convert a rotational movement (b) caused by the rotational force applied to the position adjusting device 30 into a linear movement (f) for at least one display unit 10. For example, the position adjusting device 30 may convert the rotational movement (b) of the second adjustment screw 3223 into the linear movement (e) of the second moving block 3222. For example, a direction of a rotation axis of the second adjustment screw 3223 may be parallel to a moving direction of the second moving block 3222.

Referring to FIGS. 19 and 20, the second moving block 3222 may be provided as a pair 3222L and 3222R and the second adjustment screw 3223 may be provided as a pair 3223L and 3223R. Hereinafter for convenience of description, a second moving block located relatively to the left (−Y) of the pair of second moving blocks may be referred to as -second moving block 3222L, and a second moving block located relatively to the right (+Y) of the pair of second moving blocks may be referred to as +second moving block 3222R. A second adjustment screw located relatively on the left (−Y) of the pair of second adjustment screws may be referred to as -second adjustment screw 3223L, and a second adjustment screw located relatively on the right (+Y) of the pair of second adjustment screws may be referred to as +second adjustment screw 3223R.

Referring to FIG. 19, a gap g1 may be formed between the +second moving block 3222R and the second protruding guide portion 3221. For example, the gap g1 may be generated by adjusting a rotation amount of the −second adjustment screw 3223L and/or a rotation amount of the +second adjustment screw 3223R. As the −second adjustment screw 3223L rotates in the state in which the gap g1 is formed, the −second moving block 3222L coupled to the −second adjustment screw 3223L may move forward (+X direction). As the −second moving block 3222L moves forward (+X direction), the second protruding guide portion 3221 may move to the right (+Y direction with respect to the front surface of the display apparatus). The second protruding guide portion 3221 may be pressed by the −second moving block 3222L. For example, the second protruding guide portion 3221 may be provided to slide along the inclined surface of the −second moving block 3222L. Accordingly, as the second protruding guide portion 3221 moves to the right (+Y direction), the display side connectors 100, 200, 500 and/or 600, on which the second protruding guide portion 3221 is formed, may also move to the right (+Y direction), and thus the display unit 10 may move to the right.

Referring to FIG. 20, a gap g2 may be formed between the −second moving block 3222L and the second protruding guide portion 3221. For example, the gap g2 may be generated by adjusting a rotation amount of the −second adjustment screw 3223L and/or a rotation amount of the +second adjustment screw 3223R. As the +second adjustment screw 3223R rotates in the state in which the gap g2 is formed, the +second moving block 3222R coupled to the +second adjustment screw 3223R may move forward (+X direction). As the +second moving block 3222R moves forward (+X direction), the second protruding guide portion 3221 may move to the left (−Y direction with respect to the front surface of the display apparatus). The second protruding guide portion 3221 may be pressed by the +second moving block 3222R. For example, the second protruding guide portion 3221 may be provided to slide along an inclined surface of the +second moving block 3222R. Accordingly, as the second protruding guide portion 3221 moves to the left (−Y direction), the display side connectors 100, 200, 500 and/or 600, on which the second protruding guide portion 3221 is formed, may also move to the left (−Y direction), and thus the display unit 10 may move to the left.

An example of the third position adjusting portion 323 of the position adjusting device 30 will be described.

The position adjusting device 30 may include a third-a moving block 3231. The third-a moving block 3231 may be provided on the display side connectors 100, 200, 500 and/or 600. The third-a moving block 3231 may protrude from the display side connectors 100, 200, 500 and/or 600. The third-a moving block 3231 may move in the forward and backward direction (X direction). The third-a moving block 3231 may be movable together with the display side connectors 100, 200, 500 and/or 600. The third-a moving block 3231 may be formed on the display side connectors 100, 200, 500 and/or 600 to move together with the display side connectors 100, 200, 500 and/or 600 in the forward and backward direction (X direction). For example, the third-a moving block 3231 may include an inclined surface 3231S. The third-a moving block 3231 may be provided as a configuration of the third position adjusting portion 323.

The position adjusting device 30 may include a third-b moving block 3232. The third-b moving block 3232 may correspond to the third-a moving block 3231. The third-b moving block 3232 may be in contact with the third-a moving block 3231. The third-b moving block 3232 may be provided on the bracket side connectors 300, 400, 700 and/or 800. The third-b moving block 3232 may protrude from the bracket side connectors 300, 400, 700 and/or 800. The third-b moving block 3232 may move in a direction intersecting the moving direction of the third-a moving block 3231. The third-b moving block 3232 may move in the vertical direction (Z direction). For example, the third-b moving block 3232 may include an inclined surface 3232S corresponding to the inclined surface 3231S of the third-a moving block 3231 and provided to be in contact with the inclined surface 3231S of the third-a moving block 3231. The third-b moving block 3232 may be provided as a configuration of the third position adjusting portion 323.

For example, the third-b moving block 3232 may protrude out of the connection bracket 20. For example, the third-b moving block 3232 may be exposed to the outside of the connection bracket 20. For example, the third-b moving block 3232 may be provided to be gripped. For example, a user can hold the third-b moving block 3232 and move the third-b moving block 3232 to the vertical direction (Z direction).

The third position adjusting portion 323 may include the third-a moving block 3231 and the third-b moving block 3232.

An example in which the position adjusting device 30 adjusts the display unit 10 in the forward and backward direction (X direction) will be described with reference to FIGS. 21 and 22. For example, a part shown with a broken line in FIGS. 21 and 22 may indicate a state before the movement of the moving block, and a part shown with a solid line in FIGS. 21 and 22 may indicate a state after the movement of the moving block.

Referring to FIG. 21, as the third-b moving block 3232 moves upward (g), the third-a moving block 3231 may move forward (h). For example, the third-b moving block 3232 may press the third-a moving block 3231 forward as the third-b moving block 3232 moves upward. For example, the inclined surface 3232S of the third-b moving block 3232 may be provided to be in contact with the inclined surface 3231S of the third-a moving block 3231. For example, the inclined surface 3232S of the third-b moving block 3232 may be provided to push the inclined surface 3231S of the third-a moving block 3231. Accordingly, as the third-a moving block 3231 moves forward, the display side connectors 100, 200, 500 and/or 600, on which the third-a moving block 3231 is formed, may also move forward, and the display unit 10 may move forward.

Referring to FIG. 22, as the third-b moving block 3232 shown in FIG. 21 moves downward (i), a gap g3 may be formed between the third-b moving block 3232 and the third-a moving block 3231. The third-b moving block 3232 may move backward (j) and be attached to the third-a moving block 3231. As a result, the gap g3 between the third-b moving block 3232 and the third-a moving block 3231 may be eliminated. For example, a magnetic material may be provided around the third-b moving block 3232 and/or the third-a moving block 3231, and the third-a moving block 3231 may move backward by the magnetic force, so as to be attached to the third-b moving block 3232. However, the present disclosure is not limited thereto, and the third-a moving block 3231 may be attached to the third-b moving block 3232 by various known methods.

For example, the inclined surface 3232S of the third-b moving block 3232 and the inclined surface 3231S of the third-a moving block 3231 may have a shape that is inclined forward and downward. However, the present disclosure is not limited to FIGS. 21 and 22. Alternatively, the inclined surface 3232S of the third-b moving block 3232 and the inclined surface 3231S of the third-a moving block 3231 may have a shape that is inclined forward and upward. For example, as the third-b moving block 3232 moves downward, the third-a moving block 3231 may move forward. For example, when the gap is formed between the third-b moving block 3232 and the third-a moving block 3231, the third-b moving block 3232 may move backward and be attached to the third-a moving block 3231.

In general, when a display apparatus is composed of a plurality of display units, a step difference and/or a gap between the plurality of display units may occur during a process of installing the plurality of display units. As a result, a boundary may be formed between screens of each of the plurality of display units, which may impair the aesthetics of the display apparatus. Additionally, in order to eliminate the step difference and/or the gap between the plurality of display units, it may be necessary to reinstall the plurality of display units.

According to the present disclosure, the display apparatus 1 may include the position adjusting device 30. For example, the position adjusting device 30 may easily adjust the position of the display unit in the up and down direction (Z direction), the lateral direction (Y direction), and/or the forward and backward direction (X direction). The position adjusting device 30 may prevent the step difference and/or the gap between the plurality of display units. The aesthetics of the display apparatus 1 may not be impaired. The plurality of display units 10 may not be reinstalled.

Figure 23:
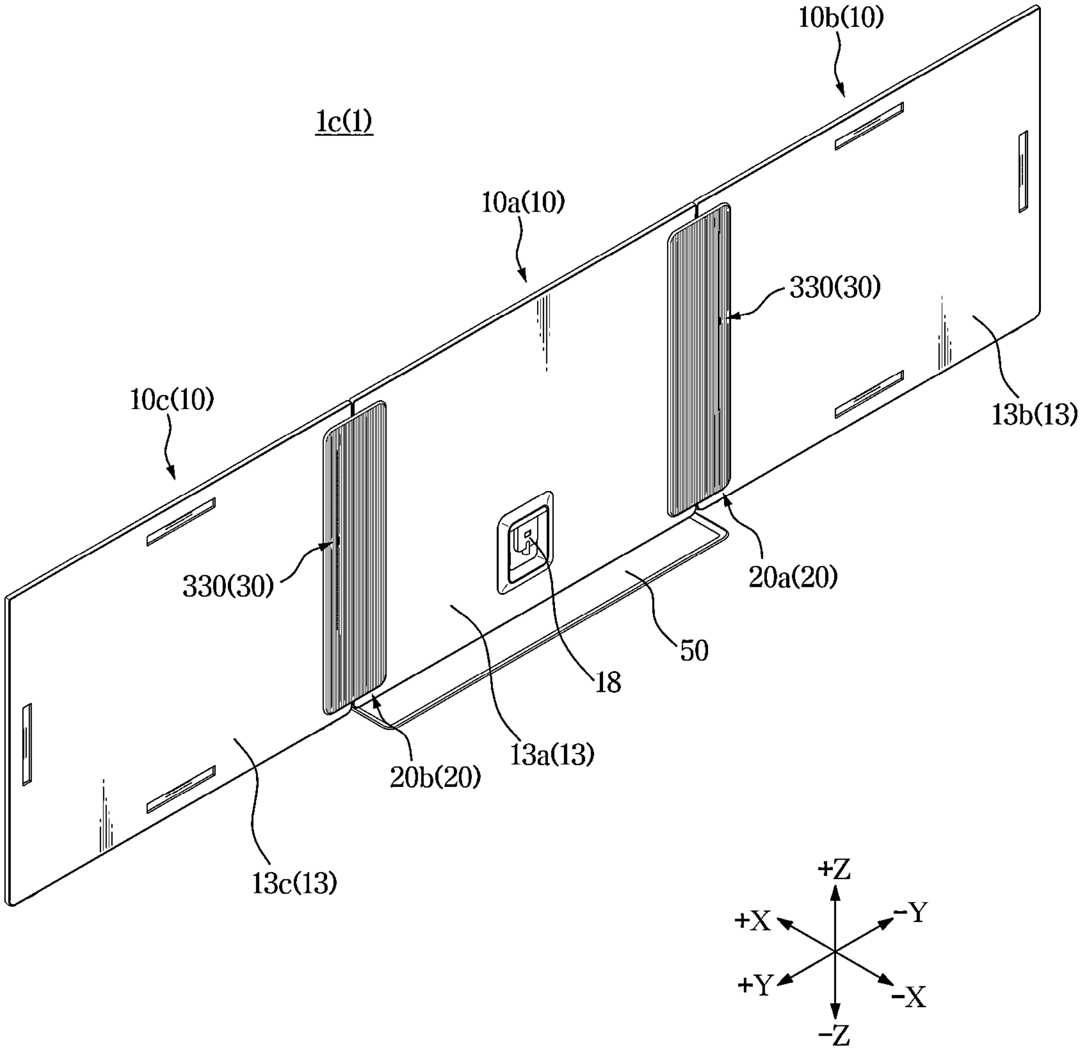
FIG. 23 is a perspective view of a display apparatus according to one embodiment.
Figure 24:
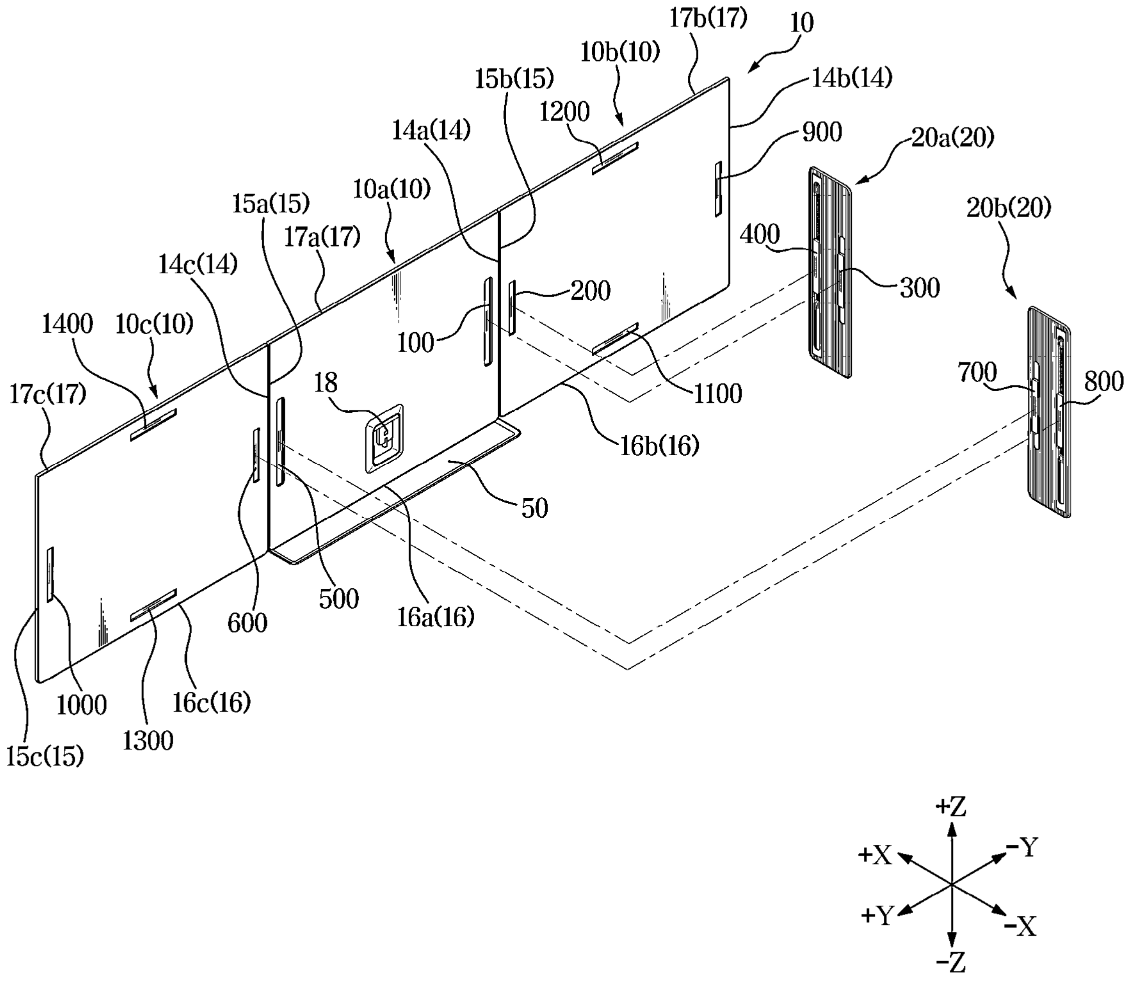
FIG. 24 is an exploded view of a portion of the display apparatus shown in FIG. 23.
Figure 25:
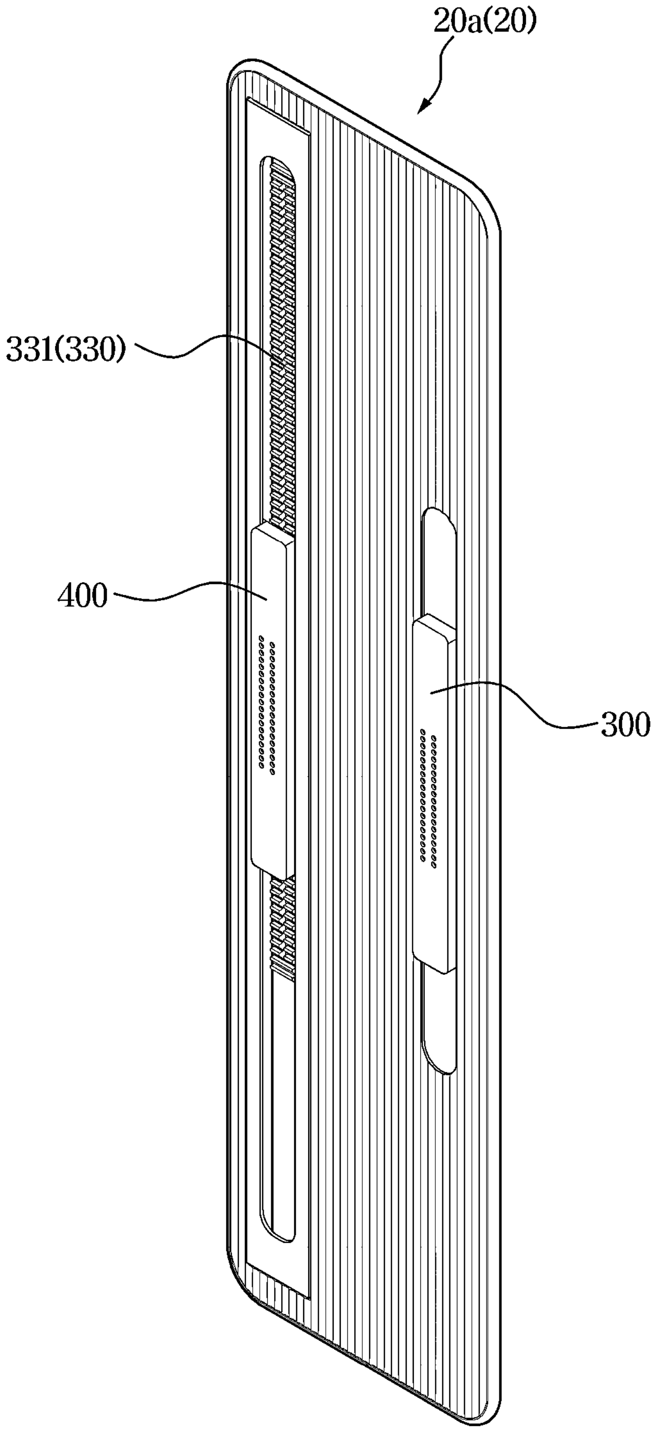
FIG. 25 is a perspective view of a connection bracket shown in FIG. 24.
Figure 26:
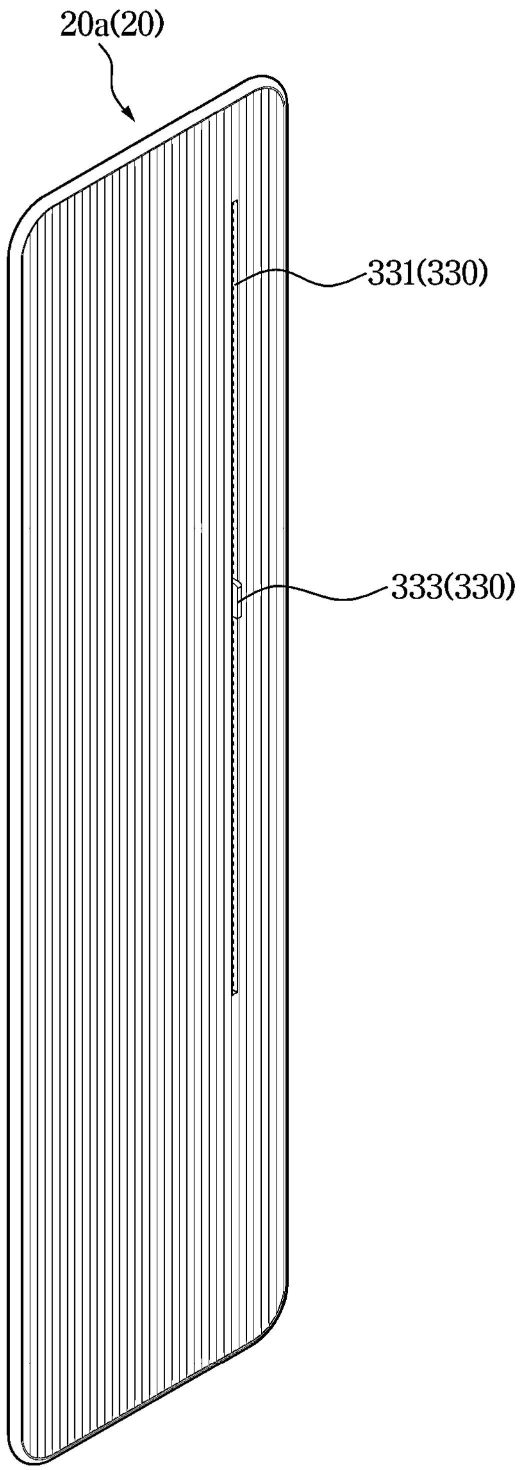
FIG. 26 is a rear perspective view of the connection bracket shown in FIG. 25.
Figure 27:
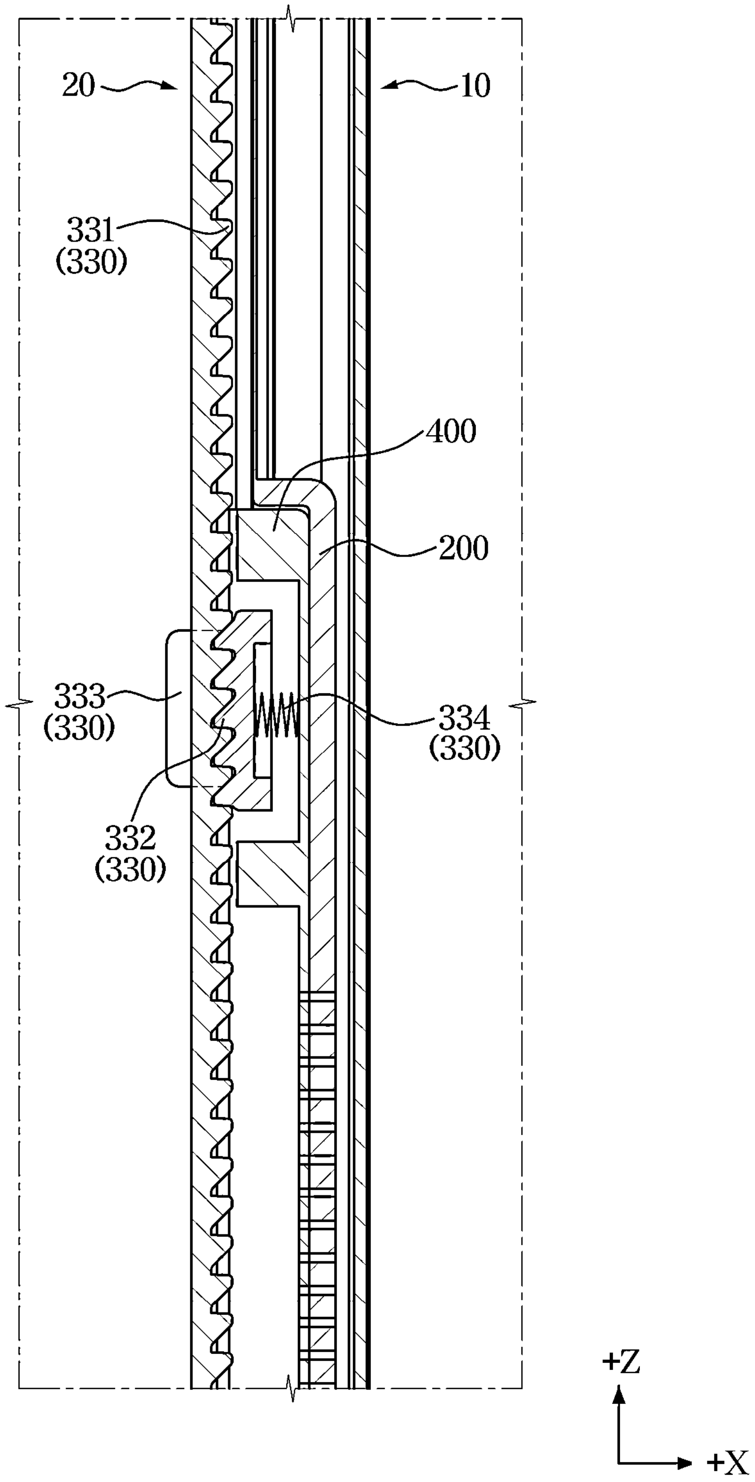
FIG. 27 illustrates a portion of a side cross-section of the display apparatus shown in FIG. 23.
Figure 28:
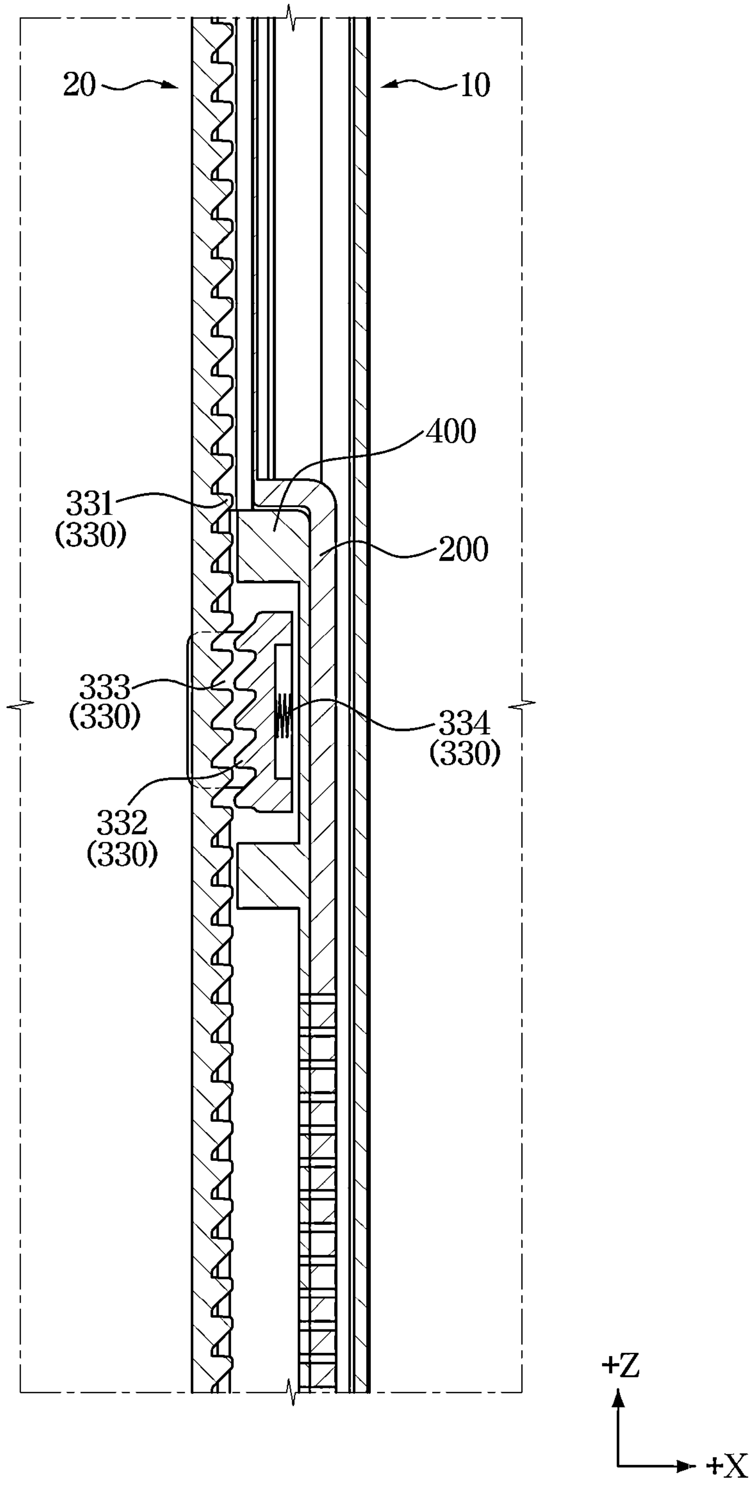
FIG. 28 illustrates a state in which a toothed rail and a locking protrusion shown in FIG. 27 are disengaged.

FIG. 23 is a perspective view of a display apparatus according to one embodiment. FIG. 24 is an exploded view of a portion of the display apparatus shown in FIG. 23. FIG. 25 is a perspective view of a connection bracket shown in FIG. 24. FIG. 26 is a rear perspective view of the connection bracket shown in FIG. 25. FIG. 27 illustrates a portion of a side cross-section of the display apparatus shown in FIG. 23. FIG. 28 illustrates a state in which a toothed rail and a locking protrusion shown in FIG. 27 are disengaged.

As for describing a display apparatus shown in FIGS. 23 to 28, the same reference numerals may be assigned to a configuration the same as the configuration of the display apparatus shown in FIGS. 1 to 22. A position adjusting device shown in FIGS. 23 to 28 and the position adjusting device shown in FIGS. 1 to 22 may be provided in different configurations. However, except the position adjusting device, the display apparatus shown in FIGS. 1 to 22 and the display apparatus shown in FIGS. 23 to 28 may have substantially the same configuration. Therefore, a description the same as the above description will be omitted.

The position adjusting device 30 may include a position adjusting portion 330 configured to slide the display unit 10 to one direction. For example, the position adjusting portion 330 may slide the bracket side connector to the up and down direction (Z direction). A detailed description of this will be provided later.

Referring to FIGS. 23 and 24, the position adjusting portion 330 may be arranged to adjust a height of the second display unit 10*b* with respect to the first display unit 10*a*. The position adjusting portion 330 may be arranged to adjust a height of the third display unit 10*c* with respect to the first display unit 10*a*. In the drawing, it is illustrated that the position adjusting portion 330 is disposed to correspond to the fourth connector 400 and the eighth connector 800, respectively, but the present disclosure is not limited thereto. Alternatively, the position adjusting portion 330 may be arranged to correspond to either the fourth connector 400 or the eighth connector 800. Alternatively, the position adjusting portion 330 may be disposed to correspond to the third connector 300 and/or the seventh connector 700. That is, the position adjusting portion 330 may be arranged to correspond to the display unit in which a height thereof is to be adjusted. The position adjusting portion 330 may be provided in various arrangements and/or combinations.

An example of the position adjusting portion 330 corresponding to the fourth connector 400 will be described with reference to FIGS. 26 to 28. A description of FIGS. 26 to 28 may be equally applied to the position adjusting portion 330 corresponding to another bracket side connector. Accordingly, the fourth connector 400 described below may be replaced with another bracket side connector. Likewise, the second connector 200 described below may be replaced with another display side connector. For example, the fourth connector 400 described below may be replaced with the eighth connector 800, and the second connector 200 described below may be replaced with the sixth connector 600.

The position adjusting device 30 may include a toothed rail 331. The toothed rail 331 may be disposed behind the fourth connector 400. The toothed rail 331 may extend along the up and down direction (Z direction). The toothed rail 331 may be provided as a configuration of the position adjusting portion 330.

The position adjusting device 30 may include a locking protrusion 332. The locking protrusion 332 may have a shape corresponding to the toothed rail 331. The locking protrusion 332 may be provided to engage with the toothed rail 331. The locking protrusion 332 may be provided to move along the toothed rail 331. The locking protrusion 332 may move together with the fourth connector 400 in the up and down direction (Z direction) along the toothed rail 331. As the fourth connector 400 moves, the second connector 200 connected to the fourth connector 400 may also move in conjunction with the fourth connector 400. The locking protrusion 332 may be connected to the fourth connector 400. For example, the locking protrusion 332 may be connected to the fourth connector 400 through a spring 334, which will be described later. The locking protrusion 332 may be provided as a configuration of the position adjusting portion 330.

The position adjusting device 30 may include a release portion 333. The release portion 333 may be provided to press the locking protrusion 332 to allow the engagement between the toothed rail 331 and the locking protrusion 332 to be released. In order that the engagement between the toothed rail 331 and the locking protrusion 332 is released, the release portion 333 may move the locking protrusion 332 to a direction away from the toothed rail 331. For example, the release portion 333 may move the locking protrusion 332 forward (+X direction). For example, the release portion 333 may protrude from the locking protrusion 332 to the outside of the connection bracket 20. For example, the release portion 333 may be exposed to the outside of the connection bracket 20 from the locking protrusion 332. For example, the release portion 333 may be provided to be gripped. For example, a user or the like can move the locking protrusion 332 and the connector 400 by holding and moving the release portion 333. The release portion 333 may be provided as a configuration of the position adjusting portion 330.

The position adjusting device 30 may include a spring 334. The spring 334 may connect the locking protrusion 332 and the fourth connector 400. The spring 334 may be provided to elastically bias the locking protrusion 332 to allow the toothed rail 331 and the locking protrusion 332 to engage with each other. The spring 334 may move the locking protrusion 332 to a direction closer to the toothed rail so as to allow the toothed rail 331 and the locking protrusion 332 to engage with each other. For example, the spring 334 may move the locking protrusion 332 backward (−X direction). For example, when a user or the like applies force forward by holding the release portion 333, and then removes the force, the locking protrusion 332 may be moved backward by an elastic restoring force of the spring 334. As the locking protrusion 332 moves backward, the locking protrusion 332 may engage with the toothed rail 331. The spring 334 may be provided as a configuration of the position adjusting portion 330.

Meanwhile, the toothed rail 331 may include diagonally shaped teeth that narrow toward the top. Accordingly, while the toothed rail 331 and the locking protrusion 332 are engaged, the locking protrusion 332 and the fourth connector 400 may be allowed to move upward along the toothed rail 331 but may be prevented from moving downward. The positions of the locking protrusion 332 and the fourth connector 400 may be maintained in a fixed state.

While the toothed rail 331 and the locking protrusion 332 are disengaged, the locking protrusion 332 and the fourth connector 400 may move upward and downward along the toothed rail 331. That is, the locking protrusion 332 and the fourth connector 400 may freely move in the vertical direction (Z direction) along the toothed rail 331. For example, a user or the like can move the release portion 333 upward and/or downward by holding the release portion 333 and applying force forward (+X direction). Accordingly, the locking protrusion 332 and the fourth connector 400 may move upward and/or downward together with the release portion 333.

Accordingly, the position adjusting device 30 may slide the bracket side connector. Accordingly, the display side connector connected to the bracket side connector may be also slid. Additionally, the display unit on which the display side connector is formed may be also slid. The position adjusting device 30 may slide the display unit.

The position adjusting portion 330 may include the toothed rail 331, the locking protrusion 332, the release portion 333, and the spring 334.

Figure 29:
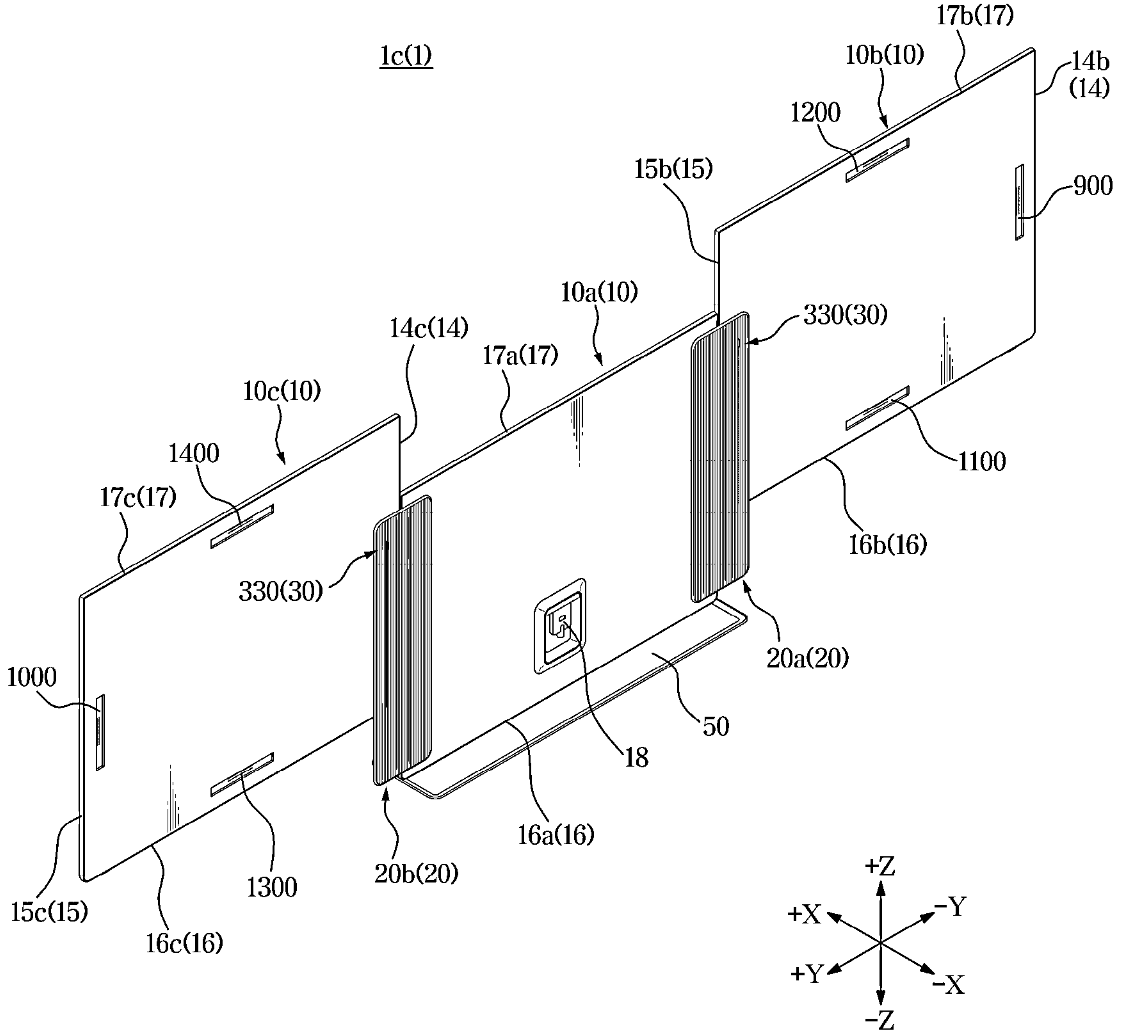
FIG. 29 illustrates an example of the arrangement of a plurality of display units.
Figure 30:
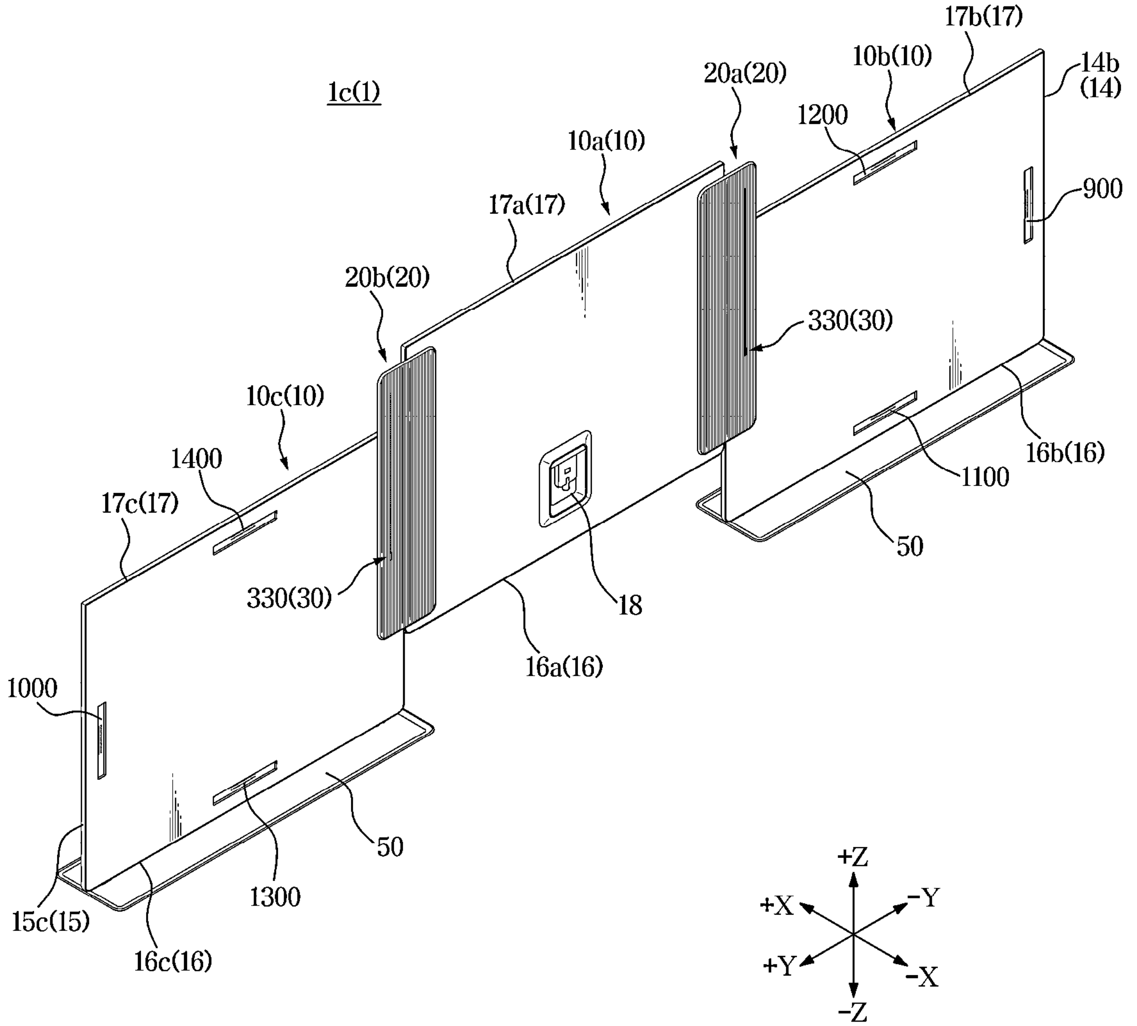
FIG. 30 illustrates an example of the arrangement of the plurality of display units.

FIG. 29 illustrates an example of the arrangement of a plurality of display units. FIG. 30 illustrates an example of the arrangement of the plurality of display units.

As for describing a display apparatus shown in FIGS. 29 and 30, the same reference numerals may be assigned to a configuration the same as the configuration of the display apparatus shown in FIGS. 1 to 28, and a detailed description thereof will be omitted.

Referring to FIGS. 29 and 30, the second display unit **10*b* may move relative to the first display unit 10*a*. The second display unit 10*b* may be slid with respect to the first display unit 10*a* by the position adjuster 330. The third display unit 10*c* may be moved relative to the first display unit 10*a*. The third display unit 10*c* may be slid with respect to the first display unit 10*a* by the position adjusting portion 330**.

Referring to FIG. 29, the second display unit **10*b* may move upward with respect to the first display unit 10*a*. The second display unit 10*b* may be disposed above the first display unit 10*a*. The second display unit 10*b* may be suspended from the first display unit 10*a*. The third display unit 10*c* may move upward with respect to the first display unit 10*a*. The third display unit 10*c* may be disposed above the first display unit 10*a*. The third display unit 10*c* may be suspended from the first display unit 10*a*. For example, the support member 50 may be provided in the first display unit 10*a***.

Referring to FIG. 30, the second display unit **10*b* may move downward with respect to the first display unit 10*a*. The second display unit 10*b* may be disposed below the first display unit 10*a*. The first display unit 10*a* may be suspended from the second display unit 10*b*. The third display unit 10*c* may move downward with respect to the first display unit 10*a*. The third display unit 10*c* may be disposed below the first display unit 10*a*. The first display unit 10*a* may be suspended from the third display unit 10*c*. For example, the support member 50 may be provided in the second display unit 10*b* and the third display unit 10*c***, respectively.

However, unlike shown in FIGS. 29 and 30, one of the second display unit **10*b* and the third display unit 10*c* may be disposed above the first display unit 10*a*, and the other of the second display unit 10*b* and the third display unit 10*c* may be disposed below the first display unit 10*a*. For example, the first display unit 10*a* may be configured to be movable relative to the second display unit 10*b* and/or the third display unit 10*c*. For example, the first display unit 10*a* may be configured to slide relative to the second display unit 10*b* and/or the third display unit 10*c*. Additionally, in addition to the examples described above, the plurality of display units 10** may be arranged in various ways.

Figure 31:
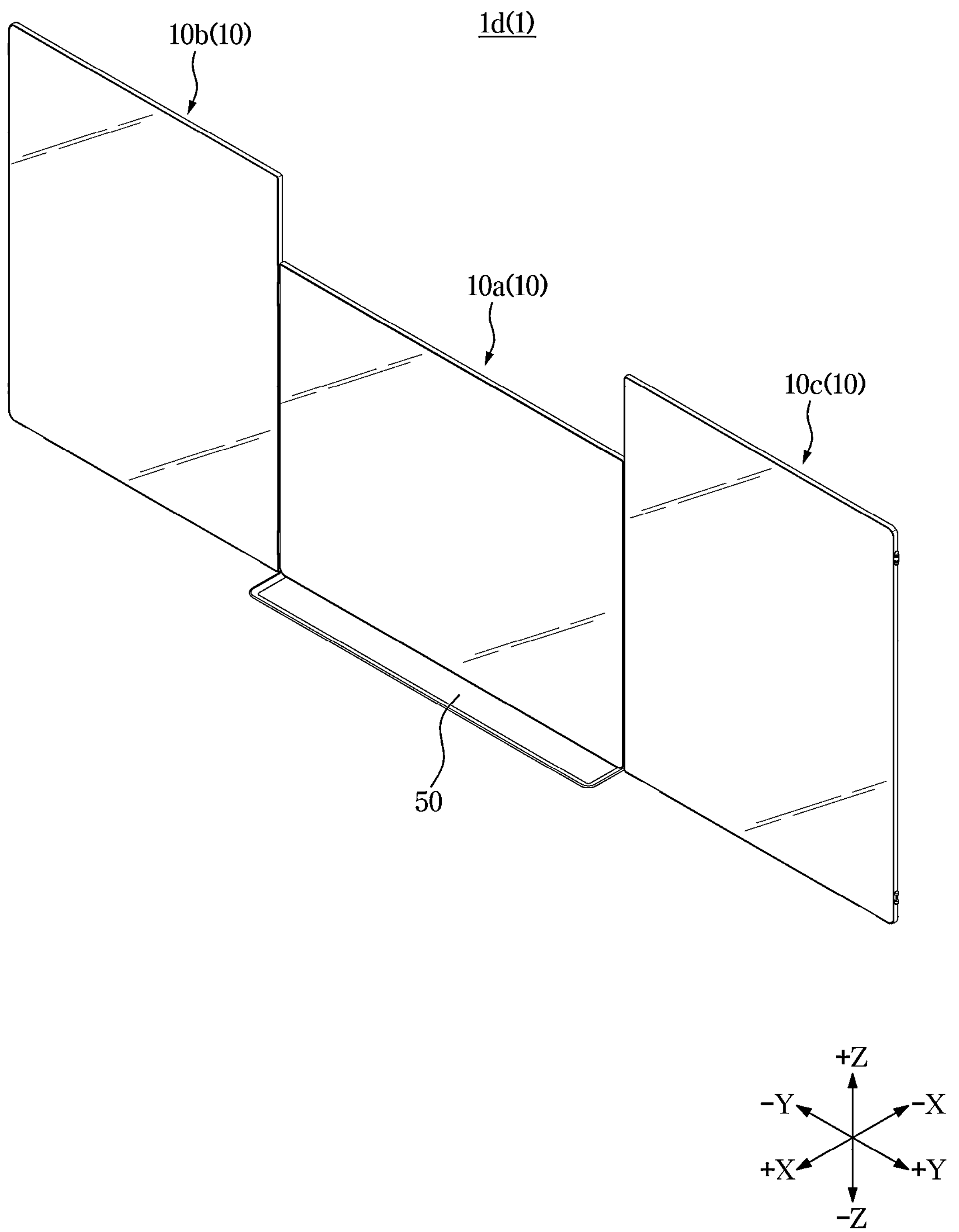
FIG. 31 illustrates an example of the arrangement of the plurality of display units.
Figure 32:
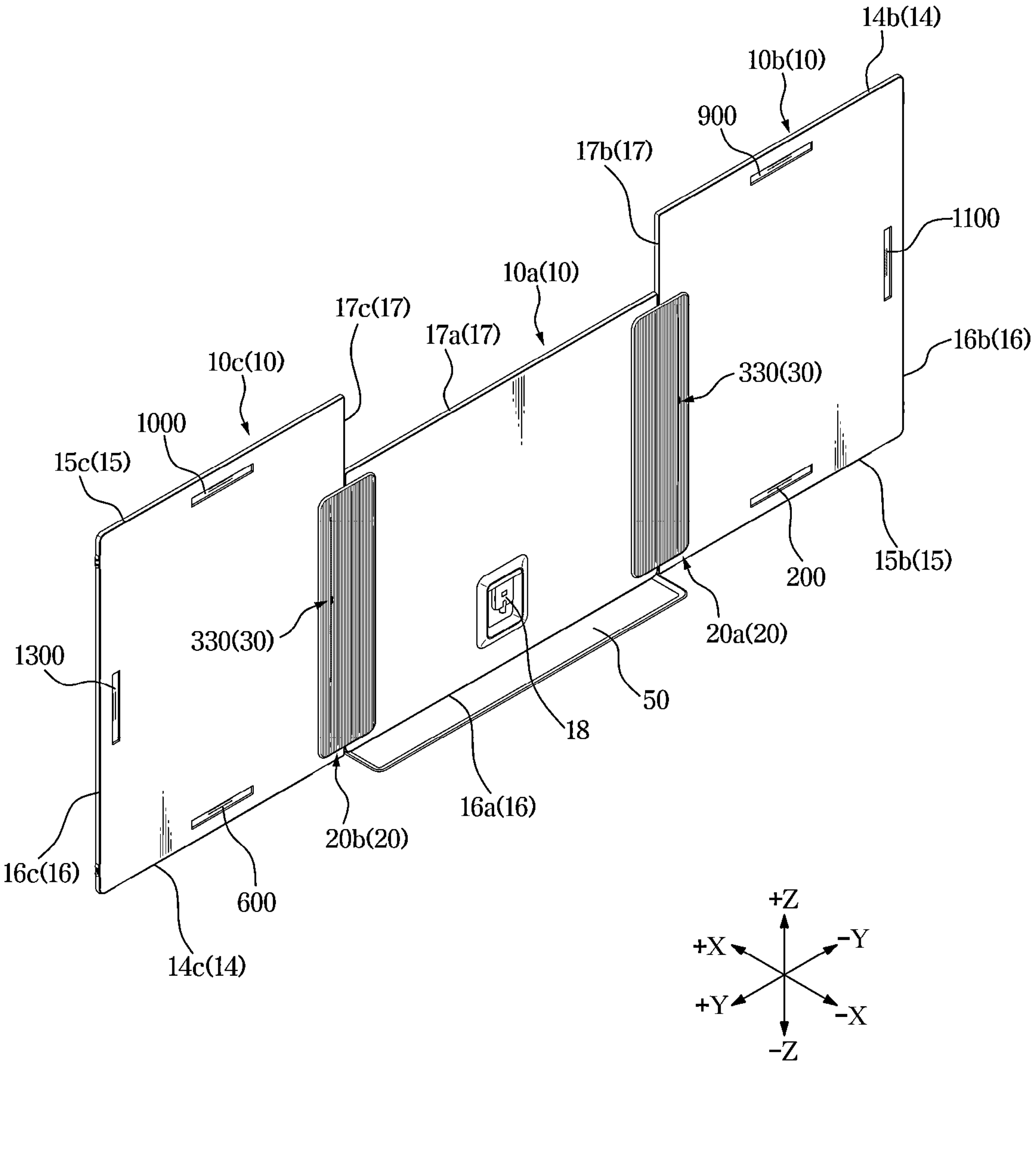
FIG. 32 illustrates an example of the arrangement of the plurality of display units.
Figure 33:
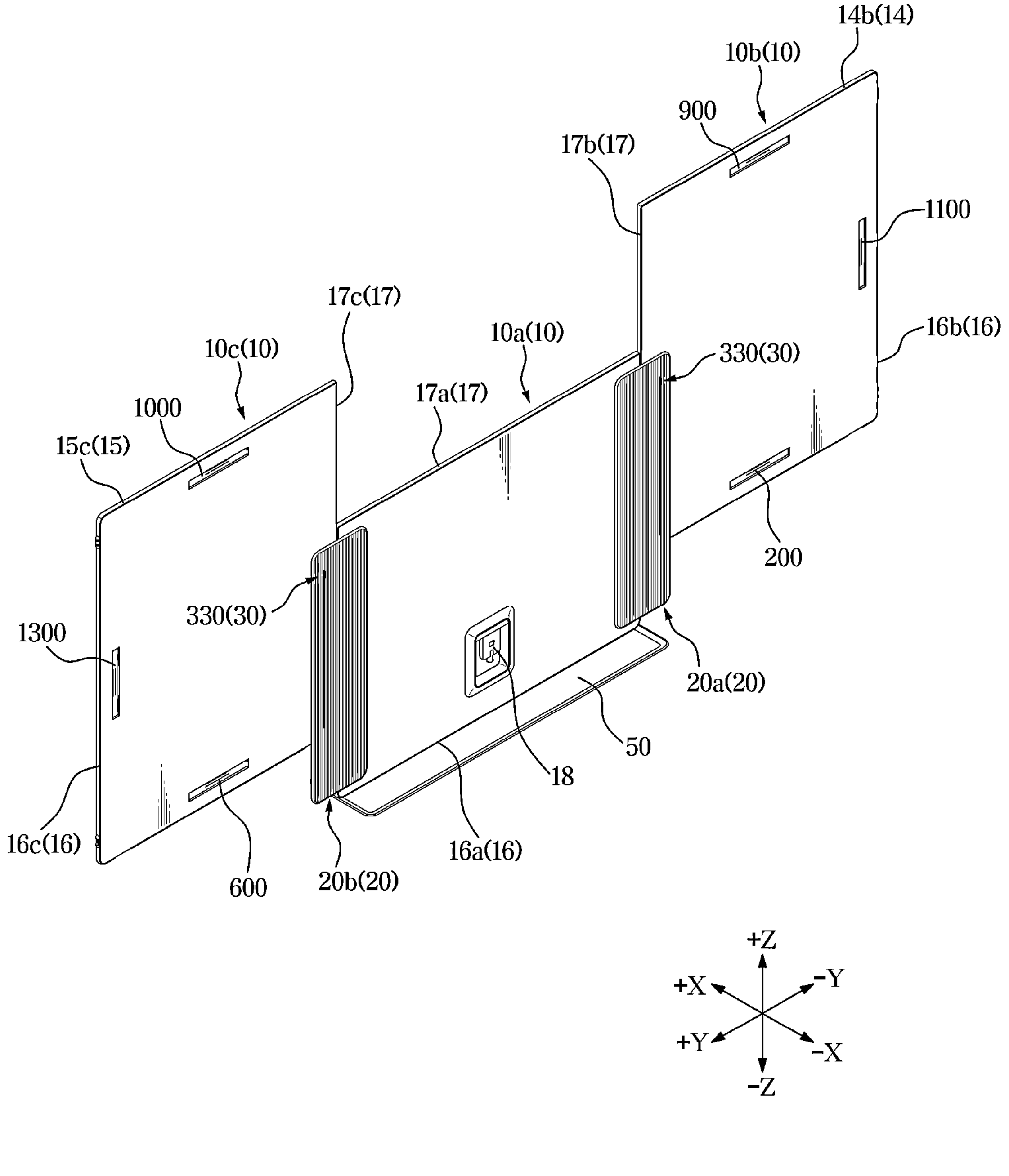
FIG. 33 illustrates an example of the arrangement of the plurality of display units.
Figure 34:
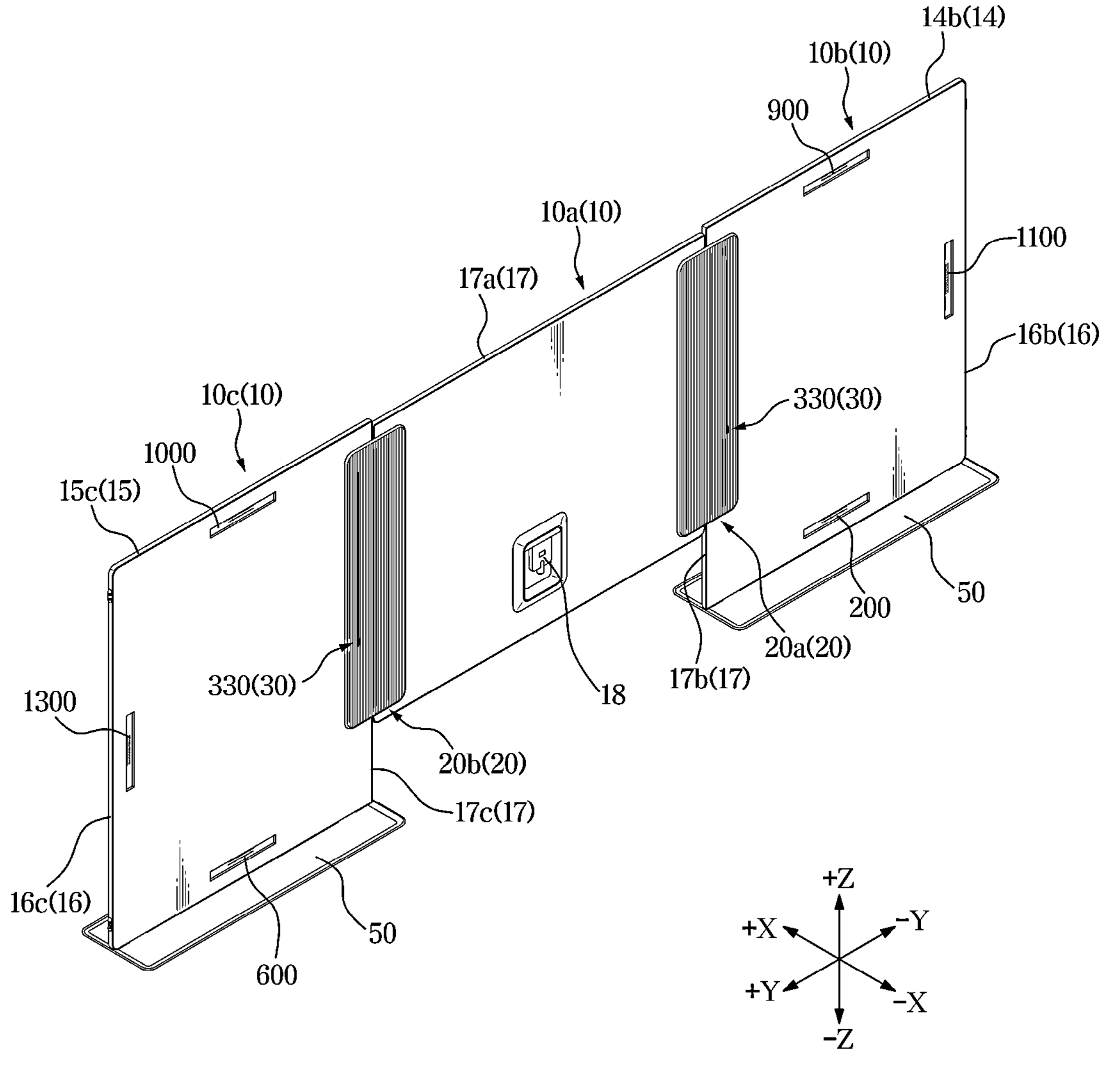
FIG. 34 illustrates an example of the arrangement of the plurality of display units.

FIG. 31 illustrates an example of the arrangement of the plurality of display units. FIG. 32 illustrates an example of the arrangement of the plurality of display units. FIG. 33 illustrates an example of the arrangement of the plurality of display units. FIG. 34 illustrates an example of the arrangement of the plurality of display units.

As for describing a display apparatus shown in FIGS. 31 to 34, the same reference numerals may be assigned to a configuration the same as the configuration of the display apparatus shown in FIGS. 1 to 30, and a detailed description thereof will be omitted.

Referring to FIGS. 31 to 34, the long side of the second display unit **10*b* may be disposed adjacent to the short side of the first display unit 10*a*. For example, a third side 16*b* or a fourth side 17*b* of the second display unit 10*b* may be disposed adjacent to the first side 14*a* of the first display unit 10*a*. The second display unit 10*b* may be provided in a vertical mode in which the long side thereof is arranged vertically. The long side of the third display unit 10*c* may be arranged to be adjacent to the short side of the first display unit 10*a*. For example, a third side 16*c* or a fourth side 17*c* of the third display unit 10*c* may be disposed adjacent to the second side 15*a* of the first display unit 10*a*. That is, the third display unit 10*c* may be provided in the vertical mode in which the long side thereof is arranged vertically. However, the present disclosure is not limited to FIGS. 31 to 34. For example, one of the second display unit 10*b* and the third display unit 10*c*** may be provided in the vertical mode.

For example, the second display unit **10*b* may include a connector 1100 adjacent to the third side 16*b* and/or a connector 1200 adjacent to the fourth side 17*b*. For example, the third display unit 10*c* may include a connector 1300 adjacent to the third side 16*c* and/or a connector 1400 adjacent to the fourth side 17*c*. Although not shown in the drawing, the first display unit 10*a* may further include a connector adjacent to the third side 16*a* and/or a connector adjacent to the fourth side 17*a***.

Referring to FIGS. 33 and 34, the second display unit **10*b* may slide with respect to the first display unit 10*a* in a state in which the second display unit 10*b* is in the vertical mode. The second display unit 10*b* may move in the vertical direction with respect to the first display unit 10*a* in the state in which the second display unit 10*b* is in the vertical mode. The third display unit 10*c* may slide with respect to the first display unit 10*a* in a state in which the third display unit 10*c* is in the vertical mode. The third display unit 10*c* may move in the vertical direction with respect to the first display unit 10*a* in the state in which the third display unit 10*c*** is in the vertical mode.

Figure 35:
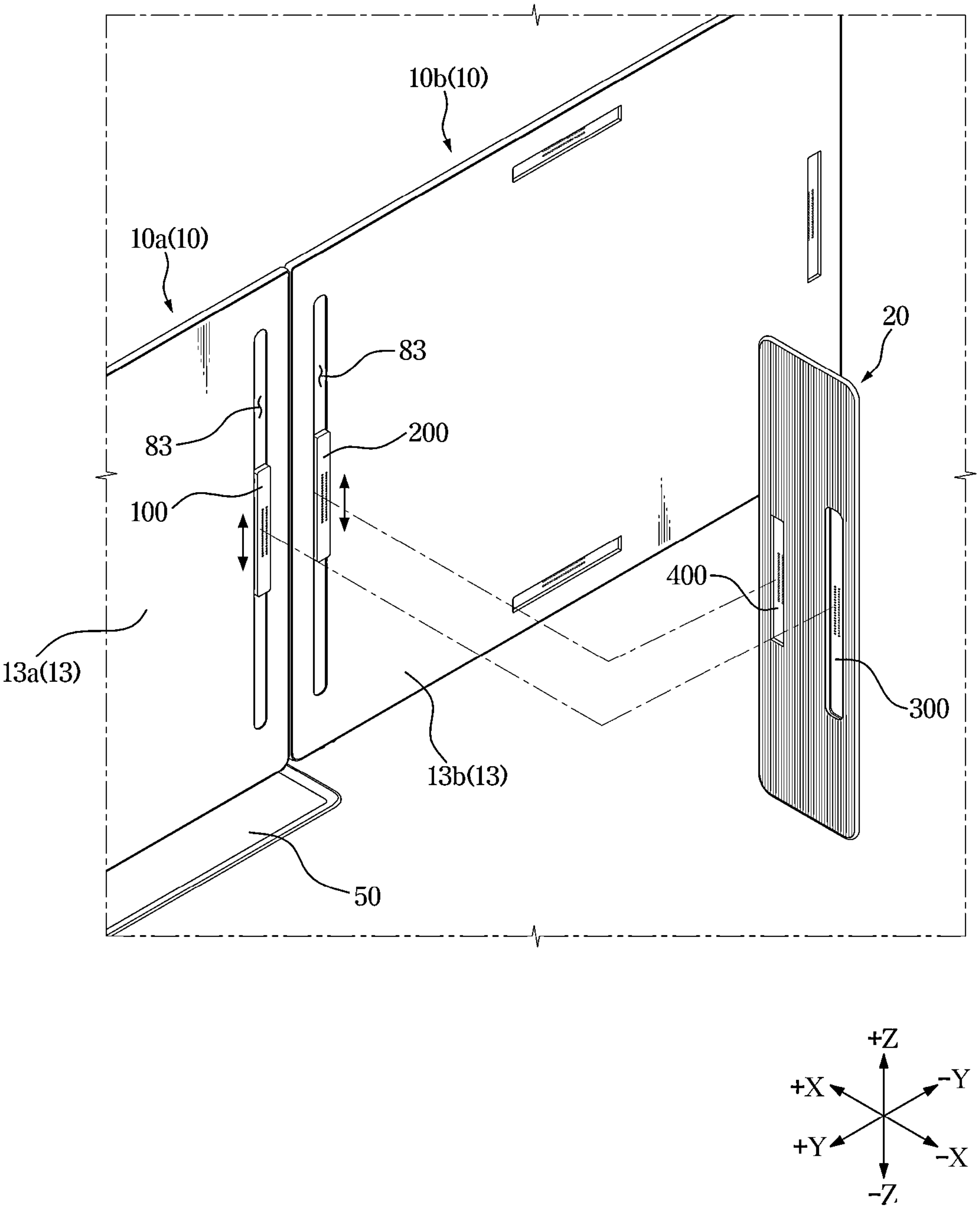
FIG. 35 is an exploded view of a portion of a display apparatus according to one embodiment.

FIG. 35 is an exploded view of a portion of a display apparatus according to one embodiment.

As for describing a display apparatus shown in FIG. 35, the same reference numerals may be assigned to a configuration the same as the configuration of the display apparatus shown in FIGS. 1 to 34, and a detailed description thereof will be omitted.

Referring to FIG. 35, the first connector 100 may be provided to slide in the vertical direction. For example, a connector rail 83 may be formed at the rear **13*a* of the first display unit 10*a*, and the first connector 100 may be arranged to move along the connector rail 83. For example, the third connector 300 may be connected to the first connector 100** and move together with the first connector

100. The second connector 200 may be provided to slide in the vertical direction. For example, a connector rail 83 may be formed at the rear 13*b* of the second display unit 10*b*, and the second connector 200 may be arranged to move along the connector rail 83. For example, the fourth connector 400 may be connected to the second connector 200 and may move together with the second connector 200. Meanwhile, as described above, the description of the first connector 100 and the second connector 200 shown in FIG. 35 may be equally applied to other display side connectors.

According to one embodiment of the present disclosure, the display apparatus 1 may include the first display unit 10*a* including the first connector 100, the second display unit 10*b* disposed adjacent to one side of the first display unit and including the second connector 200, the connection bracket 20 configured to be mounted to the first display unit and the second display unit and including the third connector 300 configured to be electrically connected to the first connector 100 and the fourth connector 400 configured to be electrically connected the second connector 200, and the position adjusting device 30. The position adjusting device 30 may be configured to move at least one of the first display unit 10*a* or the second display unit 10*b* while the first connector 100 and the third connector 300 are connected and the second connector 200 and the fourth connector 400 are connected.

The position adjusting device 30 may be disposed on the connection bracket. The position adjusting device 30 may be configured to slide at least one of the third connector 300 connected to the first connector 100 or the fourth connector 400 connected to the second connector 200.

The position adjusting device 30 may be configured to convert the rotational movement caused by the rotational force applied to the position adjusting device, into the linear movement for at least one of the display units.

The position adjusting device 30 may include the guide block 311 or 311*a* fixed to the third connector 300 within the connection bracket. The position adjusting device 30 may include the guide screw 312 or 312*a* rotatably coupled to the guide block and configured to move the guide block in the up and down direction.

The position adjusting device 30 may include the guide block 311 or 311*b* fixed to the fourth connector 400 within the connection bracket. The position adjusting device 30 may include the guide screw 312 or 312*b* rotatably coupled to the guide block and configured to move the guide block in the up and down direction.

At least a portion of the guide screw 312 may be provided to be exposed to the outside of the connection bracket.

The position adjusting device 30 may include the protruding guide portion 3211 or 3221 provided to protrude from the first connector 100 and configured to move in the first direction, the moving block 3212 or 3222 configured to move in the second direction intersecting the first direction within the third connector 300 and configured to press the protruding guide portion, and the adjustment screw 3213 or 3223 rotatably coupled to the moving block to move the moving block in the second direction.

The position adjusting device 30 may include the protruding guide portion 3211 or 3221 provided to protrude from the second connector 200 and configured to move in the first direction, the moving block 3212 or 3222 configured to move in the second direction intersecting the first direction within the fourth connector and configured to press the protruding guide portion, and the adjustment screw 3213 or 3223 rotatably coupled to the moving block to move the moving block in the second direction.

The protruding guide portion 3211 or 3221 may include the first inclined surface 3211S or 3221S. The moving block 3212 or 3222 may include the second inclined surface 3212S or 3222S corresponding to the first inclined surface and provided to be in contact with the first inclined surface.

The position adjusting device may include the toothed rail 331 disposed behind the fourth connector and provided to extend in the up and down direction. The position adjusting device may include the locking protrusion 332 provided to engage with the toothed rail and configured to move along the toothed rail together with the fourth connector.

While the toothed rail 331 and the locking protrusion 332 are engaged with each other, the locking protrusion and the fourth connector may be allowed to move upward along the toothed rail but may be prevented from moving downward. While the toothed rail 331 and the locking protrusion 332 are disengaged, the locking protrusion and the fourth connector may be allowed to move upward and downward along the toothed rail.

The position adjusting device may further include the release portion 333 configured to press the locking protrusion so as to release the engagement between the toothed rail and the locking protrusion.

The position adjusting device may further include the spring 334 configured to connect the locking protrusion and the fourth connector. The spring 334 may be configured to elastically bias the locking protrusion to allow the toothed rail and the locking protrusion to engage with each other.

The connection bracket may include the first panel 21*a* disposed behind the first display unit, the second panel 21*b* disposed behind the second display unit, and the hinge 22 rotatable between the first panel and the second panel.

At least one of the first display unit or the second display unit may include the first coupler 60. The connection bracket may include the second coupler 70 to which an attractive force is applied with the first coupler.

According to one embodiment of the present disclosure, the connection bracket, which is configured to connect the first display unit 10*a* including the first connector 100 and the second display unit 10*b* adjacent to the first display unit and including the second connector 200, may include the third connector 300 configured to be electrically connected to the first connector, the fourth connector 400 configured to be electrically connected the second connector, and the position adjusting device 30 configured to slide at least one of the third connector connected to the first connector or the fourth connector connected to the second connector.

The position adjusting device may include the guide block 311 fixed to at least one of the third connector or the fourth connector so as to move together with the at least one of the third connector or the fourth connector. The position adjusting device may include the guide screw 312 configured to move the guide block in the up and down direction by rotating with respect to the guide block 311.

The position adjusting device may include the toothed rail 331 disposed behind the fourth connector and provided to extend in the up and down direction. The position adjusting device may include the locking protrusion 332 provided to engage with the toothed rail and configured to move together with the fourth connector along the toothed rail. The position adjusting device may include the release portion 333 configured to move the locking protrusion to the direction away from the tooted rail so as to release the engagement between the toothed rail and the locking protrusion. The position adjusting device may include the spring 334 configured to move the locking protrusion to the direction closer to the tooted rail so as to allow the toothed rail and the locking protrusion to engage with each other.

According to one embodiment of the present disclosure, the display apparatus 1 may include the first display unit 10*a* including the first connector 100, the second display unit 10*b* disposed adjacent to one side of the first display unit and including the second connector 200, the connection bracket 20 including the third connector 300 configured to be electrically connected to the first connector 100 and the fourth connector 400 configured to be electrically connected the second connector 200, and the position adjusting device 30 configured to adjust the position of the first display unit with respect to the second display unit. The position adjusting device may include the protruding guide portion 3211 or 3221 formed in the first connector and configured to move with the first connector in the first direction, the moving block 3212 or 3222 formed in the third connector and configured to move in the second direction intersecting the first direction and provided to be in contact with the protruding guide portion, and the adjustment screw 3213 or 3223 rotatably coupled to the moving block to move the moving block in the second direction.

As is apparent from the above description, it is easy to adjust a position of each display unit.

Further, it is easy to adjust a step difference between a plurality of display units.

Further, it is easy to electrically connect a plurality of display units.

Further, a plurality of display units may be arranged in various combinations, thereby creating various working environments.

Further, aesthetics of a display apparatus may be improved.

Additional aspects of the disclosure will be set forth in part in the description which follows and, in part, will be obvious from the description, or may be learned by practice of the disclosure.

While the present disclosure has been particularly described with reference to exemplary embodiments, it should be understood by those of skilled in the art that various changes in form and details may be made without departing from the spirit and scope of the present disclosure.

What is claimed is:

1. A display apparatus comprising:

a first display unit comprising a first connector;

a second display unit disposed adjacent to one side of the first display unit, the second display unit comprising a second connector;

a connection bracket configured to be mounted to the first display unit and the second display unit, respectively, the connection bracket comprising:

a third connector configured to be electrically connectable to the first connector; and a fourth connector configured to be electrically connectable to the second connector; and a position adjusting device configured to move at least one of the first display unit and the second display unit to adjust a mounting position of the at least one of the first display unit and the second display unit while the connection bracket is mounted to the first display unit and the second display unit so that the first connector is connected to the third connector and the second connector is connected to the fourth connector, wherein the position adjusting device comprises:

a guide block fixed to the third connector within the connection bracket; and a guide screw rotatably coupled to the guide block, the guide screw configured to move the guide block in a first direction or a second direction opposite the first direction in response to rotation of the guide screw.

2. The display apparatus of claim 1, wherein:

the position adjusting device is disposed on the connection bracket; and the position adjusting device is configured to slide at least one of the third connector connected to the first connector and the fourth connector connected to the second connector.

3. The display apparatus of claim 1, wherein the position adjusting device is configured to convert a rotational movement caused by a rotational force applied to the position adjusting device, into a linear movement for at least one of the first display unit and the second display unit in order to adjust the mounting position of the at least one of the first display unit and the second display unit.

4. The display apparatus of claim 1, wherein the first direction is an upward direction and the second direction is a downward direction.

5. The display apparatus of claim 1, wherein:

the guide block is the first guide block and the guide screw is the first guide screw; and the position adjusting device further comprises:

a second guide block fixed to the fourth connector within the connection bracket;

a second guide screw rotatably coupled to the second guide block and configured to move the second guide block in the first direction or the second direction in response to rotation of the second guide screw.

6. The display apparatus of claim 4, wherein at least a portion of the guide screw is to be exposed to an outside of the connection bracket so that the guide screw is rotatable by rotating the at least a portion of the guide screw that is exposed.

* * * * *